(12) United States Patent
Zhao et al.

(10) Patent No.: US 12,107,760 B2
(45) Date of Patent: Oct. 1, 2024

(54) TRANSMITTING TRAFFIC ON PATH BETWEEN NODES IN NETWORK DEVICE BASED ON AVAILABLE BANDWIDTHS

(71) Applicant: Huawei Technologies Co., Ltd., Shenzhen (CN)

(72) Inventors: Yan Zhao, Beijing (CN); Yibo Yang, Chengdu (CN); Nan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 17/687,039

(22) Filed: Mar. 4, 2022

(65) Prior Publication Data

US 2022/0200901 A1 Jun. 23, 2022

Related U.S. Application Data

(63) Continuation of application No. PCT/CN2020/113744, filed on Sep. 7, 2020.

(30) Foreign Application Priority Data

Sep. 6, 2019 (CN) .......................... 201910843241.5

(51) Int. Cl.
*H04L 45/42* (2022.01)
*H04L 45/00* (2022.01)
*H04L 45/12* (2022.01)
*H04L 45/125* (2022.01)
(Continued)

(52) U.S. Cl.
CPC ............ *H04L 45/42* (2013.01); *H04L 45/123* (2013.01); *H04L 45/125* (2013.01); *H04L 45/20* (2013.01); *H04L 47/762* (2013.01); *H04L 47/781* (2013.01)

(58) Field of Classification Search
CPC ..... H04L 45/123; H04L 45/125; H04L 45/20; H04L 45/42; H04L 47/762; H04L 47/781
See application file for complete search history.

(56) References Cited

U.S. PATENT DOCUMENTS 6,396,816 B1    5/2002  Astle et al.
8,699,382 B2 *  4/2014  Retano ................... H04L 41/12
                                                370/255
9,531,564 B2 * 12/2016  Janakiraman ....... H04L 12/4633
(Continued)

FOREIGN PATENT DOCUMENTS

CN       101072171 A      11/2007
CN       101282279 A      10/2008
(Continued)

*Primary Examiner* — George C Neurauter, Jr.
(74) *Attorney, Agent, or Firm* — Conley Rose, P.C.

(57) ABSTRACT

A method includes a first node obtaining a first target bandwidth of first traffic on a first path, where the first path is a path used to transmit the first traffic from the first node to a second node. The first target bandwidth is not greater than a minimum value in remaining available bandwidths of single-hop links on the first path, and a single-hop link is a link between two directly connected nodes. The first node sends the first traffic on the first path based on the first target bandwidth. Accordingly, before traffic is transmitted in the network device, available bandwidth resources are predetermined for the traffic, and the traffic corresponding to the available bandwidth resources is transmitted on the determined available bandwidth resources.

25 Claims, 19 Drawing Sheets

(51) Int. Cl.
*H04L 47/762* (2022.01)
*H04L 47/78* (2022.01)

(56) References Cited

U.S. PATENT DOCUMENTS

| | | | |
|---|---|---|---|
| 10,476,698 B2* | 11/2019 | Chikkamath | H04L 12/4633 |
| 11,510,279 B2* | 11/2022 | Ganapathy | H04W 24/08 |
| 2010/0246480 A1* | 9/2010 | Aggarwal | H04W 40/02 |
| | | | 370/328 |
| 2013/0088968 A1* | 4/2013 | Kim | H04L 47/10 |
| | | | 370/235 |
| 2014/0211632 A1 | 7/2014 | Saad et al. | |
| 2015/0177794 A1* | 6/2015 | Colbert | H05K 3/325 |
| | | | 29/854 |
| 2017/0324733 A1* | 11/2017 | Howry | H04W 12/50 |

FOREIGN PATENT DOCUMENTS

| | | |
|---|---|---|
| CN | 101415248 A | 4/2009 |
| CN | 103650435 A | 3/2014 |
| CN | 107659505 A | 2/2018 |
| CN | 108337189 A | 7/2018 |
| CN | 109561028 A | 4/2019 |
| CN | 109617806 A | 4/2019 |
| EP | 2137888 A1 | 12/2009 |
| WO | 2006057381 A1 | 6/2006 |
| WO | 2008127574 A1 | 10/2008 |

\* cited by examiner

TRANSMITTING TRAFFIC ON PATH BETWEEN NODES IN NETWORK DEVICE BASED ON AVAILABLE BANDWIDTHS

CROSS-REFERENCE TO RELATED APPLICATIONS

This is a continuation of International Patent Application No. PCT/CN2020/113744 filed on Sep. 7, 2020, which claims priority to Chinese Patent Application No. 201910843241.5 filed on Sep. 6, 2019. The disclosures of the aforementioned applications are hereby incorporated by reference in their entireties.

TECHNICAL FIELD

This application relates to the field of communications technologies, and in particular, to a communications method and a related device.

BACKGROUND

As a requirement for a switching capability of a single network device increasingly increases, a quantity of nodes (for example, dies) integrated in one network device needs to continuously increase. When traffic is transmitted in a network device in which a plurality of nodes are integrated, the traffic is usually first preferentially transmitted on a shortest path between a source node and a destination node. When traffic congestion occurs on the shortest path, to avoid the congested path, a non-shortest path between the source node and the destination node may be determined, and whether the non-shortest path is congested is determined. If the non-shortest path is not congested, the traffic is transmitted on the non-shortest path.

However, the communications manner in which the traffic is preferentially transmitted on the shortest path, and if the shortest path is congested, the traffic is transmitted on the non-congested non-shortest path cannot ensure that a traffic transmission path is not congested. When traffic transmitted in the network device increases, congestion is likely to occur on the transmission path. After congestion occurs, a node buffers congested traffic, and simultaneously buffering a plurality of traffic is likely to cause an exception such as a packet loss. As a result, traffic cannot be normally transmitted between nodes in the network device.

SUMMARY

Based on this, embodiments of this application provide a communications method and a related device. To avoid a problem that traffic cannot be transmitted in a network device due to congestion on a path during traffic transmission, before the traffic is transmitted on a path, it is predetermined whether sufficient bandwidths can be used to transmit the traffic, and the traffic is transmitted on a path that is determined as a path having sufficient bandwidths to transmit the traffic, to ensure that no congestion occurs when the traffic is transmitted on the path.

According to a first aspect, an embodiment of this application provides a communications method, performed by a first node (namely, a source node of traffic) in a network device, the network device further includes a second node, and the method includes: The first node obtains a first target bandwidth of first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes; and the first node sends the first traffic on the first path based on the first target bandwidth. It can be learned that, in this embodiment of this application, before traffic is transmitted in the network device, it is predetermined for the traffic whether there are sufficient bandwidths on a transmission path, and after it is determined that a granted bandwidth can be used to transmit the traffic on the transmission path, some traffic corresponding to the granted bandwidth in the traffic is transmitted on the transmission path based on the granted bandwidth. This ensures that no congestion occurs during traffic transmission on the path, and can effectively avoid a problem that the traffic cannot be transmitted in the network device due to congestion on the path during traffic transmission in a current communications manner, to improve effectiveness and reliability of traffic transmission between nodes in the network device.

In some possible scenarios of the first aspect, the network device further includes a management node. The management node stores remaining available bandwidths of all single-hop links in the network device, and is configured to manage and allocate bandwidth resources of all the single-hop links in the network device. If the management node may be the first node, that the first node obtains a first target bandwidth of first traffic on a first path may include: The first node determines the first target bandwidth of the first traffic on the first path based on the stored remaining available bandwidths of the single-hop links on the first path.

For example, an implementation process in which the first node determines the first target bandwidth of the first traffic on the first path based on the stored remaining available bandwidths of the single-hop links on the first path may be as follows: The first node determines a first link granted bandwidth of the first traffic on the first path based on the stored remaining available bandwidths of the single-hop links on the first path, and uses the first link granted bandwidth as the first target bandwidth, where the first link granted bandwidth is a minimum value in a rate of the first traffic and the remaining available bandwidths of the single-hop links on the first path. In this way, only link bandwidth resources on the transmission path are considered, and bandwidth resources on an egress port on a destination node are not considered, so that efficiency of determining the target bandwidth is improved, and timeliness of traffic transmission is improved.

In another example, before the first node determines the first target bandwidth of the first traffic on the first path based on the stored remaining available bandwidths of the single-hop links on the first path, the method may further include: The first node sends a first bandwidth request message to the second node, where the first bandwidth request message includes information that indicates a rate of the first traffic. The first node receives a first port granted bandwidth sent by the second node, where the first port granted bandwidth is a port bandwidth allocated by the second node to the first traffic on an egress port on the second node based on the rate of the first traffic, the egress port on the second node is an egress port through which the second node sends the first traffic to another network device, and the first port granted bandwidth is a minimum value in the rate of the first traffic and a remaining available bandwidth of the egress port on the second node. In this case, that the first node determines the first target bandwidth of the first traffic on the first path based on the stored remaining available bandwidths of the single-hop links on the first path includes: The first node obtains the first target bandwidth based on the first port granted bandwidth and the remaining available bandwidths of the single-hop links on the first path that are stored on the first node, where the first target bandwidth is a minimum value in the first port granted bandwidth and the remaining available bandwidths of the single-hop links on the first path. In this way, the link bandwidth resources on the transmission path and the bandwidth resources of the egress port on the destination node are comprehensively considered, so that accuracy of determining the target bandwidth is improved, and traffic transmission in the network device is more reliable.

In some other possible scenarios of the first aspect, the network device further includes a management node. The management node stores remaining available bandwidths of all single-hop links in the network device, and is configured to manage and allocate bandwidth resources of all the single-hop links in the network device. The management node is not the first node.

In an example, that the first node obtains a first target bandwidth of first traffic on a first path may include: Step 1: The first node sends a second bandwidth request message to the management node, so that the management node determines the first target bandwidth for the first traffic on the first path, where the second bandwidth request message includes information that indicates a rate of the first traffic, and the first target bandwidth is a minimum value in the rate of the first traffic and the remaining available bandwidths of the single-hop links on the first path. Step 2: The first node receives the first target bandwidth from the management node.

In another example, that the first node obtains a first target bandwidth of first traffic on a first path may alternatively include: The first node sends a third bandwidth request message to the second node, so that the second node allocates a second port granted bandwidth to the first traffic on an egress port on the second node, and sends the second port granted bandwidth to the management node, where the third bandwidth request message includes information that indicates a rate of the first traffic, and the second port granted bandwidth is a minimum value in the rate of the first traffic and a remaining available bandwidth of the egress port on the second node. The first node receives the first target bandwidth sent by the management node, where the first target bandwidth is a minimum value determined by the management node in the second port granted bandwidth and the remaining available bandwidths of the single-hop links on the first path.

In still another example, that the first node obtains a first target bandwidth of first traffic on a first path may alternatively include: The first node sends a fourth bandwidth request message to the management node, so that the management node determines a second link granted bandwidth for the first traffic on the first path, where the fourth bandwidth request message includes information that indicates a rate of the first traffic, and the second link granted bandwidth is a minimum value in the rate of the first traffic and the remaining available bandwidths of the single-hop links on the first path. The first node receives the first target bandwidth from the second node, where the first target bandwidth is a minimum value determined by the second node in a remaining available bandwidth of an egress port on the second node and the second link granted bandwidth.

It can be learned that, in the plurality of implementations of this scenario, the management node may consider only the link bandwidth resources, or may consider and design both the link bandwidth resources and the bandwidth resources of the egress port on the destination node, to improve reliability of internal traffic transmission in the network device. The communications method provided in this embodiment of this application may be flexibly performed based on a network device indicator requirement and traffic.

In still other possible scenarios of the first aspect, each node in the network device stores a remaining available bandwidth of a single-hop link using the node as an endpoint, and is configured to manage and allocate a bandwidth resource of the single-hop link using the node as an endpoint.

In this scenario, in an example, that the first node obtains a first target bandwidth of first traffic on a first path may be: Step 1: The first node sends a fifth bandwidth request message to each node on the first path, where the fifth bandwidth request message includes information that indicates a rate of the first traffic. Step 2: The first node receives a third link granted bandwidth pre-allocated to the first traffic by each node on the first path. Step 3: The first node determines the first target bandwidth based on the third link granted bandwidth, where the first target bandwidth is not greater than a minimum value in the third link granted bandwidths corresponding to the single-hop links on the first path. An implementation of step 3 may include: The first node determines a fourth link granted bandwidth of the first traffic on the first path based on the third link granted bandwidth, where the fourth link granted bandwidth is a minimum value in the third link granted bandwidths corresponding to the single-hop links on the first path. The first node sends the fourth link granted bandwidth to the second node, so that the second node determines the first target bandwidth based on the fourth link granted bandwidth, where the first target bandwidth is a minimum value in the fourth link granted bandwidth and a remaining available bandwidth of an egress port on the second node, and the egress port on the second node is an egress port through which the second node sends the first traffic to another network device. The first node receives the first target bandwidth sent by the second node.

In another example, that the first node obtains a first target bandwidth of first traffic on a first path is: Step 1: The first node sends a sixth bandwidth request message to the second node, where the sixth bandwidth request message includes information that indicates a rate of the first traffic. Step 2: The first node receives a third port granted bandwidth allocated by the second node to the first traffic on an egress port on the second node, where the third port granted bandwidth is a minimum value in the rate of the first traffic and a remaining available bandwidth of the egress port on the second node, and the egress port on the second node is an egress port through which the second node sends the first traffic to another network device. Step 3: The first node sends a seventh bandwidth request message to each node on the first path, where the seventh bandwidth request message includes the third port granted bandwidth. Step 4: The first node receives a fifth link granted bandwidth pre-allocated to the first traffic by each node on the first path. Step 5: The first node determines a minimum value in the plurality of fifth link granted bandwidths as the first target bandwidth.

It can be learned that, in the plurality of implementations of this scenario, each node independently manages the link bandwidth resource of the single-hop link using the node as an endpoint, to improve reliability of traffic transmission in the network device, and effectively avoid a problem such as congestion and a packet loss in the network device.

In an implementation of the first aspect, if the rate of the first traffic is greater than the first target bandwidth, that the first node sends the first traffic on the first path based on the first target bandwidth is:

The first node sends first sub-traffic corresponding to the first target bandwidth in the first traffic on the first path. In this way, some traffic that is in the first traffic and whose rate corresponds to a target bandwidth that is applied for is effectively transmitted based on the target bandwidth, to ensure that congestion does not occur on the transmitted traffic in the network device, and improve reliability of traffic transmission in the network device.

It may be understood that this embodiment of this application may further include: The first node notifies other nodes in the network device of the first target bandwidth applied for the first traffic on the first path, so that the other nodes update the remaining available bandwidths of the single-hop links in the network device based on the first target bandwidth. In this way, bandwidth resources in the network device are updated in time, to improve accuracy of applying for and allocating bandwidth resources in this embodiment of this application.

According to a second aspect, an embodiment of this application further provides a communications method, performed by a management node in a network device, the network device further includes a first node and a second node, and the method includes: The management node determines a first target bandwidth for first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes. The management node sends the first target bandwidth to the first node, so that the first node sends the first traffic on the first path based on the first target bandwidth.

In some possible implementations of the second aspect, this embodiment of this application may further include: The management node receives a first bandwidth request message sent by the first node, where the first bandwidth request message includes information that indicates a rate of the first traffic. That the management node determines a first target bandwidth for first traffic on a first path is: The management node determines the first target bandwidth for the first traffic on the first path based on the rate of the first traffic and the remaining available bandwidths of the single-hop links on the first path.

In an example, that the management node determines the first target bandwidth for the first traffic on the first path based on the rate of the first traffic and the remaining available bandwidths of the single-hop links on the first path may include: Step 1: The management node uses a minimum value in the rate of the first traffic and the remaining available bandwidths of the single-hop links on the first path as a first link granted bandwidth. Step 2: The management node sends a second bandwidth request message to the second node. Step 3: The second node determines the first target bandwidth based on the first link granted bandwidth and a remaining available bandwidth of an egress port on the second node, where the second bandwidth request message includes the first link granted bandwidth, and the egress port on the second node is an egress port through which the second node sends the first traffic to another network device. Step 4: The second node sends the first target bandwidth to the management node. In one case, step 1 may include: The management node determines a minimum value in the rate of the first traffic and a remaining available bandwidth of each single-hop link on the first path as a second link granted bandwidth of the single-hop link. The management node determines a minimum value in the second link granted bandwidths of the single-hop links on the first path as the first link granted bandwidth of the first traffic on the first path. In another case, step 1 may alternatively include: The management node determines a minimum value in a link granted bandwidth of a previous single-hop link of each single-hop link (a link granted bandwidth of a previous single-hop link of the first single-hop link is the rate of the first traffic) and a remaining available bandwidth of the single-hop link as a link granted bandwidth of the single-hop link, and determines a link granted bandwidth of a next single-hop link based on the link granted bandwidth of the single-hop link, and so on, until a link granted bandwidth of the last single-hop link is determined based on a link granted bandwidth of the penultimate single-hop link and a remaining available bandwidth of the last single-hop link, and is used as the first link granted bandwidth of the first traffic on the first path.

In some other possible implementations of the second aspect, this embodiment of this application may further include: The management node receives a first port granted bandwidth that is allocated to the first traffic on an egress port on the second node and sent by the second node, where the egress port on the second node is an egress port through which the second node sends the first traffic to another network device. That the management node determines a first target bandwidth for first traffic on a first path includes: The management node obtains the first target bandwidth based on the first port granted bandwidth and the remaining available bandwidths of the single-hop links on the first path, where the first target bandwidth is a minimum value in the first port granted bandwidth and the remaining available bandwidths of the single-hop links on the first path.

In still other possible implementations of the second aspect, this embodiment of this application may further include: The management node receives a second bandwidth request message sent by a fourth node, where the second bandwidth request message includes a second requested bandwidth and is used to request, from the management node, bandwidth resources on a second path for second traffic, and both the second path and the first path include a first link. The management node allocates a second link granted bandwidth and a third link granted bandwidth respectively to the first traffic and the second traffic from a first remaining available bandwidth of the first link based on a first target priority of the first traffic and a second target priority of the second traffic.

In one case, if the first target priority is higher than the second target priority, that the management node allocates a second link granted bandwidth and a third link granted bandwidth respectively to the first traffic and the second traffic from a first remaining available bandwidth of the first link based on a first target priority of the first traffic and a second target priority of the second traffic includes: The management node allocates the second link granted bandwidth to the first traffic from the first remaining available bandwidth of the first link, where the second link granted bandwidth is a minimum value in a first requested bandwidth and the remaining available bandwidth. The management node updates the remaining available bandwidth of the first link with a second remaining available bandwidth, where the second remaining available bandwidth is a difference between the first remaining available bandwidth and the second link granted bandwidth. The management node allocates the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, that the management node allocates a second link granted bandwidth and a third link granted bandwidth respectively to the first traffic and the second traffic from a first remaining available bandwidth of the first link based on a first target priority of the first traffic and a second target priority of the second traffic includes: The management node allocates the second link granted bandwidth to the first traffic and the third link granted bandwidth to the second traffic from the first remaining available bandwidth of the first link according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the management node may further determine the first target priority for the first traffic based on a traffic priority of the first traffic and a quantity of single-hop links included in the first path, where a target priority is positively correlated with a traffic priority, and the target priority is negatively correlated with a quantity of single-hop links included in a path.

It may be understood that this embodiment of this application may further include: The management node updates the remaining available bandwidths of the single-hop links in the network device based on the first target bandwidth. In this way, bandwidth resources in the network device are updated in time, to improve accuracy of allocating the bandwidth resources by the management node to traffic entering the network device in this embodiment of this application.

It should be noted that, for various possible implementations and technical effects of the method provided in the second aspect, refer to the description of the method provided in the first aspect.

According to a third aspect, an embodiment of this application further provides a communications method, performed by a third node in a network device (for example, an intermediate node on a path corresponding to traffic), the network device further includes a first node, and the method includes: A third node receives a first bandwidth request message sent by the first node, where the first bandwidth request message is used to request the third node to allocate a first requested bandwidth to first traffic on a first link, and the first link is a single-hop link using the third node as an endpoint on a first path used to transmit the first traffic. The third node allocates a first link granted bandwidth to the first traffic on the first link from a first remaining available bandwidth of the first link, where the first link granted bandwidth is not greater than a minimum value in the first remaining available bandwidth and the first requested bandwidth. The third node sends the first link granted bandwidth to the first node.

In some possible implementations of the third aspect, this embodiment of this application may further include: The third node receives a notification message sent by the first node, where the notification message is used to notify a first target bandwidth that is allocated to the first traffic on the first path and that is used to transmit the first traffic. The third node updates the remaining available bandwidth of the first link with a second remaining available bandwidth based on the first target bandwidth, where the second remaining available bandwidth is a difference between the first remaining available bandwidth and the first target bandwidth.

In some other possible implementations of the third aspect, this embodiment of this application may further include: The third node receives a second bandwidth request message, where the second bandwidth request message is used to request the third node to allocate a second requested bandwidth to second traffic on the first link, and the first link is a single-hop link using the third node as an endpoint on a second path used to transmit the second traffic. The third node obtains a first target priority of the first traffic and a second target priority of the second traffic. The third node allocates a second link granted bandwidth and a third link granted bandwidth respectively to the first traffic and the second traffic from the first remaining available bandwidth of the first link based on the first target priority and the second target priority.

In one case, if the first target priority is higher than the second target priority, that the third node allocates a second link granted bandwidth and a third link granted bandwidth respectively to the first traffic and the second traffic from the first remaining available bandwidth of the first link based on the first target priority and the second target priority includes: The third node allocates the second link granted bandwidth to the first traffic from the first remaining available bandwidth, where the second link granted bandwidth is a minimum value in the first requested bandwidth and the first remaining available bandwidth. The third node updates the remaining available bandwidth of the first link with the second remaining available bandwidth, where the second remaining available bandwidth is a difference between the first remaining available bandwidth and the second link granted bandwidth. The third node allocates the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, that the third node allocates a second link granted bandwidth and a third link granted bandwidth respectively to the first traffic and the second traffic from the first remaining available bandwidth of the first link based on the first target priority and the second target priority includes: The third node allocates the second link granted bandwidth to the first traffic and the third link granted bandwidth to the second traffic from the first remaining available bandwidth according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the first bandwidth request message carries a first traffic priority of the first traffic, and the second bandwidth request message carries a second traffic priority of the second traffic. That the third node obtains a first target priority of the first traffic and a second target priority of the second traffic may include: The third node determines the first target priority for the first traffic based on the first traffic priority and a quantity of single-hop links included in the first path; and similarly, the third node determines the second target priority for the second traffic based on the second traffic priority and a quantity of single-hop links included in the second path, where a target priority is positively correlated with a traffic priority, and the target priority is negatively correlated with a quantity of single-hop links included in a path.

It should be noted that, for various possible implementations and technical effects of the method provided in the third aspect, refer to the descriptions of the methods provided in the first aspect and the second aspect.

According to a fourth aspect, an embodiment of this application further provides a communications method, performed by a second node (namely, a destination node of traffic) in a network device, the network device further includes a first node, and the method includes: The second node receives a first bandwidth request message sent by the first node, where the first bandwidth request message includes information that indicates a rate of first traffic, and is used to request a bandwidth resource of an egress port on the second node from the second node, the egress port on the second node is an egress port through which the second node sends the first traffic to another network device, and the first traffic is traffic to be transmitted from the first node to the second node. The second node determines a first port granted bandwidth based on the rate of the first traffic and a remaining available bandwidth of the egress port on the second node.

In some possible implementations of the fourth aspect, if the second node stores remaining available bandwidths of single-hop links in the network device, that the second node determines a first port granted bandwidth based on the rate of the first traffic and a remaining available bandwidth of the egress port on the second node includes: The second node determines, based on the stored remaining available bandwidths of the single-hop links in the network device, at least one first path that has an available bandwidth resource from the first node to the second node; and the second node determines the first port granted bandwidth based on the rate of the first traffic, the remaining available bandwidth of the egress port on the second node, and remaining available bandwidths of single-hop links on the at least one first path.

In some other possible implementations of the fourth aspect, if the second node stores a remaining available bandwidth of a single-hop link using the second node as an endpoint and a bandwidth status of another single-hop link, that the second node determines a first port granted bandwidth based on the rate of the first traffic and a remaining available bandwidth of the egress port on the second node includes: The second node determines, based on the stored bandwidth status of the another single-hop link, at least one first path that has an available bandwidth resource from the first node to the second node; and the second node determines, as the first port granted bandwidth, a minimum value in the rate of the first traffic, the remaining available bandwidth of the egress port on the second node, and a total remaining available bandwidth of the single-hop link using the second node as an endpoint.

In still other possible implementations of the fourth aspect, if the network device further includes a management node, the management node is not the second node, the management node stores remaining available bandwidths of all single-hop links in the network device, and is configured to manage and allocate bandwidth resources of all the single-hop links in the network device, and the method further includes: The second node sends the first port granted bandwidth to the management node, so that the management node allocates a first target bandwidth to the first traffic on the first path based on the first port granted bandwidth, and sends the first target bandwidth to the first node.

In yet other possible implementations of the fourth aspect, if the network device further includes a management node, the management node is not the second node, the management node stores remaining available bandwidths of all single-hop links in the network device, and is configured to manage and allocate bandwidth resources of all the single-hop links in the network device, and the method further includes: The second node receives a first link granted bandwidth sent by the management node. That the second node determines a first port granted bandwidth based on the rate of the first traffic and a remaining available bandwidth of the egress port on the second node includes: The second node determines the first port granted bandwidth based on the first link granted bandwidth and the remaining available bandwidth of the egress port on the second node, and uses the first port granted bandwidth as a first target bandwidth. This embodiment of this application may further include: The second node sends the first target bandwidth to the first node.

It should be noted that, for various possible implementations and technical effects of the method provided in the fourth aspect, refer to the descriptions of the methods provided in the first aspect, the second aspect, and third aspect.

According to a fifth aspect, an embodiment of this application provides a first node. The first node is a node in a network device, the network device further includes a second node, and the first node includes an obtaining unit and a first sending unit. The obtaining unit is configured to obtain a first target bandwidth of first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes. The first sending unit is configured to send the first traffic on the first path based on the first target bandwidth.

In some possible scenarios of the fifth aspect, the network device further includes a management node. The management node stores remaining available bandwidths of all single-hop links in the network device, and is configured to manage and allocate bandwidth resources of all the single-hop links in the network device. If the management node is the first node, the obtaining unit is configured to determine the first target bandwidth of the first traffic on the first path based on the stored remaining available bandwidths of the single-hop links on the first path.

In an example, the obtaining unit is configured to determine a first link granted bandwidth of the first traffic on the first path based on the stored remaining available bandwidths of the single-hop links on the first path, and uses the first link granted bandwidth as the first target bandwidth, where the first link granted bandwidth is a minimum value in a rate of the first traffic and the remaining available bandwidths of the single-hop links on the first path.

In another example, the first node may further include: a second sending unit, configured to send a first bandwidth request message to the second node, where the first bandwidth request message includes information that indicates a rate of the first traffic; and a receiving unit, configured to receive a first port granted bandwidth sent by the second node, where the first port granted bandwidth is a port bandwidth allocated by the second node to the first traffic on an egress port on the second node based on the rate of the first traffic, the egress port on the second node is an egress port through which the second node sends the first traffic to another network device, and the first port granted bandwidth is a minimum value in the rate of the first traffic and a remaining available bandwidth of the egress port on the second node. In this case, the obtaining unit is configured to obtain the first target bandwidth based on the first port granted bandwidth and the remaining available bandwidths of the single-hop links on the first path that are stored on the first node, where the first target bandwidth is a minimum value in the first port granted bandwidth and the remaining available bandwidths of the single-hop links on the first path.

In some other possible scenarios of the fifth aspect, the network device further includes a management node. The management node stores remaining available bandwidths of all single-hop links in the network device, and is configured to manage and allocate bandwidth resources of all the single-hop links in the network device. The management node is not the first node.

In an example, the obtaining unit may include: a first sending subunit, configured to send a second bandwidth request message to the management node, so that the management node determines the first target bandwidth for the first traffic on the first path, where the second bandwidth request message includes information that indicates a rate of the first traffic, and the first target bandwidth is a minimum value in the rate of the first traffic and the remaining available bandwidths of the single-hop links on the first path; and a first receiving subunit, configured to receive the first target bandwidth from the management node.

In another example, the obtaining unit may alternatively include: a second sending subunit, configured to send a third bandwidth request message to the second node, so that the second node allocates a second port granted bandwidth to the first traffic on an egress port on the second node, and sends the second port granted bandwidth to the management node, where the third bandwidth request message includes information that indicates a rate of the first traffic, and the second port granted bandwidth is a minimum value in the rate of the first traffic and a remaining available bandwidth of the egress port on the second node; and a second receiving subunit, configured to receive the first target bandwidth sent by the management node, where the first target bandwidth is a minimum value determined by the management node in the second port granted bandwidth and the remaining available bandwidths of the single-hop links on the first path.

In still another example, the obtaining unit may alternatively include: a third sending subunit, configured to send a fourth bandwidth request message to the management node, so that the management node determines a second link granted bandwidth for the first traffic on the first path, where the fourth bandwidth request message includes information that indicates a rate of the first traffic, and the second link granted bandwidth is a minimum value in the rate of the first traffic and the remaining available bandwidths of the single-hop links on the first path; and a third receiving subunit, configured to receive the first target bandwidth from the second node, where the first target bandwidth is a minimum value determined by the second node in a remaining available bandwidth of an egress port on the second node and the second link granted bandwidth.

In still other possible scenarios of the fifth aspect, each node in the network device stores a remaining available bandwidth of a single-hop link using the node as an endpoint, and is configured to manage and allocate a bandwidth resource of the single-hop link using the node as an endpoint.

In this scenario, in an example, the obtaining unit includes: a fourth sending subunit, configured to send a fifth bandwidth request message to each node on the first path, where the fifth bandwidth request message includes information that indicates a rate of the first traffic; a fourth receiving subunit, configured receive a third link granted bandwidth pre-allocated to the first traffic by each node on the first path; and a first determining subunit, configured to determine the first target bandwidth based on the third link granted bandwidth, where the first target bandwidth is not greater than a minimum value in the third link granted bandwidths corresponding to the single-hop links on the first path. The first determining subunit includes: a second determining subunit, configured to determine a fourth link granted bandwidth of the first traffic on the first path based on the third link granted bandwidth, where the fourth link granted bandwidth is a minimum value in the third link granted bandwidths corresponding to the single-hop links on the first path; a fifth sending subunit, configured to send the fourth link granted bandwidth to the second node, so that the second node determines the first target bandwidth based on the fourth link granted bandwidth, where the first target bandwidth is a minimum value in the fourth link granted bandwidth and a remaining available bandwidth of an egress port on the second node, and the egress port on the second node is an egress port through which the second node sends the first traffic to another network device; and a fifth receiving subunit, configured to receive the first target bandwidth sent by the second node.

In another example, the obtaining unit includes: a sixth sending subunit, configured to send a sixth bandwidth request message to the second node, where the sixth bandwidth request message includes information that indicates a rate of the first traffic; a sixth receiving subunit, configured to receive a third port granted bandwidth allocated by the second node to the first traffic on an egress port on the second node, where the third port granted bandwidth is a minimum value in the rate of the first traffic and a remaining available bandwidth of the egress port on the second node, and the egress port on the second node is an egress port through which the second node sends the first traffic to another network device; a seventh sending subunit, configured to send a seventh bandwidth request message to each node on the first path, where the seventh bandwidth request message includes the third port granted bandwidth; a seventh receiving subunit, configured receive a fifth link granted bandwidth pre-allocated to the first traffic by each node on the first path; and a third determining subunit, configured to determine a minimum value in the plurality of fifth link granted bandwidths as the first target bandwidth.

In an implementation of the fifth aspect, if the rate of the first traffic is greater than the first target bandwidth, the first sending unit is configured to: send first sub-traffic corresponding to the first target bandwidth in the first traffic on the first path.

It may be understood that the first node may further include: a third sending unit, configured to notify other nodes in the network device of the first target bandwidth applied for the first traffic on the first path, so that the other nodes update the remaining available bandwidths of the single-hop links in the network device based on the first target bandwidth.

It should be noted that, for various possible implementations and technical effects of the first node provided in the fifth aspect, refer to the description of the method provided in the first aspect.

According to a sixth aspect, an embodiment of this application further provides a management node. The management node is a node in a network device, the network device further includes a first node and a second node, and the management node includes a first determining unit and a first sending unit. The first determining unit is configured to determine a first target bandwidth for first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes; and the first sending unit is configured to send the first target bandwidth to the first node, so that the first node sends the first traffic on the first path based on the first target bandwidth.

In some possible implementations of the sixth aspect, the management node in this embodiment of this application further includes: a first receiving unit, configured to receive a first bandwidth request message sent by the first node, where the first bandwidth request message includes information that indicates a rate of the first traffic. The first determining unit is configured to determine the first target bandwidth for the first traffic on the first path based on the rate of the first traffic and the remaining available bandwidths of the single-hop links on the first path.

In an example, the first determining unit may include: a first determining subunit, configured to use a minimum value in the rate of the first traffic and the remaining available bandwidths of the single-hop links on the first path as a first link granted bandwidth; a first sending subunit, configured to send a second bandwidth request message to the second node, so that the second node determines the first target bandwidth based on the first link granted bandwidth and a remaining available bandwidth of an egress port on the second node, where the second bandwidth request message includes the first link granted bandwidth, and the egress port on the second node is an egress port through which the second node sends the first traffic to another network device; and a first receiving subunit, configured to receive the first target bandwidth sent by the second node. The first determining subunit may include: a second determining subunit, configured to determine a minimum value in the rate of the first traffic and a remaining available bandwidth of each single-hop link on the first path as a second link granted bandwidth of the single-hop link; and a third determining subunit, configured to determine a minimum value in the second link granted bandwidths of the single-hop links on the first path as the first link granted bandwidth of the first traffic on the first path.

In some other possible implementations of the sixth aspect, the management node further includes: a second receiving unit, configured to receive a first port granted bandwidth that is allocated to the first traffic on an egress port on the second node and sent by the second node, where the egress port on the second node is an egress port through which the second node sends the first traffic to another network device. The first determining unit is configured to obtain the first target bandwidth based on the first port granted bandwidth and the remaining available bandwidths of the single-hop links on the first path, where the first target bandwidth is a minimum value in the first port granted bandwidth and the remaining available bandwidths of the single-hop links on the first path.

In still other possible implementations of the sixth aspect, the management node further includes: a third receiving unit, configured to receive a second bandwidth request message sent by a fourth node, where the second bandwidth request message includes a second requested bandwidth and is used to request, from the management node, bandwidth resources on a second path for second traffic, and both the second path and the first path include a first link; and an allocation unit, configured to allocate a second link granted bandwidth and a third link granted bandwidth respectively to the first traffic and the second traffic from a first remaining available bandwidth of the first link based on a first target priority of the first traffic and a second target priority of the second traffic.

In one case, if the first target priority is higher than the second target priority, the allocation unit includes: a first allocation subunit, configured to allocate the second link granted bandwidth to the first traffic from the first remaining available bandwidth of the first link, where the second link granted bandwidth is a minimum value in a first requested bandwidth and the remaining available bandwidth; an update subunit, configured to update the remaining available bandwidth of the first link with a second remaining available bandwidth, where the second remaining available bandwidth is a difference between the first remaining available bandwidth and the second link granted bandwidth; and a second allocation subunit, configured to allocate the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, the allocation unit is configured to allocate the second link granted bandwidth to the first traffic and the third link granted bandwidth to the second traffic from the first remaining available bandwidth of the first link according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the management node may further include a second determine unit, configured to determine the first target priority for the first traffic based on a traffic priority of the first traffic and a quantity of single-hop links included in the first path, where a target priority is positively correlated with a traffic priority, and the target priority is negatively correlated with a quantity of single-hop links included in a path.

It may be understood that the management node further includes: an update unit, configured to update the remaining available bandwidths of the single-hop links in the network device based on the first target bandwidth.

It should be noted that, for various possible implementations and technical effects of the management node provided in the sixth aspect, refer to the description of the method provided in the second aspect.

According to a seventh aspect, an embodiment of this application further provides a third node. The third node is a node in a network device, the network device further includes a first node, and the third node includes a first receiving unit, a first allocation unit, and a sending unit. The first receiving unit is configured to receive a first bandwidth request message sent by the first node, where the first bandwidth request message is used to request the third node to allocate a first requested bandwidth to first traffic on a first link, and the first link is a single-hop link using the third node as an endpoint on a first path used to transmit the first traffic. The first allocation unit is configured to allocate a first link granted bandwidth to the first traffic on the first link from a first remaining available bandwidth of the first link, where the first link granted bandwidth is not greater than a minimum value in the first remaining available bandwidth and the first requested bandwidth. The sending unit is configured to send the first link granted bandwidth to the first node.

In some possible implementations of the seventh aspect, the third node further includes: a second receiving unit, configured to receive a notification message sent by the first node, where the notification message is used to notify a first target bandwidth that is allocated to the first traffic on the first path and that is used to transmit the first traffic; and an update unit, configured to update the remaining available bandwidth of the first link with a second remaining available bandwidth based on the first target bandwidth, where the second remaining available bandwidth is a difference between the first remaining available bandwidth and the first target bandwidth.

In some other possible implementations of the seventh aspect, the third node further includes: a third receiving unit, configured to receive a second bandwidth request message, where the second bandwidth request message is used to request the third node to allocate a second requested bandwidth to second traffic on the first link, and the first link is a single-hop link using the third node as an endpoint on a second path used to transmit the second traffic; an obtaining unit, configured to obtain a first target priority of the first traffic and a second target priority of the second traffic; and a second allocation unit, configured to allocate a second link granted bandwidth and a third link granted bandwidth respectively to the first traffic and the second traffic from the first remaining available bandwidth of the first link based on the first target priority and the second target priority.

In one case, if the first target priority is higher than the second target priority, the second allocation unit includes: a first allocation subunit, configured to allocate the second link granted bandwidth to the first traffic from the first remaining available bandwidth, where the second link granted bandwidth is a minimum value in the first requested bandwidth and the first remaining available bandwidth; an update subunit, configured to update the remaining available bandwidth of the first link with the second remaining available bandwidth, where the second remaining available bandwidth is a difference between the first remaining available bandwidth and the second link granted bandwidth; and a second allocation subunit, configured to allocate the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, the second allocation unit is configured to allocate the second link granted bandwidth to the first traffic and the third link granted bandwidth to the second traffic from the first remaining available bandwidth according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the first bandwidth request message carries a first traffic priority of the first traffic, and the second bandwidth request message carries a second traffic priority of the second traffic. The obtaining unit includes: a first determining subunit, configured to determine the first target priority for the first traffic based on the first traffic priority and a quantity of single-hop links included in the first path; and a second determining subunit, configured to determine the second target priority for the second traffic based on the second traffic priority and a quantity of single-hop links included in the second path, where a target priority is positively correlated with a traffic priority, and the target priority is negatively correlated with a quantity of single-hop links included in a path.

It should be noted that, for various possible implementations and technical effects of the third node provided in the seventh aspect, refer to the description of the method provided in the third aspect.

According to an eighth aspect, an embodiment of this application further provides a second node. The second node is a node in a network device, the network device further includes a first node, and the second node includes a first receiving unit and a determining unit. The first receiving unit is configured to receive a first bandwidth request message sent by the first node, where the first bandwidth request message includes information that indicates a rate of first traffic, and is used to request a bandwidth resource of an egress port on the second node from the second node, the egress port on the second node is an egress port through which the second node sends the first traffic to another network device, and the first traffic is traffic to be transmitted from the first node to the second node. The determining unit is configured to determine a first port granted bandwidth based on the rate of the first traffic and a remaining available bandwidth of the egress port on the second node.

In some possible implementations of the eighth aspect, if the second node stores remaining available bandwidths of single-hop links in the network device, the determining unit includes: a first determining subunit, configured to determine, based on the stored remaining available bandwidths of the single-hop links in the network device, at least one first path that has an available bandwidth resource from the first node to the second node; and a second determining subunit, configured to determine the first port granted bandwidth based on the rate of the first traffic, the remaining available bandwidth of the egress port on the second node, and remaining available bandwidths of single-hop links on the at least one first path.

In some other possible implementations of the eighth aspect, if the second node stores a remaining available bandwidth of a single-hop link using the second node as an endpoint and a bandwidth status of another single-hop link, the determining unit includes: a third determining subunit, configured to determine, based on the stored bandwidth status of the another single-hop link, at least one first path that has an available bandwidth resource from the first node to the second node; and a fourth determining subunit, configured to determine, as the first port granted bandwidth, a minimum value in the rate of the first traffic, the remaining available bandwidth of the egress port on the second node, and a total remaining available bandwidth of the single-hop link using the second node as an endpoint.

In still other possible implementations of the eighth aspect, if the network device further includes a management node, the management node is not the second node, and the management node stores remaining available bandwidths of all single-hop links in the network device, and is configured to manage and allocate bandwidth resources of all the single-hop links in the network device. The second node further includes: a first sending unit, configured to send the first port granted bandwidth to the management node, so that the management node allocates a first target bandwidth to the first traffic on the first path based on the first port granted bandwidth, and sends the first target bandwidth to the first node.

In yet other possible implementations of the eighth aspect, if the network device further includes a management node, the management node is not the second node, and the management node stores remaining available bandwidth of all single-hop links in the network device, and is configured to manage and allocate bandwidth resources of all the single-hop links in the network device. The second node further includes: a second receiving unit, configured to receive a first link granted bandwidth sent by the management node. The determining unit includes a third determining unit configured to determine the first port granted bandwidth based on the first link granted bandwidth and the remaining available bandwidth of the egress port on the second node, and use the first port granted bandwidth as a first target bandwidth. In this case, the second node further includes: a second sending unit, configured to send the first target bandwidth to the first node.

It should be noted that, for various possible implementations and technical effects of the second node provided in the eighth aspect, refer to the description of the method provided in the fourth aspect.

According to a ninth aspect, an embodiment of this application further provides a first node. The first node includes a processor and a communications interface. The processor is configured to perform the communications method according to any one of the implementations of the first aspect, and the communications interface is configured to implement communication between the first node and another node in a network device to which the first node belongs and an external device.

According to a tenth aspect, an embodiment of this application further provides a management node. The management node includes a processor and a communications interface. The processor is configured to perform the communications method according to any one of the implementations of the second aspect, and the communications interface is configured to implement communication between the management node and another node in a network device to which the management node belongs.

According to an eleventh aspect, an embodiment of this application further provides a third node. The third node includes a processor and a communications interface. The processor is configured to perform the communications method according to any one of the implementations of the third aspect, and the communications interface is configured to implement communication between the third node and another node in a network device to which the third node belongs.

According to a twelfth aspect, an embodiment of this application further provides a second node. The second node includes a processor and a communications interface. The processor is configured to perform the communications method according to any one of the implementations of the fourth aspect, and the communications interface is configured to implement communication between the second node and another node in a network device to which the second node belongs and an external device.

According to a thirteenth aspect, an embodiment of this application further provides a network device. The network device includes a first node and a second node. The first node is configured to receive first traffic, and perform the communications method according to any one of the implementations of the first aspect, and the second node is configured to perform the communications method according to any one of the implementations of the fourth aspect.

In some possible implementations, the network device may further include a third node, and the third node is configured to perform the communications method according to any one of the implementations of the third aspect.

In some other possible implementations, the network device may further include a management node, and the management node is configured to perform the communications method according to any one of the implementations of the second aspect.

According to a fourteenth aspect, an embodiment of this application further provides a computer-readable storage medium. The computer-readable storage medium stores instructions, and when the instructions are run on a computer, the computer is enabled to perform the communications method according to any one of the implementations of the first aspect to the fourth aspect.

According to a fifteenth aspect, an embodiment of this application further provides a computer program product. When the computer program product is run on a computer, the computer is enabled to perform the communications method according to any one of the implementations of the first aspect to the fourth aspect.

BRIEF DESCRIPTION OF DRAWINGS

To describe technical solutions in the embodiments of this application more clearly, the following briefly describes the accompanying drawings for describing the embodiments. It is clear that the accompanying drawings in the following description show merely some embodiments of this application, and a person of ordinary skill in the art may derive other drawings from these accompanying drawings.

DESCRIPTION OF EMBODIMENTS

Figure 1:
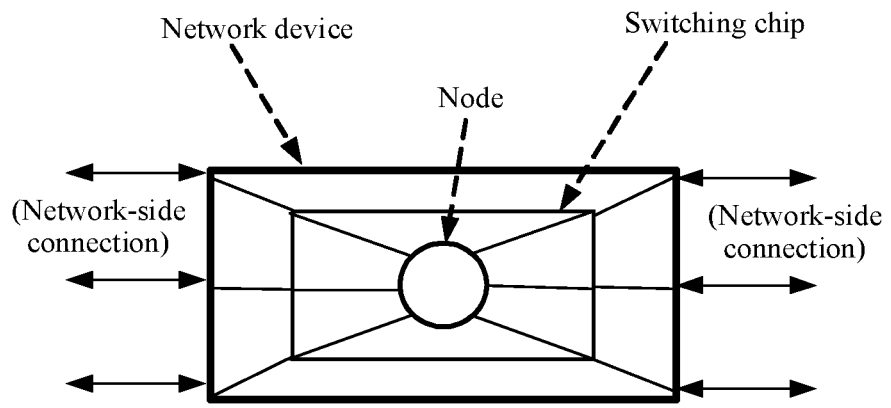
FIG. 1 is a schematic diagram of a structure of a network device according to an embodiment of this application.

FIG. 1 shows an internal structure of a single-node network device. For the single-node network device, one network device includes one switching chip, and at least one node is packaged in one switching chip. It should be noted that one node in the embodiments of this application represents one die, that is, one basic division unit in an entire silicon chip or a wafer in a semiconductor technology.

Figure 2A:
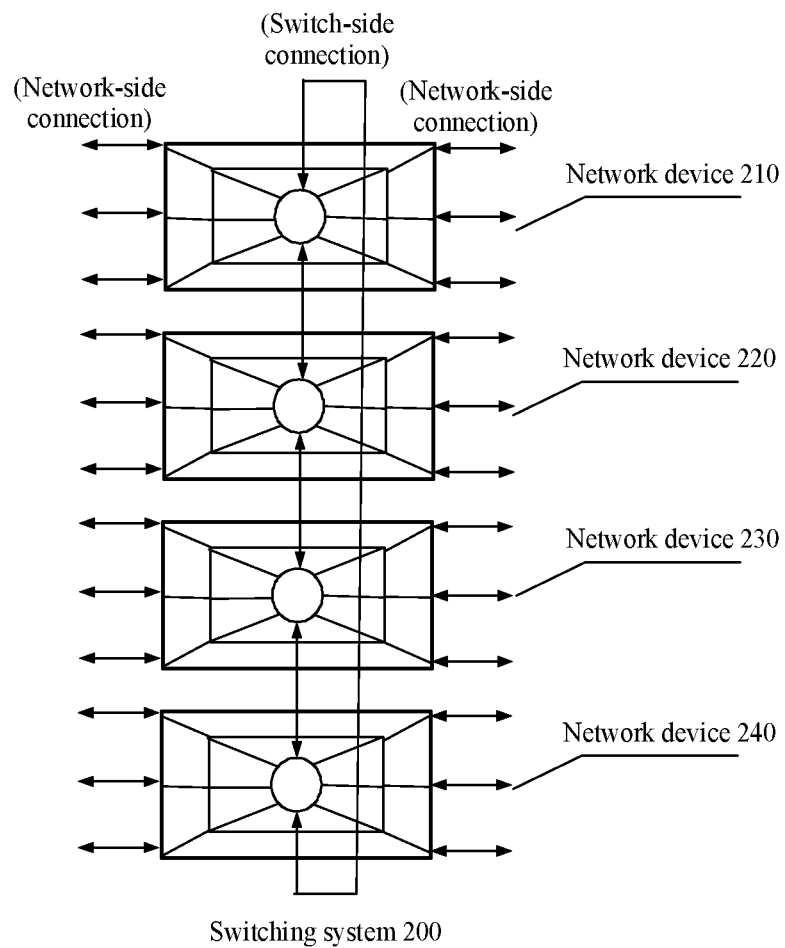
FIG. 2A is a schematic diagram of a structure of a ring network system including a plurality of network devices according to an embodiment of this application.

However, with a surge in a data amount, a switching capability of a network device such as a network switching device needs to be continuously improved. The switching capability of the network device is related to a quantity of nodes (for example, dies) packaged in the network device. More nodes included in the network device indicates a greater quantity of network-side ports on the network device and a stronger switching capability that can be provided by the network device. Therefore, to improve the switching capability of the network device, a quantity of nodes included in the network device may be increased in the following manner:

In some cases, a plurality of network devices shown in FIG. 1 may be connected to form a ring network system, and the ring network system is considered as a large network device. For example, four network devices 210 to 240 shown in FIG. 1 may be connected to form a ring network system 200 in a manner shown in FIG. 2A. The ring network system 200 may be used as a large network device. Each of the network devices 210 to 240 may include one or two switching chips, and each switching chip may also include one or two nodes.

In other cases, a plurality of nodes may be packaged in a single network device. In an example, the plurality of nodes packaged in the network device may form a ring network structure. That is, each node has only two adjacent nodes. For example, eight nodes 251 to 258 may be packaged in a network device 250 in a manner shown in FIG. 2B. The eight nodes form a ring network structure in the network device 250. The eight nodes may be separately packaged in one or more switching chips in the network device 250. In another example, a plurality of nodes packaged in the network device may form a stereoscopic network structure. That is, each node is connected to at least three other nodes. For example, four nodes 301 to 304 may be packaged in a network device 260 in a manner shown in FIG. 2C. The four nodes form a stereoscopic network structure in the network device 260, and the four nodes may be separately packaged in one or more switching chips in the network device 260.

When receiving traffic, a network device with a relatively strong switching capability, such as the ring network system 200, the network device 250, or the network device 260 currently performs communication in the following manner usually: If congestion does not occur on a shortest path, the traffic is transmitted in the network device on the shortest path. If traffic congestion occurs on the shortest path, to avoid the congested path, a non-shortest path between a source node and a destination node may be determined, and whether the non-shortest path is congested is determined. If the non-shortest path is not congested, the traffic is transmitted on the non-shortest path. It may be understood that congestion occurring on a transmission path may mean that a rate of traffic transmitted on at least one single-hop link on the path is greater than a maximum physical link bandwidth (referred to as bandwidth below) of the single-hop link. A single-hop link is a link between two adjacent nodes on a path. A path includes at least one single-hop link.

Figure 2B:
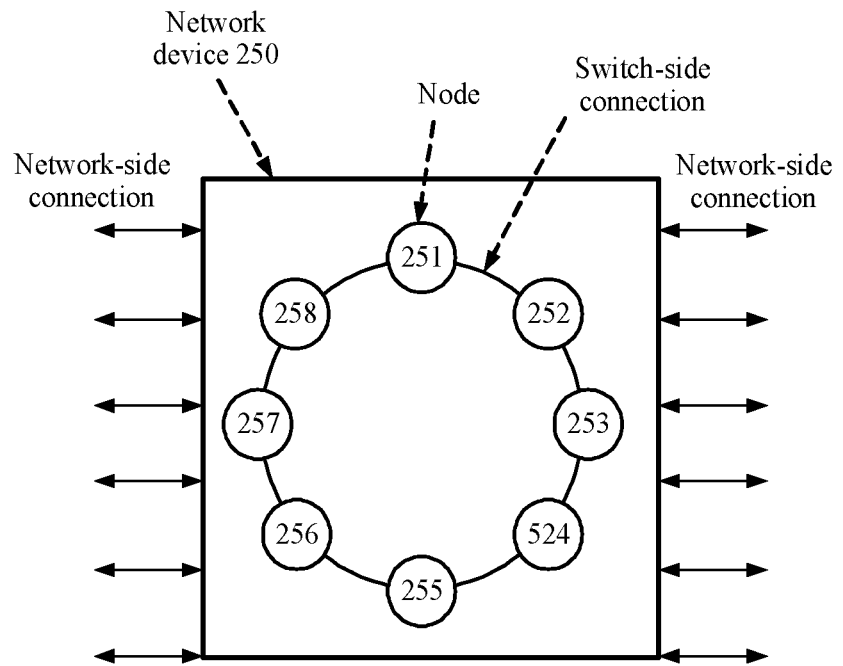
FIG. 2B is a schematic diagram of a structure of a network device according to an embodiment of this application.
Figure 2C:
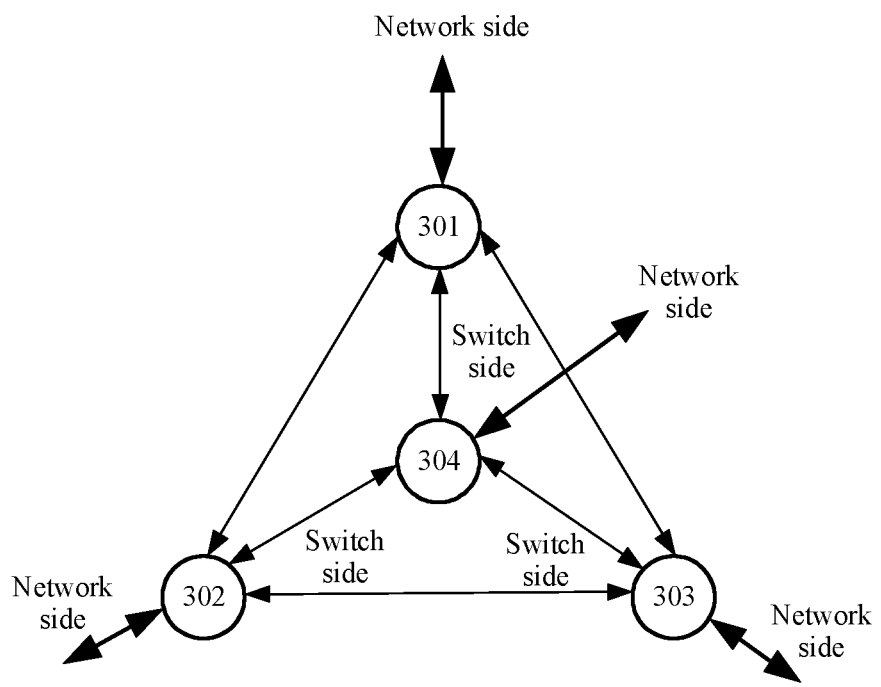
FIG. 2C is a schematic diagram of a structure of a network device according to an embodiment of this application.

The network device 250 shown in FIG. 2B is used as an example. If traffic 1 is transmitted in the network device 250, a source node is the node 251, and a destination node is the node 253, the traffic 1 in the network device 250 can be transmitted on two paths: a path 1 (namely, a shortest path): the node 251→the node 252→the node 253, and a path 2 (namely, a non-shortest path): the node 251→the node 258→the node 257→the node 256→the node 255→the node 254→the node 253. In the foregoing communications manner, the traffic 1 needs to be preferentially transmitted on the path 1. If congestion occurs on a single-hop link 1 (namely, a link between the node 251 and the node 252) and/or a single-hop link 2 (namely, a link between the node 252 and the node 253) on the path 1, it is determined that congestion occurs on the path 1. In this case, it may be first determined whether congestion occurs on the path 2 currently. If no congestion occurs, the traffic 1 is all transmitted on the non-congested path 2.

However, in the foregoing currently used communications manner, a quantity of network-side ports is relatively large, and the network device continuously receives and transmits traffic in the network device. After determining the non-congested path used to transmit the traffic, the network device cannot ensure that congestion does not occur when the traffic is transmitted on the non-congested path. Therefore, when traffic transmitted in the network device increases, the determined path used to transmit the traffic is likely to be congested. In this case, a node corresponding to a congested single-hop link buffers congested traffic. When a plurality of pieces of traffic are congested on the single-hop link, because the plurality of pieces of traffic are buffered simultaneously, the node corresponding to the congested single-hop link is likely to perform abnormal processing such as a packet loss on the buffered traffic. In this way, traffic cannot be normally transmitted between nodes of the network device.

Based on this, in the embodiments of this application, before traffic is transmitted in the network device, it is predetermined for the traffic whether there are sufficient bandwidths on a transmission path, and after it is determined that a granted bandwidth can be used to transmit the traffic on the transmission path, some traffic corresponding to the granted bandwidth in the traffic is transmitted on the transmission path based on the granted bandwidth. In this way, the bandwidth on the transmission path is predetermined for the traffic, so that the traffic can be transmitted based on the granted bandwidth on the path. This ensures that no congestion occurs during traffic transmission on the path, and can effectively avoid a problem that the traffic cannot be transmitted in the network device due to congestion on the path during traffic transmission in the current communications manner, to improve effectiveness and reliability of traffic transmission between nodes in the network device.

For example, a scenario is that the embodiments of this application may be used in the network device 250 shown in FIG. 2B. Assuming that a rate of traffic 2 is 0.5, a source node of the traffic 2 is the node 251, and a destination node of the traffic 2 is the node 254, the traffic 2 can be transmitted in the network device 250 on two paths: a path 3 (namely, a shortest path): the node 251→the node 252→the node 253→the node 254, and a path 4 (namely, a non-shortest path): the node 251→the node 258→the node 257→the node 256→the node 255→the node 254. It is assumed that remaining available bandwidths of the node 251→the node 252, the node 252→the node 253, and the node 253→the node 254 are 0.4, 0.5, and 0.6 respectively, and remaining available bandwidths of the node 251→the node 258, the node 258→the node 257, the node 257→the node 256, the node 256→the node 255, and the node 255→the node 254 are 0.2, 0.3, 0.5, 0.1, and 0.7 respectively.

According to a communications manner corresponding to the embodiments of this application, a process of transmitting the traffic 2 in the network device 250 may include: Step 1: Preferentially apply for a requested bandwidth 1 of 0.5 on the path 3 for the traffic 2, that is, apply for bandwidth grant from the remaining available bandwidths 0.4, 0.5, and 0.6 of the three single-hop links included in the path 3, to obtain granted bandwidths 0.4, 0.5, and 0.5 respectively. It may be finally determined that a target bandwidth 1 granted to the traffic 2 on the path 3 is 0.4. Step 2: Determine that a bandwidth has not been applied for a remaining rate (0.5−0.4)=0.1 of the traffic 2. Step 3: Apply for a requested bandwidth 2 of 0.1 on the path 4 for the traffic 2, that is, apply for bandwidth grant from the remaining available bandwidths 0.2, 0.3, 0.5, 0.1, and 0.7 of the five single-hop links included in the path 4, to obtain granted bandwidths 0.1, 0.1, 0.1, 0.1, and 0.1 respectively. It may be finally determined that a target bandwidth 2 granted to the traffic 2 on the path 4 is 0.1. Step 4: Transmit traffic 21 that is four-fifths of the traffic 2 to the destination node 254 on the path 3 based on the target bandwidth 1, and transmit traffic 22 that is remaining one-fifth of the traffic 2 to the destination node 254 on the path 4 based on the target bandwidth 2. In this way, it is ensured that the traffic 2 can be efficiently transmitted in the network device 250.

It should be noted that, for ease of description, in the embodiments of this application, the rate and the bandwidth of the traffic are represented by a number within 1.0, and the number generally refers to a network bandwidth under one standard. For example, 1.0 may be considered as one bandwidth share, and may represent a bandwidth of any value, such as 400 gigabits per second (Gbps) (Gbps is a unit of a switching bandwidth, and 1 Gbps indicates 1000 megabits per second) and 800 Gbps. If 1.0 indicates a 400 Gbps bandwidth, 0.5 indicates a 200 Gbps bandwidth.

It may be understood that the foregoing scenario is merely a scenario example provided in the embodiments of this application, and the embodiments of this application are not limited to this scenario.

Before the embodiments of this application are described, basic concepts and implementations in the embodiments of this application are first described.

It may be understood that the network device may be connected to external devices through a plurality of ports on the network device to exchange traffic. When traffic enters the network device from an external device through a port corresponding to a node of the network device, the node is a source node that transmits the traffic in the network device. When traffic is sent from the network device to an external device through a port corresponding to a node, the node is a destination node that transmits the traffic in the network device.

Traffic is transmitted on at least two paths in a network device that includes a plurality of nodes. For example, if the plurality of nodes in the network device form a ring network structure, any traffic entering the network device is transmitted on only two paths in the network device. In another example, if the plurality of nodes in the network device form a stereoscopic network structure, any traffic entering the network device is transmitted on more than two paths in the network device. Each path includes at least two nodes, and a link between adjacent nodes is referred to as a single-hop link. In other words, each path includes at least one single-hop link.

In an implementation, because all the nodes in the network device can simultaneously perform operations of receiving, transmitting, and sending traffic, a bandwidth of each single-hop link in the network device changes at any time. Based on this, to orderly and efficiently transmit traffic within the network device by applying for and granting a bandwidth on the single-hop link, the bandwidth of each single-hop link in the network device needs to be managed and controlled in real time.

A function of managing and controlling the bandwidth of each single-hop link in the network device may be implemented in the following manner: In a first possible implementation, the network device may include a management node, and the management node stores remaining available bandwidths of all single-hop links in the network device, and is configured to manage and allocate bandwidth resources of all the single-hop links in the network device. In a second possible implementation, each node in the network device independently stores a remaining available bandwidth of a single-hop link directly connected to the node, and each node independently manages and allocates a bandwidth resource of the single-hop link corresponding to the node.

In the first possible implementation, in one case, the management node may be a node that is in the network device and that dedicatedly manages and allocates the bandwidth resources of all the single-hop links in the network device. The management node does not participate in traffic transmission, but may exchange data with all nodes that are in the network device and that are configured to transmit traffic, and manages and allocates the bandwidth resources of all the single-hop links. In another case, the management node may alternatively be a node that is in the network device and that is configured to transmit traffic, and the node also has a function of managing and allocating the bandwidth resources of all the single-hop links in the network device. It may be understood that there may be one or more management nodes, and each management node manages a bandwidth resource of a single-hop link corresponding to the management node. For detailed descriptions in which the management node manages and allocates the bandwidth resources of all the single-hop links, refer to related descriptions of the embodiments corresponding to S11 to S14 or S21 to S24 in the embodiment shown in FIG. 3.

In the second possible implementation, each node may respond to only a request for a bandwidth resource of a single-hop link corresponding to the node, and use a remaining available bandwidth of the single-hop link corresponding to the node as a granted bandwidth resource. However, the node does not process a request for a bandwidth resource of another single-hop link, and directly forwards the request to a node corresponding to the single-hop link of the requested bandwidth resource until the request reaches the node corresponding to the single-hop link of the requested bandwidth resource, and the node corresponding to the single-hop link of the requested bandwidth resource grants a bandwidth. For detailed descriptions in which each node manages and allocates the bandwidth resource of each single-hop link, refer to related descriptions of the embodiments corresponding to S31 to S34, S41 to S45, S51 to S56, or S61 to S66 in the embodiment shown in FIG. 3.

The following describes in detail an implementation of the communications method in the embodiments of this application by using an embodiment with reference to an accompanying drawing.

Figure 3:
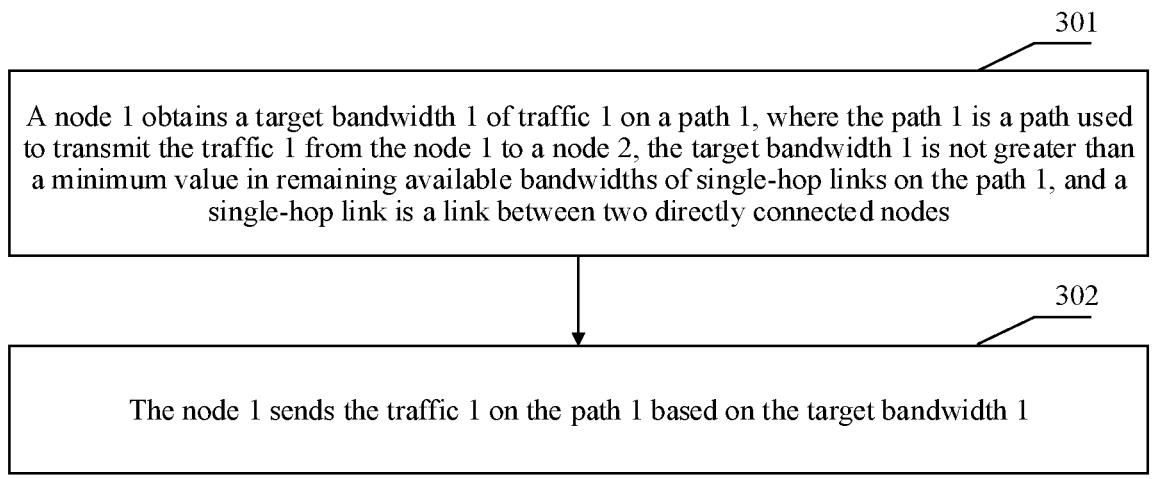
FIG. 3 is a schematic flowchart of a communications method according to an embodiment of this application.

FIG. 3 is a schematic flowchart of a communications method according to an embodiment of this application. Refer to FIG. 3, the method is performed by a node 1 in a network device, and the network device may further include a node 2. The nodes of the network device may form a ring network structure or a stereoscopic network structure. The ring network structure means that each node in the network device has only two adjacent nodes, and the stereoscopic network structure means that each node in the network device is connected to at least three other nodes. When traffic 1 enters the network device, the traffic 1 is transmitted from the node 1 to the node 2, and is transmitted to another network device through an egress port on the node 2. The method for transmitting the traffic 1 in the network device may include, for example, step 301 and step 302.

Step 301: The node 1 obtains a target bandwidth 1 of the traffic 1 on a path 1, where the path 1 is a path used to transmit the traffic 1 from the node 1 to the node 2, the target bandwidth 1 is not greater than a minimum value in remaining available bandwidths of single-hop links on the path 1, and a single-hop link is a link between two directly connected nodes.

It may be understood that the node 1 is used as a source node of the traffic 1 in the network device. After the node 1 receives the traffic 1, to ensure that the traffic 1 can be effectively transmitted in the network device, the node 1 may request a bandwidth resource for the traffic 1, and transmit the traffic 1 based on a granted bandwidth resource.

If a management node in the network device manages and allocates remaining available bandwidths of single-hop links in the network device, in one case, the path 1 may be determined by the node 1 for the traffic 1. After receiving the traffic 1, the node 1 determines, based on information carried in the traffic 1, that a source node is the node 1 and a destination node is the node 2, and calculates the path 1. In another case, the path 1 may alternatively be determined by the management node for the traffic 1. After receiving the traffic 1, the node 1 sends a bandwidth request message to the management node, where the bandwidth request message carries information about a source node and a destination node of the traffic 1. The management node may determine the path 1 for the traffic 1 based on the bandwidth request message. If each node independently manages and allocates a remaining available bandwidth of each single-hop link in the network device, after receiving the traffic 1, the node 1 may calculate the path 1 based on information about a source node and a destination node carried in the traffic 1. It should be noted that in this embodiment of this application, an example in which the path 1 is one path from the node 1 to the node 2 is used for description. The path 1 may be one path from the node 1 to the node 2, or may indicate a plurality of paths from the node 1 to the node 2. This is not limited in this embodiment of this application.

If the management node manages and allocates the bandwidth resources of the single-hop links in the network device, step 301 may be implemented in the following implementations.

In some possible implementations, the node 1 may obtain link bandwidths 1 of the single-hop links on the path 1, and determine a minimum value in the link bandwidths 1 of the single-hop links as the target bandwidth 1.

In an example, step 301 may include: S11: After the node 1 receives the traffic 1, the node 1 sends a bandwidth request message 1 to the management node, where the bandwidth request message 1 carries information that indicates a rate 1 of the traffic 1, and is used to request bandwidth resources from the management node for the traffic 1. S12: The management node allocates link granted bandwidths 1 to the traffic 1 on the single-hop links from the remaining available bandwidths of the single-hop links corresponding to the path 1, where a link granted bandwidth 1 allocated on a single-hop link is not greater than a minimum value in the rate of the traffic 1 and a remaining available bandwidth of the single-hop link, that is, the link granted bandwidth $1 \leq \min\{$the rate of the traffic 1, the remaining available bandwidth$\}$. S13: The management node determines the target bandwidth 1 based on the link granted bandwidths 1 of the single-hop links on the path 1. S14: The management node sends the target bandwidth 1 to the node 1. The path 1 may be determined by the management node, or may be determined by the node 1 and carried in the bandwidth request message 1.

It may be understood that, in one case, the information that indicates the rate of the traffic 1 may be the rate of the traffic 1. In another case, if the bandwidth request message 1 is periodically sent, the information that indicates the rate of the traffic 1 may alternatively be a to-be-sent data amount of the traffic 1 in a next periodicity. In this embodiment of this application, an example in which the information that indicates the rate of the traffic 1 is the rate of the traffic 1 is used for description.

S12 may be implemented in at least two implementations. In one implementation, the management node may simultaneously allocate the link granted bandwidths 1 to the traffic 1 on the single-hop links on the path 1. A process may include: S12*a*1: The management node simultaneously applies for bandwidth resources each with a value that is the rate of the traffic 1 for the traffic 1 on the single-hop links on the path 1, to obtain link granted bandwidths 2, where a link granted bandwidth 2 of each single-hop link is a minimum value in a remaining available bandwidth of the single-hop link and the rate of the traffic 1, and the link granted bandwidths 2 of the single-hop links may be equal or unequal. S12*a*2: The management node selects a minimum value from the link granted bandwidths 2 of the single-hop links as a link granted bandwidth 1 allocated by the management node to the traffic 1 on the path 1. In the other implementation, the management node may alternatively separately allocate the link granted bandwidths 1 to the traffic 1 on the single-hop links on the path 1. A process may include: S12*b*1: The management node applies for a requested bandwidth 1 for the traffic 1 on a single-hop link 1 from the node 1 to a node 3 on the path 1 (a value of the requested bandwidth 1 may be the rate of the traffic 1), to obtain a link granted bandwidth 2, where the link granted bandwidth 2 is a minimum value in a remaining available bandwidth of the single-hop link 1 and the requested bandwidth 1. S12*b*2: The management node applies for a requested bandwidth 2 for the traffic 1 on a single-hop link 2 from the node 3 to a node 4 on the path 1, to obtain a link granted bandwidth 3, where the requested bandwidth 2 is not greater than the link granted bandwidth 2, the requested bandwidth 2 is usually equal to the link granted bandwidth 2, and the link granted bandwidth 3 is a minimum value in a remaining available bandwidth of the single-hop link 2 and the requested bandwidth 2. By analogy, S12*bn*: The management node applies for a requested bandwidth n for the traffic 1 on a single-hop link n from a node (n+1) to the node 2 on the path 1, to obtain the link granted bandwidth (n+1), where the requested bandwidth n is not greater than a link granted bandwidth n, the requested bandwidth n is usually equal to the link granted bandwidth n, and the link granted bandwidth (n+1) is a minimum value in a remaining available bandwidth of the single-hop link n and the requested bandwidth n. S12*b*(n+1): The management node determines that the link granted bandwidth (n+1) is a link granted bandwidth 1 allocated by the management node to the traffic 1 on the path 1.

Regardless of S12 is implemented by "S12*a*1 and S12*a*2" or by "S12*b*1 to S12*b* (n+1)", S13 may be: The management node directly uses the link granted bandwidth 1 allocated to the traffic 1 on the path 1 as the target bandwidth 1.

Figure 4:
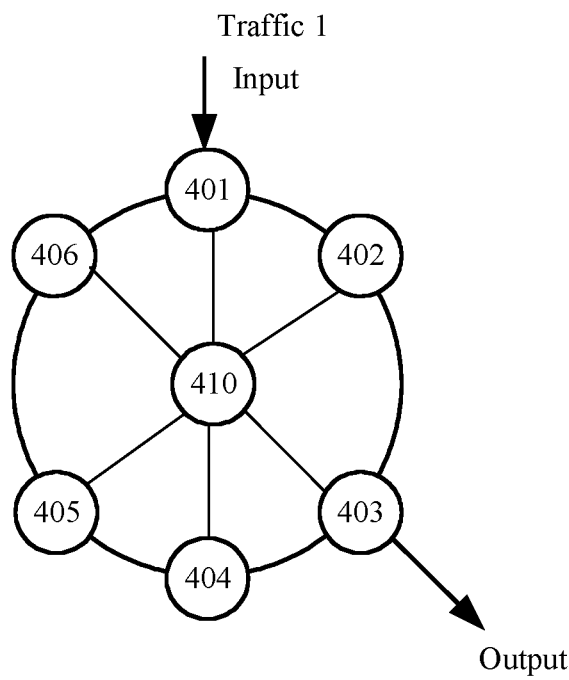
FIG. 4 is a schematic diagram of a structure of a six-node network device according to an embodiment of this application.

For example, a network device 400 shown in FIG. 4 is used as an example. The network device 400 includes a node 401 to a node 406 and a node 410, and the node 410 is a management node of the network device. It is assumed that the node 401 receives the traffic 1, the rate of the traffic 1 is 0.5, a destination node is the node 403, the path 1 corresponds to a path: the node 401→the node 402→the node 403, and remaining available bandwidths that are of the node 401→the node 402 and the node 402→the node 403 on the path and that are stored on the node 410 are 0.4 and 0.3 respectively. If S12 is implemented by "S12*a*1 and S12*a*2", the S12 may include: The node 410 determines, based on 0.5 and 0.4, that a link granted bandwidth of the node 401→the node 402 is 0.4. Similarly, the node 410 determines, based on 0.5 and 0.3, that a link granted bandwidth of the node 402→the node 403 is 0.3. Next, the node 410 determines, based on the link granted bandwidth 0.4 and the link granted bandwidth 0.3, that a target bandwidth is 0.3. If S12 is implemented by "S12*b*1 to S12*b* (n+1)", the S12 may include: The node 410 determines, based on 0.5 and 0.4, that a link granted bandwidth of the node 401→the node 402 is 0.4. Similarly, the node 410 determines, based on 0.4 and 0.3, that a link granted bandwidth of the node 402→the node 403 is 0.3. Next, the node 410 directly determines the link granted bandwidth 0.3 as a target bandwidth 0.3.

In some other possible implementations, the target bandwidth 1 may be determined based on a port granted bandwidth 1 of the egress port on the node 2 and a link granted bandwidth 1 on the path 1, where the egress port on the node 2 is an egress port through which the node 2 is connected to another network device.

In an example, if the management node further stores remaining available bandwidths of egress ports through which the nodes in the network device are connected to other network devices, step 301 may include: S21: The node 1 sends a bandwidth request message 1 to the management node, where the bandwidth request message 1 carries information that indicates a rate of the traffic 1, and is used to request, from the management node, a bandwidth resource with a bandwidth value that is the rate of the traffic 1. S22: The management node allocates, to the traffic 1, the port granted bandwidth 1 corresponding to the egress port on the node 2 and the link granted bandwidth 1 on the path 1 respectively from a remaining available bandwidth of the egress port on the node 2 and the remaining available bandwidths of the single-hop links corresponding to the path 1. S23: The management node determines the target bandwidth 1 based on the port granted bandwidth 1 and the link granted bandwidth 1. S24: The management node sends the target bandwidth 1 to the node 1.

There may be a plurality of possible implementations of S22.

In an implementation, S22 may include: S22*a*1: The management node first allocates the port granted bandwidth 1 to the traffic 1 from the remaining available bandwidth of the egress port on the node 2, where the port granted bandwidth 1 is a minimum value in the remaining available bandwidth of the egress port and the rate of the traffic 1. S22*a*2: The management node allocates the link granted bandwidths 1 to the traffic 1 from the remaining available bandwidths of the single-hop links on the path 1, where the link granted bandwidth 1 of each single-hop link is not greater than a minimum value in the port granted bandwidth 1 and the remaining available bandwidth of the single-hop link. S22*a*3: The management node determines the target bandwidth 1 based on the link granted bandwidths 1 of the single-hop links on the path 1. An implementation of S22*a*2 may be as follows: The management node simultaneously allocates the link granted bandwidths 1 to the traffic 1 on the single-hop links on the path 1 based on the port granted bandwidth 1 and the remaining available bandwidths of the single-hop links. For an implementation, refer to related descriptions of "S12*a*1 and S12*a*2" in the foregoing embodiment. Alternatively, the management node may separately allocate the link granted bandwidths 1 to the traffic 1 on the single-hop links on the path 1. The management node determines a link granted bandwidth of the first single-hop link based on the port granted bandwidth 1 and a remaining available bandwidth of the first single-hop link, then determines a link granted bandwidth of the second single-hop link based on the link granted bandwidth of the first single-hop link and a remaining available bandwidth of the second single-hop link, and so on. For an implementation, refer to related descriptions of "S12*b*1 to S12*b* (n+1)" in the foregoing embodiment.

The network device 400 in FIG. 4 is still used as an example. It is assumed that the node 401 receives the traffic 1, the rate of the traffic 1 is 0.5, a destination node is the node 403, the path 1 corresponds to a path: the node 401→the node 402→the node 403, and remaining available bandwidths that are of the node 401→the node 402 and the node 402→the node 403 on the path and that are stored on the node 410 are 0.4 and 0.3 respectively, and a remaining available bandwidth of an egress port on the node 403 is 0.2. A process in which S22 is implemented by "S22a1 to S22a3" may include: The node 410 determines, based on 0.2 and 0.5, that a port granted bandwidth is 0.2. Next, the node 410 determines, based on 0.2 and 0.4, that a link granted bandwidth of the node 401→the node 402 is 0.2. Similarly, the node 410 determines, based on 0.2 and 0.3, that a link granted bandwidth of the node 402→the node 403 is 0.2. Finally, the node 410 determines the link granted bandwidth 0.2 as a target bandwidth, that is, 0.2.

In another implementation, S22 may include: S22b1: The management node first allocates link granted bandwidths 1 to the traffic 1 from the remaining available bandwidths of the single-hop links on the path 1, where a link granted bandwidth 1 of each single-hop link is not greater than a minimum value in the rate of the traffic 1 and a remaining available bandwidth of the single-hop link. S22b2: The management node allocates the port granted bandwidth 1 to the traffic 1 from the remaining available bandwidth of the egress port on the node 2, where the port granted bandwidth 1 is a minimum value in the remaining available bandwidth of the egress port and a minimum link granted bandwidth 1 of the single-hop links. S22b3: The management node determines the target bandwidth 1 based on the port granted bandwidth 1.

The network device 400 in FIG. 4 is still used as an example. It is assumed that the node 401 receives the traffic 1, the rate of the traffic 1 is 0.5, a destination node is the node 403, the path 1 corresponds to a path: the node 401→the node 402→the node 403, and remaining available bandwidths that are of the node 401→the node 402 and the node 402→the node 403 on the path and that are stored on the node 410 are 0.4 and 0.3 respectively, and a remaining available bandwidth of an egress port on the node 403 is 0.2. A process in which S22 is implemented by "S22b1 to S22b3" may include: The node 410 determines, based on 0.5 and 0.4, that a link granted bandwidth of the node 401→the node 402 is 0.4. Similarly, the node 410 determines, based on 0.5 and 0.3, that a link granted bandwidth of the node 402→the node 403 is 0.3. Next, the node 410 determines a minimum value in the link granted bandwidths, that is, 0.3. Then, the node 410 determines, based on 0.3 and 0.2, that a port granted bandwidth is 0.2. Finally, the node 410 determines the port granted bandwidth 0.2 as a target bandwidth, that is, 0.2.

In still another implementation, in S22, the management node may simultaneously allocate the link granted bandwidth 1 and the port granted bandwidth 1 to the traffic 1. A process may include: S22c1: The management node summarizes the remaining available bandwidths of the single-hop links on the path 1, obtains a minimum value in the remaining available bandwidths of the single-hop links, and uses the minimum value as a new requested bandwidth 1. S22c2: The management node allocates the port granted bandwidth 1 to the traffic 1 from the remaining available bandwidth of the egress port on the node 2, where the port granted bandwidth 1 is a minimum value in the remaining available bandwidth of the egress port and the new requested bandwidth 1. S22c3: The management node allocates link granted bandwidths 1 to the traffic 1 from the remaining available bandwidths of the single-hop links on the path 1, where the link granted bandwidth 1 of each single-hop link is not greater than a minimum value in the port granted bandwidth 1 and the remaining available bandwidth of the single-hop link. S22c4: The management node determines the target bandwidth 1 based on the link granted bandwidths 1.

The network device 400 in FIG. 4 is still used as an example. It is assumed that the node 401 receives the traffic 1, the rate of the traffic 1 is 0.5, a destination node is the node 403, the path 1 corresponds to a path: the node 401→the node 402→the node 403, and remaining available bandwidths that are of the node 401→the node 402 and the node 402→the node 403 on the path and that are stored on the node 410 are 0.4 and 0.3 respectively, and a remaining available bandwidth of an egress port on the node 403 is 0.2. A process in which S22 is implemented by "S22c1 to S22c4" may include: The node 410 determines a smaller value in 0.4 and 0.3 as a new requested bandwidth, that is, determines that the new requested bandwidth is 0.3. Then, the node 410 determines, based on 0.2 and 0.3, that a port granted bandwidth is 0.2. Next, the node 410 determines, based on 0.2 and 0.4, that a link granted bandwidth of the node 401→the node 402 is 0.2. Similarly, the node 410 determines, based on 0.2 and 0.3, that a link granted bandwidth of the node 402→the node 403 is 0.2. Finally, the node 410 determines the link granted bandwidth 0.2 as a target bandwidth, that is, 0.2.

In another example, if the management node does not store remaining available bandwidths of egress ports through which the nodes in the network device are connected to other network devices, and each node stores the remaining available bandwidth of the egress port on the node, in one case, step 301 may include: The node 1 requests and obtains the link granted bandwidth 1 on the path 1 from the management node, requests and obtains the port granted bandwidth 1 of the egress port from the destination node 2, and the node 1 or the management node receives the port granted bandwidth 1 sent by the destination node 2, and determines the target bandwidth 1 based on the port granted bandwidth 1 and the link granted bandwidth 1.

The network device 400 in FIG. 4 is still used as an example. It is assumed that the node 401 receives the traffic 1, the rate of the traffic 1 is 0.5, a destination node is the node 403, the path 1 corresponds to a path: the node 401→the node 402→the node 403, and remaining available bandwidths that are of the node 401→the node 402 and the node 402→the node 403 on the path and that are stored on the node 410 are 0.4 and 0.3 respectively, and a remaining available bandwidth of an egress port on the node 403 is 0.2. In one case, a process of obtaining the target bandwidth 1 may include: The node 401 applies to the node 410 for a bandwidth 0.5 on the path 1, to obtain a link granted bandwidth 1 of 0.3. Then, the node 401 applies to the node 403 for a bandwidth 0.3 on the egress port, to obtain a port granted bandwidth 1 of 0.2. Finally, the node 401 determines the port granted bandwidth 0.2 as a target bandwidth, that is, 0.2. In another case, a process of obtaining the target bandwidth 1 may include: The node 401 applies to the node 403 for a bandwidth 0.5 on the egress port, to obtain a port granted bandwidth 1 of 0.2. Then, the node 401 applies to the node 410 for a bandwidth 0.2 on the path 1, to obtain a link granted bandwidth 1 of 0.2. Finally, the node 401 determines the link granted bandwidth 0.2 as a target bandwidth, that is, 0.2. In still another case, a process of obtaining the target bandwidth 1 may include: The node 410 summarizes a minimum value, that is, 0.3, in the remaining available bandwidths of the two single-hop links on the path 1, and sends the minimum value to the node 401. Next, the node 401 applies to the node 403 for a bandwidth 0.3 on the egress port, to obtain a port granted bandwidth 1 of 0.2. Then, the node 401 applies to the node 410 for a bandwidth 0.2 on the path 1, to obtain a link granted bandwidth 1 of 0.2. Finally, the node 401 determines the link granted bandwidth 0.2 as a target bandwidth, that is, 0.2.

In the example in which each node stores the remaining available bandwidth of the egress port on the node, in another case, step 301 may further include: The node 1 requests and obtains the link granted bandwidth 1 on the path 1 from the management node, where the link granted bandwidth 1 is a minimum value in the rate of the traffic 1 and the remaining available bandwidths of the single-hop links on the path 1. The management node requests the port granted bandwidth 1 of the egress port on the node 2 from the destination node 2, where the port granted bandwidth 1 is a minimum value in the remaining available bandwidth of the egress port on the node 2 and the link granted bandwidth 1. The destination node 2 may send the port granted bandwidth 1 to the node 1. The node 1 may directly use the port granted bandwidth 1 as the target bandwidth 1.

In still another case, step 301 may alternatively include: The node 1 requests and obtains the port granted bandwidth 1 of the egress port on the node 2 from the destination node 2, where the port granted bandwidth 1 is a minimum value in the remaining available bandwidth of the egress port on the node 2 and the rate of the traffic 1. The destination node 2 requests and obtains the link granted bandwidth 1 on the path 1 from the management node, where the link granted bandwidth 1 is a minimum value in the port granted bandwidth 1 and the remaining available bandwidths of the single-hop links on the path 1. The management node sends the link granted bandwidth 1 to the node 1. The node 1 may directly use the link granted bandwidth 1 as the target bandwidth 1.

It should be noted that, for an application sequence and different application policies that appear according to different application sequences, refer to descriptions of application from the management node. Details are not described herein again.

It should be noted that in the foregoing implementations in the scenario in which the management node manages and allocates the bandwidth resources of the single-hop links in the network device, the management node is responsible only for managing and allocating the bandwidth resources in the network device, but does not participate in traffic transmission in the network device. However, in other examples, the management node may alternatively be any common node that participates in traffic transmission in the network device. For example, the node 1 is a management node. In this case, step 301 may include: The node 1 determines the target bandwidth 1 of the traffic 1 on the path 1 based on the stored remaining available bandwidths of the single-hop links on the path 1. In an instance, the target bandwidth 1 may be determined in consideration of only the link granted bandwidth 1 on the path 1, and whether the egress port on the destination node 2 has sufficient remaining available bandwidths is not considered. The link granted bandwidth 1 is used as the target bandwidth 1, and the target bandwidth 1 (namely, the link granted bandwidth 1) is a minimum value in the rate of the traffic 1 and the remaining available bandwidths of the single-hop links on the path 1. In another instance, the target bandwidth 1 may alternatively be determined based on the remaining available bandwidths of the single-hop links on the path 1 and the remaining available bandwidth of the egress port on the destination node 2. In this case, in a first implementation, the node 1 sends a bandwidth request message 1 to the destination node 2, where the bandwidth request message 1 includes information that indicates the rate of the traffic 1. The destination node 2 determines a port granted bandwidth 1 for the traffic 1, where the port granted bandwidth 1 is a minimum value in the remaining available bandwidth of the egress port on the node 2 and the rate of the traffic 1. Then, the destination node 2 may send the port granted bandwidth 1 to the node 1. The node 1 may obtain the target bandwidth 1 based on the stored remaining available bandwidths of the single-hop links on the path 1 and the port granted bandwidth 1, where the target bandwidth 1 is a minimum value in the port granted bandwidth 1 and the remaining available bandwidths of the single-hop links on the path 1. In a second implementation, the node 1 obtains a link granted bandwidth 2 based on the stored remaining available bandwidths of the single-hop links on the path 1 and the rate of the traffic 1, where the link granted bandwidth 2 is a minimum value in the remaining available bandwidths of the single-hop links on the path 1 and the rate of the traffic 1. Then, the node 1 may send a bandwidth request message 2 to the destination node 2, where the bandwidth request message 2 includes the link granted bandwidth 2. The destination node 2 determines a port granted bandwidth 2 for the traffic 1, where the port granted bandwidth 2 is a minimum value in the remaining available bandwidth of the egress port on the node 2 and the link granted bandwidth 2. Then, the destination node 2 may send the port granted bandwidth 2 to the node 1. The node 1 may directly determine the port granted bandwidth 2 as the target bandwidth 1. It can be learned that regardless of whether the management node is a node that is responsible only for managing and allocating the bandwidth resources in the network device but does not participate in traffic transmission in the network device, or a node that is responsible for managing and allocating the bandwidth resources in the network device and also participates in traffic transmission in the network device, a process in which the management node manages and allocates the bandwidth resources in the network device and a manner in which the management node manages and allocates transmission of traffic in the network device each are similar.

It should be noted that, in some scenarios, there may be a plurality of paths between the node 1 and the destination node 2, and there may be more than one path that can provide the target bandwidth for the traffic 1. In the paths that can provide the target bandwidth for the traffic 1, a target bandwidth 1 provided for the traffic 1 on a path may be less than the rate of the traffic 1. In this case, the target bandwidth may be applied for on a plurality of paths that can provide the target bandwidth for the traffic 1. That is, a minimum value in remaining available bandwidths of single-hop links on each of the plurality of paths that can provide the target bandwidth for the traffic 1 is used as a link granted bandwidth of the path, and a sum of the link granted bandwidths corresponding to the paths is used as a total target bandwidth finally applied for the traffic 1. In other words, in one case, the path 1 in this embodiment of this application may be considered as the plurality of paths that can provide the target bandwidth for the traffic 1, and the target bandwidth 1 is the sum of the granted target bandwidths of the plurality of paths. In another case, any one of the plurality of paths that can provide the target bandwidth for the traffic 1 may be used as the path 1. The method provided in this embodiment of this application is performed once. That is, a path that can provide the target bandwidth for the traffic 1 is first used as the path 1, and a target bandwidth 1 is applied for. If the target bandwidth 1 that is applied for is less than the rate of the traffic 1, another path that can provide the target bandwidth for the traffic 1 may be further used as the path 1, and a target bandwidth 2 is applied for. If a sum of the target bandwidth 1 that is applied for and the target bandwidth 2 that is applied for is still less than the rate of the traffic 1, another path that can provide the target bandwidth for the traffic 1 is further used as the path 1 to apply for more target bandwidths, until a sum of all target bandwidths that are applied for reaches the rate of the traffic 1 or target bandwidths are applied for on all the paths that can provide the target bandwidth for the traffic 1.

It should be noted that, when the management node allocates the bandwidth resources on the path 1 to the traffic 1, if a remaining available bandwidth of at least one of the single-hop links on the path 1 is zero, this embodiment of this application may further include: The node 1 obtains an allocation failure notification message, where the allocation failure notification message is used to notify the node 1 that a bandwidth cannot be allocated to the traffic 1 on the path 1. In this way, a process in which the node 1 applies for and obtains the target bandwidth 1 for the traffic 1 on the path 1 in any one of the foregoing implementations can be reduced, so that it is convenient to apply for a bandwidth resource on another path that has an effective bandwidth resource for the traffic 1, and traffic transmission efficiency can be improved to some extent.

It should be noted that in the scenario in which the management node manages and allocates the bandwidth resources of the single-hop links in the network device, regardless of whether the management node simultaneously allocates the link granted bandwidths 1 to the single-hop links on the path 1 or the management node allocates the link granted bandwidth 1 hop by hop, after obtaining the target bandwidth 1, the management node may update the remaining available bandwidths of all the single-hop links that are stored on the management node. The target bandwidth 1 is subtracted from the remaining bandwidth that is of each single-hop link on the path 1 and that exists before the target bandwidth 1 is allocated to the traffic 1, to obtain a difference, and the difference is used as an updated remaining available bandwidth of each single-hop link.

In this way, in this scenario, before traffic is transmitted in the network device, bandwidth resources of a switch-side link and an egress port on a transmission path are applied for in advance for the traffic, and an allocated link granted bandwidth and a port granted bandwidth corresponding to the egress port on the destination node are obtained. It can be ensured that the traffic is subsequently transmitted without congestion on the path and effectively transmitted to another network device through the egress port. This provides a data basis for step 302 below.

If each node manages and allocates a bandwidth resource of a single-hop link corresponding to the node, step 301 may be implemented in the following implementations.

In some possible implementations, step 301 may include: S31: After the node 1 receives the traffic 1, the node 1 determines the path 1 used to transmit the traffic 1. S32: The node 1 sends a bandwidth request message to a node corresponding to each single-hop links on the path 1, where the bandwidth request message carries information that indicates a rate of the traffic 1, for example, the rate of the traffic 1. S33: The node corresponding to each single-hop link pre-allocates a link granted bandwidth 1 to the traffic 1, and sends the link granted bandwidth 1 to the node 1. S34: The node 1 determines the target bandwidth 1 from the link granted bandwidths 1 corresponding to the single-hop links.

Figure 5:
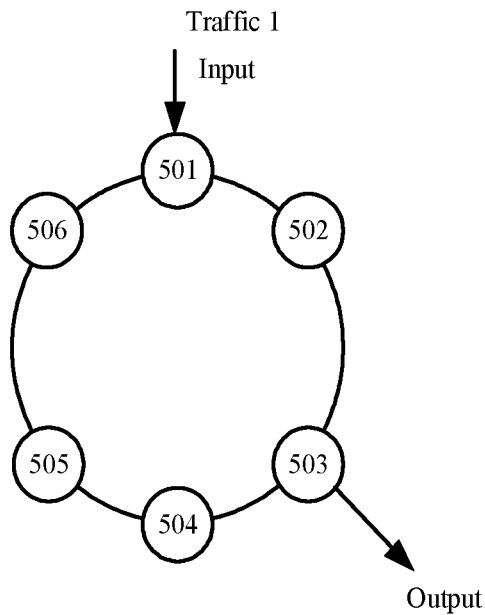
FIG. 5 is a schematic diagram of a structure of another six-node network device according to an embodiment of this application.

A network device 500 shown in FIG. 5 is used as an example. The network device 500 includes a node 501 to a node 506. The node 501 stores a remaining available bandwidth of the node 506→the node 501, and the node 502 stores a remaining available bandwidth of the node 501→the node 502, the node 503 stores a remaining available bandwidth of the node 502→the node 503, and so on. Each node stores a remaining available bandwidth of a single-hop link corresponding to the node. It is assumed that the node 501 receives the traffic 1, the rate of the traffic 1 is 0.5, a destination node is the node 503, the path 1 corresponds to a path: the node 501→the node 502→the node 503, and remaining available bandwidths of the node 501→the node 502 and the node 502→the node 503 are 0.4 and 0.3 respectively. A process of S31 to S34 may include: The node 501 applies to the node 502 for a requested bandwidth 0.5 on the node 501→the node 502, and applies to the node 503 for a requested bandwidth 0.5 on the node 502→the node 503. Next, the node 502 returns a link granted bandwidth 1 of 0.4 to the node 501, and the node 503 returns a link granted bandwidth 1 of 0.3 to the node 501. Then, the node 501 selects smaller 0.3 from 0.4 and 0.3 as a target bandwidth 1.

It should be noted that, in the scenario in which each node manages and allocates a bandwidth resource of a single-hop link corresponding to the node in this embodiment of this application, a single-hop link (namely, a single-hop link corresponding to each node) whose bandwidth resource is managed and allocated by each node may be a single-hop link using the node as an endpoint. In a first case, a single-hop link corresponding to each node may be one single-hop link between the node and any adjacent node. For example, in the foregoing example, a single-hop link corresponding to the node 501 is a single-hop link between the node 501 and the node 506 adjacent to the node 501, a single-hop link corresponding to the node 502 is a single-hop link between the node 502 and the node 501 adjacent to the node 502, and so on. In a second case, a single-hop link corresponding to each node may alternatively be all single-hop links from the node to all adjacent nodes. For example, in FIG. 5, single-hop links corresponding to the node 501 are two single-hop links: the node 501→the node 506 and the node 501→the node 502; single-hop links corresponding to the node 502 are two single-hop links: the node 502→the node 501 and the node 502→the node 503; single-hop links corresponding to the node 503 are two single-hop links: the node 503→the node 502 and the node 503→the node 504; and so on. Each node stores remaining available bandwidths of single-hop links corresponding to the node. In this case, it is assumed that the node 501 receives the traffic 1, the rate of the traffic 1 is 0.5, the destination node is the node 503, the path 1 corresponds to a path: the node 501→the node 502→the node 503, and remaining available bandwidths of the node 501→the node 502 and the node 502→the node 503 are 0.4 and 0.3 respectively. A process of S31 to S34 may include: The node 501 applies for a requested bandwidth 0.5 for the traffic 1 from the remaining available bandwidth of the node 501→the node 502 stored on the node 501, and applies to the node 502 for a requested bandwidth 0.5 on the node 502→the node 503. Next, the node 501 determines a link granted bandwidth 1 of 0.4 granted on the node 501→the node 502, and the node 502 returns a link granted bandwidth 1 of 0.3 granted on the node 502→the node 503 to the node 501. Then, the node 501 selects smaller 0.3 from 0.4 and 0.3 as a target bandwidth 1. In a third case, a single-hop link corresponding to each node may alternatively be all single-hop links from all adjacent nodes to the node. For example, in FIG. 5, single-hop links corresponding to the node 501 are two single-hop links: the node 506→the node 501 and the node 502→the node 501; single-hop links corresponding to the node 502 are two single-hop links: the node 501→the node 502 and the node 503→the node 502; single-hop links corresponding to the node 503 are two single-hop links: the node 502→the node 503 and the node 504→the node 503; and so on. Each node stores remaining available bandwidths of single-hop links corresponding to the node. In this case, it is assumed that the node 501 receives the traffic 1, the rate of the traffic 1 is 0.5, the destination node is the node 503, the path 1 corresponds to a path: the node 501→the node 502→the node 503, and remaining available bandwidths of the node 501→the node 502 and the node 502→the node 503 are 0.4 and 0.3 respectively. A process of S31 to S34 may include: The node 501 applies to the node 502 for a requested bandwidth 0.5 on the node 501→the node 502, and applies to the node 503 for a requested bandwidth 0.5 on the node 502→the node 503. Next, the node 502 returns, to the node 501, a link granted bandwidth 1 of 0.4 granted on the node 501→the node 502, and the node 503 returns, to the node 501, a link granted bandwidth 1 of 0.3 granted on the node 502→the node 503. Then, the node 501 selects smaller 0.3 from 0.4 and 0.3 as a target bandwidth 1.

In some other possible implementations, step 301 may include: S41: After the node 1 receives the traffic 1, the node 1 determines the path 1 used to transmit the traffic 1. S42: The node 1 applies to an egress port on the destination node 2 for a requested bandwidth 1, and the node 1 applies to a node corresponding to each single-hop link for a requested bandwidth 1, where the requested bandwidth 1 may be a rate of the traffic 1. S43: The destination node 2 sends a granted port granted bandwidth 1 to the node 1. S44: The node corresponding to each single-hop link on the path 1 sends a granted link granted bandwidth 1 to the node 1. S45: The node 1 determines the target bandwidth 1 based on the port granted bandwidth 1 and the link granted bandwidths 1 corresponding to the single-hop links. The node 1 uses a minimum value in the port granted bandwidth 1 and the link granted bandwidths 1 corresponding to the single-hop links as the target bandwidth 1.

The network device 500 shown in FIG. 5 is still used as an example. It is assumed that the node 501 receives the traffic 1 whose rate is 0.5, the destination node is the node 503, the path 1 corresponds to a path: the node 501→the node 502→the node 503, remaining available bandwidths of the node 501→the node 502 and the node 502→the node 503 are 0.4 and 0.3 respectively, and a remaining available bandwidth of an egress port on the node 503 is 0.2. A process of S41 to S45 may include: The node 501 applies to the node 502 for a requested bandwidth 0.5 on the node 501→the node 502, applies to the node 503 for a requested bandwidth 0.5 on the node 502→the node 503, and applies to the node 503 for a requested bandwidth 0.5 on the egress port. Next, the node 502 returns a link granted bandwidth 1 of 0.4 to the node 501, and the node 503 returns a link granted bandwidth 1 of 0.3 and a port granted bandwidth 1 of 0.2 to the node 501. Then, the node 501 selects a minimum 0.2 from 0.4, 0.3, and 0.2 as a target bandwidth 1.

In still other possible implementations, step 301 may include: S51: After the node 1 receives the traffic 1, the node 1 determines the path 1 used to transmit the traffic 1. S52: The node 1 applies to an egress port on the destination node 2 for a requested bandwidth 1, where the requested bandwidth 1 may be a rate of the traffic 1. S53: The destination node 2 obtains a port granted bandwidth 1 on the egress port on the node 2, and sends the granted port granted bandwidth 1 to the node 1, where the port granted bandwidth 1 is a minimum value in a remaining available bandwidth of the egress port on the node 2 and the rate of the traffic 1. S54: The node 1 applies to a node corresponding to each single-hop link for a bandwidth resource with a value equal to the port granted bandwidth 1. S55: The node corresponding to each single-hop link on the path 1 sends a granted link granted bandwidth 1 to the node 1, where the link granted bandwidth 1 of each single-hop link is a minimum value in the port granted bandwidth 1 and a remaining available bandwidth of the single-hop link. S56: The node 1 determines the target bandwidth 1 from the link granted bandwidths 1 corresponding to the single-hop links. The node 1 uses a minimum value in the link granted bandwidths 1 corresponding to the single-hop links as a target bandwidth 1.

The network device 500 shown in FIG. 5 is still used as an example. It is assumed that the node 501 receives the traffic 1 whose rate is 0.5, the destination node is the node 503, the path 1 corresponds to a path: the node 501→the node 502→the node 503, remaining available bandwidths of the node 501→the node 502 and the node 502→the node 503 are 0.4 and 0.3 respectively, and a remaining available bandwidth of an egress port on the node 503 is 0.2. A process of S51 to S56 may include: The node 501 applies to the node 503 for a requested bandwidth 0.5 on the egress port. The node 503 returns a port granted bandwidth 1 of 0.2 to the node 501. Next, the node 501 applies to the node 502 for a requested bandwidth 0.2 on the node 501→the node 502, and applies to the node 503 for a requested bandwidth 0.2 on the node 502→the node 503. The node 502 returns a link granted bandwidth 1 of 0.2 to the node 501, and the node 503 returns a link granted bandwidth 1 of 0.2 to the node 501. Finally, the node 501 determines 0.2 as a target bandwidth 1 based on the link granted bandwidth 1 of 0.2 returned by the node 502 and the link granted bandwidth 1 of 0.2 returned by the node 503.

In yet other possible implementations, step 301 may include: S61: After the node 1 receives the traffic 1, the node 1 determines the path 1 used to transmit the traffic 1. S62: The node 1 applies to a node corresponding to each single-hop link for a requested bandwidth 1, where the requested bandwidth 1 may be a rate of the traffic 1. S63: The node corresponding to each single-hop link on the path 1 sends a granted link granted bandwidth 1 to the node 1, where the link bandwidth 1 of each single-hop link is a minimum value in the rate of the traffic 1 and a remaining available bandwidth of the single-hop link. S64: The node 1 determines a minimum value in the link granted bandwidths 1 corresponding to the single-hop links, marks the minimum value as a link granted bandwidth 2, and applies to an egress port on the destination node 2 for a bandwidth resource with a value equal to the link granted bandwidth 2. S65: The destination node 2 sends a granted port granted bandwidth 1 to the node 1, where the port granted bandwidth 1 is a minimum value in the link granted bandwidth 2 and a remaining available bandwidth of the egress port on the node 2. S66: The node 1 may directly determine the port granted bandwidth 1 as the target bandwidth 1.

The network device 500 shown in FIG. 5 is still used as an example. It is assumed that the node 501 receives the traffic 1 whose rate is 0.5, the destination node is the node 503, the path 1 corresponds to a path: the node 501→the node 502→the node 503, remaining available bandwidths of the node 501→the node 502 and the node 502→the node 503 are 0.4 and 0.3 respectively, and a remaining available bandwidth of an egress port on the node 503 is 0.2. A process of S61 to S65 may include: The node 501 applies to the node 502 for a requested bandwidth 0.5 on the node 501→the node 502, and applies to the node 503 for a requested bandwidth 0.5 on the node 502→the node 503. The node 502 returns a link granted bandwidth 1 of 0.4 to the node 501, and the node 503 returns a link granted bandwidth 1 of 0.3 to the node 501. Then, the node 501 determines that a minimum value in the link bandwidths 1 corresponding to the single-hop links is 0.3. The node 501 applies to the node 503 for a requested bandwidth 0.3 on an egress port. Then, the node 503 returns a port granted bandwidth 1 of 0.2 to the node 501. Finally, the node 501 uses the port granted bandwidth 1 as a target bandwidth 1, that is, determines that the target bandwidth 1 is 0.2.

In the implementations in the implementation scenario, in a process in which the node 1 applies to the nodes corresponding to the single-hop links for the requested bandwidths 1, the node 1 may simultaneously apply for the requested bandwidths of a same value, or may separately apply for the requested bandwidths, and a value of the applied bandwidth resource is a minimum value in the granted link granted bandwidths.

The network device 500 shown in FIG. 5 is still used as an example. It is assumed that the node 501 receives the traffic 1 whose rate is 0.5, the destination node is the node 503, the path 1 corresponds to a path: the node 501→the node 502→the node 503, remaining available bandwidths of the node 501→the node 502 and the node 502→the node 503 are 0.05 and 0.1 respectively, and a remaining available bandwidth of an egress port on the node 503 is 0.2. A process of pre-allocating the target bandwidth may include: The node 501 applies to the node 503 for a requested bandwidth 0.5 on an egress port. The node 503 returns a port granted bandwidth 1 of 0.2 to the node 501. Next, the node 501 applies to the node 503 for a requested bandwidth 0.2 on the node 502→the node 503, and the node 503 returns a link granted bandwidth 1 of 0.1 to the node 501. Next, the node 501 applies to the node 502 for a requested bandwidth 0.1 on the node 501→the node 502, and the node 502 returns a link granted bandwidth 2 of 0.05 to the node 501. Finally, the node 501 determines 0.05 as the target bandwidth 1.

It should be noted that in the foregoing implementations in the scenario in which each node manages and allocates a bandwidth resource of a single-hop link corresponding to the node, it may be considered that a management function of the management node on each single-hop link is allocated to the node corresponding to the single-hop link, and each node manages a remaining available bandwidth of the single-hop link corresponding to the node.

It should be noted that each node may not only store the remaining available bandwidth of the single-hop link corresponding to the node, but also store a bandwidth status of each of other single-hop links. The bandwidth status indicates whether each of the other single-hop links still has a remaining available bandwidth. The destination node 2 may determine, based on a bandwidth status of another single-hop link stored on the destination node 2, at least one path 1 that has an available bandwidth resource from the node 1 to the node 2. In addition, the destination node 2 may further determine, as the port granted bandwidth 1, a minimum value in the rate of the traffic 1, the remaining available bandwidth of the egress port on the node 2, and a total remaining available bandwidth of single-hop links using the node 2 as an endpoint. This provides a data basis for accurately and quickly obtaining the target bandwidth 1. In addition, if a bandwidth status of at least one of the single-hop links on the path 1 indicates that the single-hop link has no remaining available bandwidth, this embodiment of this application may further include: The node 1 obtains an allocation failure notification message. The allocation failure notification message is used to notify the node 1 that a bandwidth on the path 1 cannot be allocated to the traffic 1. Alternatively, if the node 1 does not receive a bandwidth granted message within a preset period of time (for example, 1 second), the node 1 determines that the node 1 fails to apply for a bandwidth resource on the path 1, and therefore does not send the traffic 1 on the path 1. In this way, a process in which the node 1 applies for and obtains the target bandwidth 1 for the traffic 1 on the path 1 in any one of the foregoing implementations can be reduced, so that it is convenient to apply for a bandwidth resource on another path that has an effective bandwidth resource for the traffic 1, and traffic transmission efficiency can be improved to some extent.

It should be noted that, in this scenario, regardless of whether the node 1 simultaneously applies to the nodes corresponding to the single-hop links for requested bandwidths of a same value, or the node 1 separately applies to the nodes corresponding to the single-hop links for requested bandwidths, after the node 1 obtains the target bandwidth 1, this embodiment of this application may include: The node 1 notifies other nodes in the network device of the target bandwidth 1 applied for the traffic 1 on the path 1, so that the other nodes update the remaining available bandwidths of the single-hop links in the network device based on the target bandwidth 1.

In this way, in this scenario, before traffic is transmitted in the network device, bandwidth resources of a switch-side link and an egress port on a transmission path are applied for in advance for the traffic, and an allocated link granted bandwidth and a port granted bandwidth corresponding to the egress port on the destination node are obtained. It can be ensured that the traffic is subsequently transmitted without congestion on the path and effectively transmitted to another network device through the egress port. This provides a data basis for step 302 below.

Step 302: The node 1 sends the traffic 1 on the path 1 based on the target bandwidth 1.

In an implementation, after obtaining the target bandwidth 1 of the traffic 1 on the path 1, the node 1 may determine sub-traffic 11 corresponding to the target bandwidth 1 in the traffic 1, and send the sub-traffic 11 to the node 2 on the path 1. The sub-traffic 11 is transmitted to another network device through the egress port on the node 2.

For example, assuming that the rate of the traffic 1 is 0.5, the node 1 is a source node of the traffic 1, and the node 2 is a destination node of the traffic 1, in step 301, the node 1 learns that the target bandwidth 1 of the traffic 1 on the path 1 is 0.3. The node 1 uses three fifths of the traffic 1 as the sub-traffic 11, and sends the sub-traffic 11 to the node 2 on the path 1.

It should be noted that the path 1 may be one path from the node 1 to the node 2, or may be a plurality of paths from the node 1 to the node 2. In an example, the path 1 may be a shortest path from the node 1 to the node 2 in the network device. A case in which the path 1 is one path includes: Case 1: Nodes inside the network device form a ring network structure, and the network device includes an odd quantity of nodes. Case 2: Nodes inside the network device form a ring network structure, the network device includes an even quantity of nodes, and the node 1 and the node 2 are in a non-diagonal relationship. Case 3: Nodes inside the network device form a stereoscopic network structure, and there is only one shortest path 1 between the node 1 and the node 2. In this case, according to the embodiment shown in FIG. 3, the target bandwidth 1 may be applied for in advance for the traffic 1, and the traffic 1 may be transmitted on the path 1 based on the target bandwidth 1, to improve transmission reliability. In addition, a case in which the path 1 is a plurality of paths may include: Case 1: Nodes inside the network device form a ring network structure, the network device includes an even quantity of nodes, and the node 1 and the node 2 are in a diagonal relationship. Case 2: Nodes inside the network device form a stereoscopic network structure, and there may be a plurality of shortest paths 1 between the node 1 and the node 2. In this case, the path 1 is a plurality of paths that include a same quantity of single-hop links, and bandwidth resources with a total value equal to the rate of the traffic 1 may be applied for on the plurality of paths 1. For example, a bandwidth resource with a value equal to 1/N of the rate of the traffic 1 may be applied for on each of the plurality of paths 1 (N is a quantity of paths 1). According to the embodiment corresponding to FIG. 3, the target bandwidths 1 corresponding to the plurality of paths 1 may be separately obtained. Therefore, the traffic 1 is transmitted on the plurality of paths 1 based on the plurality of target bandwidths 1, to implement load sharing. In this embodiment of this application, an example in which the path 1 is one shortest path between the node 1 and the node 2 is used for description. For an implementation in which the path 1 is a plurality of paths, refer to related descriptions in which the path 1 is one path.

In this way, the bandwidth on the transmission path is pre-applied for the traffic, so that the traffic can be transmitted based on a granted bandwidth on the path. This ensures that no congestion occurs during traffic transmission on the path, and can effectively avoid a problem that the traffic cannot be transmitted in the network device due to congestion on the path during traffic transmission in the current communications manner, to improve effectiveness and reliability of traffic transmission between nodes in the network device.

Figure 6:
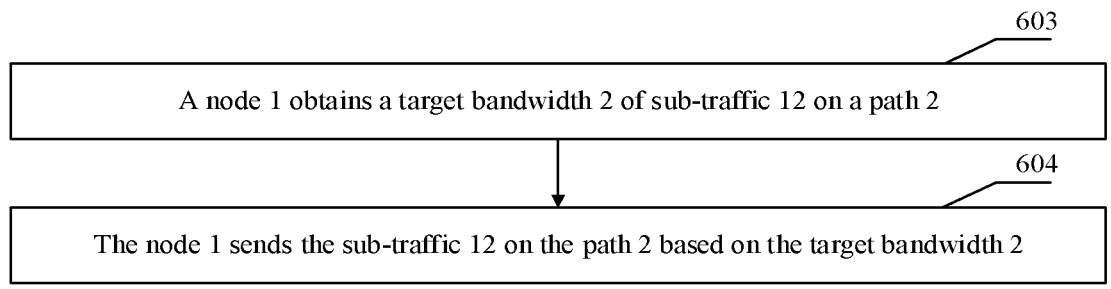
FIG. 6 is a schematic flowchart of an example of a communications method according to an embodiment of this application.

It may be understood that when the target bandwidth 1 determined for the traffic 1 is less than the rate of the traffic 1, it indicates that the target bandwidth is not applied for some remaining traffic of the traffic 1. In this case, if the network device further includes a path 2 from the node 1 to the node 2 in addition to the path 1, and each single-hop link on the path 2 has a remaining available bandwidth, this embodiment of this application may further include: applying for a bandwidth resource on the path 2 for sub-traffic 12 for which the target bandwidth is not applied for in the traffic 1. During an implementation, as shown in FIG. 6, this embodiment of this application may further include the following steps:

Step 603: The node 1 obtains a target bandwidth 2 of the sub-traffic 12 on the path 2.

Step 604: The node 1 sends the sub-traffic 12 on the path 2 based on the target bandwidth 2.

In an example, if the management node manages and allocates the bandwidth resources of the single-hop links in the network device, in one case, if the management node is the node 1, the node 1 directly determines the path 2 for the sub-traffic 12, allocates the target bandwidth 2 to the sub-traffic 12 on the path 2, and sends the sub-traffic 12 based on the target bandwidth 2. In another case, if the management node is not the node 1, the bandwidth request message sent by the node 1 to the management node is further used to request, from the management node, a requested bandwidth 2 of each single-hop link on the path 2. A bandwidth granted message 1 received by the node 1 from the management node 1 includes not only the target bandwidth 1 corresponding to the path 1, but also the target bandwidth 2 corresponding to the path 2. In this case, the node 1 may obtain the target bandwidth 2 based on the bandwidth granted message 1, and send the sub-traffic 12 on the path 2 based on the target bandwidth 2.

In another example, if each node manages and allocates a bandwidth resource of a single-hop link corresponding to the node, after obtaining the target bandwidth 1, the node 1 may determine the sub-traffic 12, where the sub-traffic 12 is traffic that is in the traffic 1 and is not transmitted on the path 1. In this case, the node 1 may determine whether there is the path 2 in addition to the path 1 from the node 1 to the node 2 in the network device, and if there is no path 2, the node 1 discards the sub-traffic 12; or if there is the path 2, the node 1 performs step 603 and step 604. A process may include: First, the node 1 sends a bandwidth request message 3 to each node on the path 2, to apply for a requested bandwidth 4 for the sub-traffic 12 on a single-hop link corresponding to each node, where the requested bandwidth 4 may be a rate of the sub-traffic 12. Then, each node on the path 2 allocates a corresponding link granted bandwidth 2 to the sub-traffic 12 based on a remaining available bandwidth of a single-hop link corresponding to the node, where the link granted bandwidth 2 of each single-hop link is a minimum value in a remaining available bandwidth of the single-hop link and the requested bandwidth 4. Then, each node sends, to the node 1, a bandwidth granted message 3 including the link granted bandwidth 2 of the single-hop link corresponding to the node. The node 1 may determine the target bandwidth 2 based on the received plurality of link granted bandwidths 2. For example, the node 1 may use a minimum value in the plurality of link granted bandwidths 2 as the target bandwidth 2, and send the sub-traffic 12 on the path 2 based on the target bandwidth 2.

It should be noted that in this case, to improve accuracy of managing and allocating the bandwidth resource of the single-hop link corresponding to each node, after determining the target bandwidth 2, the node 1 may further notify, via a notification message, another node in the network device of the target bandwidth 2 applied for the sub-traffic 12 on the path 2, so that the another node in the network device can update, based on the target bandwidth 2, a remaining available bandwidth of a single-hop link correspondingly managed by each node.

For example, the path 2 includes a single-hop link 1 from the node 1 to a node 3, a single-hop link 2 from the node 3 to a node 4, and a single-hop link 3 from the node 4 to the node 2. If a link granted bandwidth 2 returned by the node 3 to the node 1 is 0.5, a link granted bandwidth 2 returned by the node 4 to the node 1 is 0.3, and a link granted bandwidth 2 returned by the node 2 to the node 1 is 0.4, the node 1 determines that a minimum value 0.3 in 0.5, 0.3, and 0.4 is the target bandwidth 2. In this case, the node 1 may notify the node 3, the node 4, and the node 2 that the target bandwidth 2 is 0.3. Based on this, the node 3, the node 4, and the node 2 may subtract 0.3 from the remaining available bandwidths that exist before the link granted bandwidths 2 are allocated, to obtain updated remaining available bandwidths of the node 3, the node 4, and the node 2.

In addition, the network device in this embodiment of this application has a plurality of network side ports, and can continuously exchange data with an external device. Therefore, a traffic transmission situation in the network device is relatively complex, and a plurality of pieces of traffic may be simultaneously transmitted. Therefore, to apply to complex and changeable traffic transmission scenarios in the network device, to orderly allocate bandwidths to a plurality of pieces of traffic from a remaining available bandwidth of a single-hop link according to a rule when a bandwidth resource on the single-hop link is applied for the plurality of pieces of traffic simultaneously, it may be understood that a concept of a target priority is introduced in this embodiment of this application. The target priority may be determined based on a traffic priority of traffic, or may be determined based on a quantity of single-hop links included in a traffic transmission path, or may be jointly determined based on a traffic priority of traffic and a quantity of single-hop links included in a traffic transmission path.

It should be noted that, the traffic priority may be information carried in a traffic transmission process, and may be a traffic priority determined based on a priority identifier in a concept of quality of service (QoS). Traffic may include class selector (CS) traffic, expedited forwarding (EF) traffic, assured forwarding (AF) traffic, and best effort (BE) traffic in descending order of priorities in the QoS. The traffic priority in this embodiment of this application may be determined based on a priority corresponding to the traffic in the QoS concept. For example, it is assumed that a traffic priority corresponding to the CS traffic is 1, a traffic priority corresponding to the EF traffic is 2, a traffic priority corresponding to the AF traffic is 3, and a traffic priority corresponding to the BE traffic is 4. If the traffic 1 is the BE traffic, a traffic priority of the traffic 1 is 4. If the traffic 2 is the AF traffic, a priority of the traffic 2 is 3.

If the target priority is determined based on the traffic priority of the traffic and the quantity of single-hop links included in the traffic transmission path, the target priority may be positively correlated with the traffic priority, and the target priority may be negatively correlated with the quantity of single-hop links included in the path. In one case, when traffic priorities are the same, a larger quantity of single-hop links included in a path indicates a longer transmission path of traffic, and a lower target priority of the traffic. In another case, when quantities of single-hop links included in paths are the same, a higher traffic priority of traffic indicates a higher target priority of the traffic.

It is assumed that the traffic priority includes levels 1 to 4. In one case, a method for determining a target priority of traffic may include: preferentially considering a traffic priority, and then considering a transmission distance (that is, a quantity of single-hop links included in the path). For example, with reference to the network device shown in FIG. 4, a minimum quantity of single-hop links included in a path is 1 and a maximum quantity of single-hop links included in a path is 5. In this case, 20 levels of target priorities are determined. For details, refer to Table 1.

TABLE 1

Example of determining a target priority

| Target priority | Traffic priority | Quantity of single-hop links included in a path |
|---|---|---|
| 1 | 1 | 1 |
| 2 | 1 | 2 |
| 3 | 1 | 3 |
| 4 | 1 | 4 |
| 5 | 1 | 5 |
| 6 | 2 | 1 |
| 7 | 2 | 2 |
| 8 | 2 | 3 |
| 9 | 2 | 4 |

TABLE 1-continued

Example of determining a target priority

| Target priority | Traffic priority | Quantity of single-hop links included in a path |
|---|---|---|
| 10 | 2 | 5 |
| 11 | 3 | 1 |
| 12 | 3 | 2 |
| 13 | 3 | 3 |
| 14 | 3 | 4 |
| 15 | 3 | 5 |
| 16 | 4 | 1 |
| 17 | 4 | 2 |
| 18 | 4 | 3 |
| 19 | 4 | 4 |
| 20 | 4 | 5 |

In another case, the method for determining the target priority of the traffic may further include: preferentially considering a transmission distance (that is, a quantity of single-hop links included in a path), and then considering s traffic priority. For example, with reference to the network device shown in FIG. 4, a minimum quantity of single-hop links included in a path is 1 and a maximum quantity included in a path is 5. In this case, 20 levels of target priorities are determined. For details, refer to Table 2.

TABLE 2

Another example of determining a target priority

| Target priority | Quantity of single-hop links included in a path | Traffic priority |
|---|---|---|
| 1 | 1 | 1 |
| 2 | 1 | 2 |
| 3 | 1 | 3 |
| 4 | 1 | 4 |
| 5 | 2 | 1 |
| 6 | 2 | 2 |
| 7 | 2 | 3 |
| 8 | 2 | 4 |
| 9 | 3 | 1 |
| 10 | 3 | 2 |
| 11 | 3 | 3 |
| 12 | 3 | 4 |
| 13 | 4 | 1 |
| 14 | 4 | 2 |
| 15 | 4 | 3 |
| 16 | 4 | 4 |
| 17 | 5 | 1 |
| 18 | 5 | 2 |
| 19 | 5 | 3 |
| 20 | 5 | 4 |

It should be noted that, if a level of a target priority of traffic is larger, it indicates that the target priority of the traffic is lower; otherwise, if a level of a target priority of traffic is smaller, it indicates that the target priority of the traffic is higher.

Figure 7:
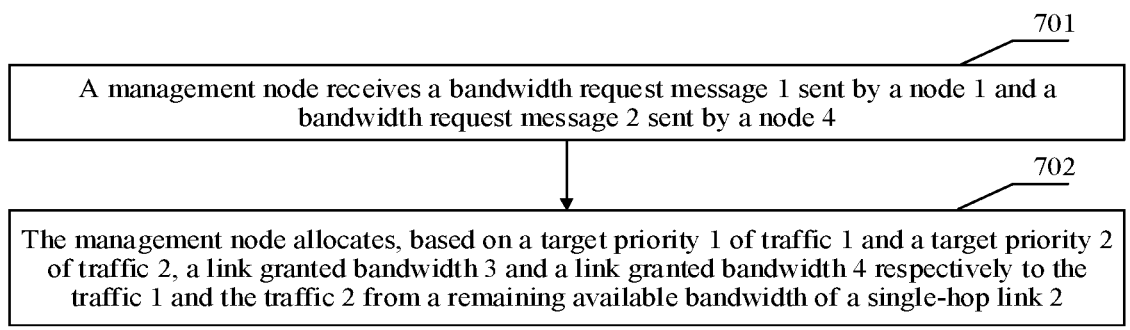
FIG. 7 is a schematic flowchart of another communications method according to an embodiment of this application.

In some possible implementations, in a scenario in which the management node manages and allocates the bandwidth resources of the single-hop links in the network device, if the node 1 receives traffic 1, the node 4 receives traffic 2, and paths determined for the traffic 1 and the traffic 4 both include a single-hop link 2, as shown in FIG. 7, in this embodiment of this application, a process of separately allocating bandwidth resources to the traffic 1 and the traffic 2 on the single-hop link 2 may include the following steps:

Step 701: The management node receives a bandwidth request message 1 sent by the node 1 and a bandwidth request message 2 sent by the node 4.

Step 702: The management node allocates, based on a target priority 1 of the traffic 1 and a target priority 2 of the traffic 2, a link granted bandwidth 3 and a link granted bandwidth 4 respectively to the traffic 1 and the traffic 2 from a remaining available bandwidth of the single-hop link 2.

It may be understood that a bandwidth request message carries a traffic priority of traffic, or may carry a requested bandwidth. For example, the bandwidth request message 1 may carry a requested bandwidth 1, and the bandwidth request message 2 may carry a requested bandwidth 2.

In an implementation, the management node may parse the received bandwidth request message 1 and the received bandwidth request message 2, to obtain a traffic priority of the traffic 1 and a traffic priority of the traffic 2. In this case, in one case, if a bandwidth request message carries a path determined for traffic, the management node may determine a target priority of the traffic based on a traffic priority and a quantity of single-hop links included in the path. In another case, if a bandwidth request message carries information about a source node and a destination node of traffic, the management node may first determine a path for the traffic, and then determine a target priority for the traffic based on a traffic priority and a quantity of single-hop links included in the path.

In an example, when the target priority of the traffic 1 is higher than the target priority of the traffic 2, step 702 may include: Step 1: The management node allocates the link granted bandwidth 3 to the traffic 1 from a remaining available bandwidth 1 of the single-hop link 2, where the link granted bandwidth 3 is a minimum value in the requested bandwidth 1 and the remaining available bandwidth 1. Step 2: The management node updates the remaining available bandwidth of the single-hop link 2 with a remaining available bandwidth 2, where the remaining available bandwidth 2 is a difference between the remaining available bandwidth 1 and the link granted bandwidth 3. Step 3: The management node allocates the link granted bandwidth 4 to the traffic 2 from the remaining available bandwidth 2, where the link granted bandwidth 4 is a minimum value in the requested bandwidth 2 and the remaining available bandwidth 2.

For example, in the network device shown in FIG. 4, it is assumed that a bandwidth resource on the node 402→the node 403 is applied for traffic 1 and the traffic 2 simultaneously, and the requested bandwidths are 0.4 and 0.5 respectively, and it is known that a remaining available bandwidth on the node 402→the node 403 is 0.6. A process of allocating bandwidth resources may include: S71: Determine that the target priority of the traffic 1 is higher than the target priority of the traffic 2. S72: First allocate a minimum value 0.4 in 0.4 and 0.6 to the traffic 1 as the link granted bandwidth 3. S73: Determine that a remaining available bandwidth on the node 402→the node 403 is 0.6-0.4=0.2. S74: Allocate a minimum value 0.2 in 0.2 and 0.5 to the traffic 2 as the link granted bandwidth 4. In this way, the bandwidths allocated to the traffic 1 and the traffic 2 on the node 402→the node 403 are 0.4 and 0.2 respectively.

In another example, when the target priority of the traffic 1 is equal to the target priority of the traffic 2, step 702 may include: Step 1: The management node allocates the link granted bandwidth 3 to the traffic 1 and the link granted bandwidth 4 to the traffic 2 from the remaining available bandwidth 1 of the single-hop link 2 according to a preset allocation algorithm, where a sum of the link granted bandwidth 3 and the link granted bandwidth 4 is not greater than the remaining available bandwidth 1. It should be noted that the link granted bandwidth 3 and the link granted bandwidth 4 in this example are not associated with the link granted bandwidth 3 and the link granted bandwidth 4 in the foregoing example in terms of values, but are represented by same names.

The preset allocation algorithm may be a max-min fairness algorithm, an average allocation algorithm, a round robin scheduling RR algorithm, or a random allocation algorithm.

The max-min fairness algorithm is used as an example. In the network device shown in FIG. 4, it is assumed that bandwidth resources on the node 402→the node 403 are applied for traffic 1, traffic 2, traffic 3, traffic 4, and traffic 5 simultaneously, and requested bandwidths are 0.1, 0.2, 0.3, 0.4, and 0.5 respectively, and it is known that a remaining available bandwidth on the node 402→the node 403 is 1. A process of allocating bandwidth resources according to the max-min fairness algorithm may include: S71: Evenly divide the remaining bandwidth 1 into five parts, where each part is 0.2. S72: Allocate a granted bandwidth 0.2 to each piece of traffic. S73: Determine a relationship between the granted bandwidth allocated to each piece of traffic and the requested bandwidth, and determine that the granted bandwidth of the traffic 1 is 0.1 greater than the requested bandwidth, the granted bandwidth of the traffic 2 is equal to the requested bandwidth, and the granted bandwidths of the remaining three pieces of traffic are all less than the requested bandwidths. S74: Evenly divide an extra bandwidth 0.1 of the traffic 1 into three parts, where each part is 0.033. S75: Allocate a granted bandwidth 0.033 to the traffic 3, the traffic 4, and the traffic 5. S76: Determine that there is no remaining available bandwidth on the node 402→the node 403, and end bandwidth resource allocation. In this way, the bandwidths allocated to the traffic 1, the traffic 2, the traffic 3, the traffic 4, and the traffic 5 on the node 402→the node 403 are 0.1, 0.2, 0.233, 0.233, and 0.233 respectively.

It should be noted that regardless of which preset allocation algorithm is used to perform traffic allocation, a condition for ending the allocation may be: A remaining available bandwidth on the allocated single-hop link is 0, or there is no traffic to which a bandwidth resource needs to be allocated.

Figure 8:
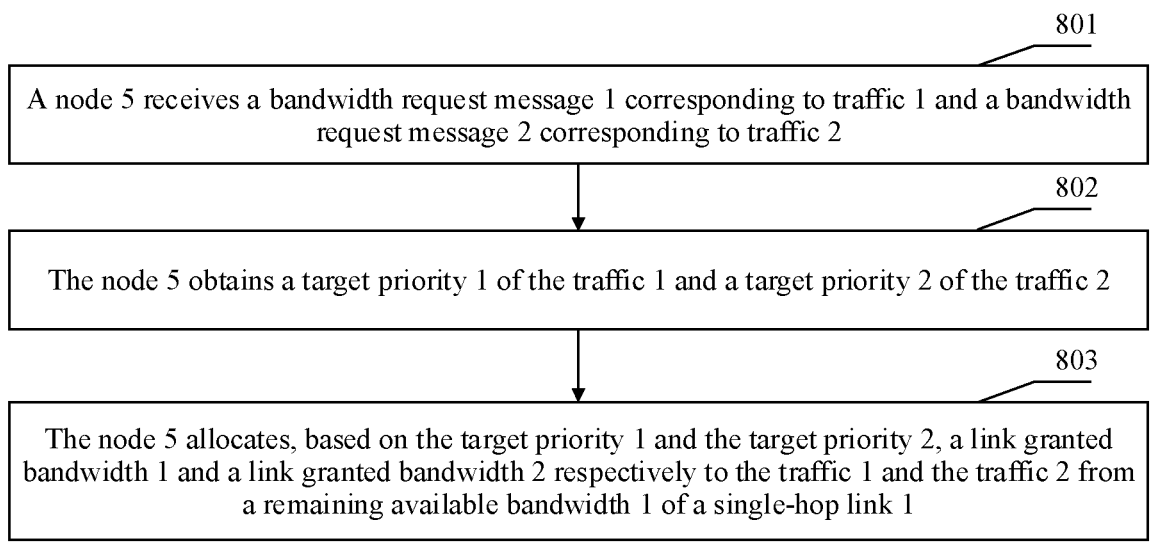
FIG. 8 is a schematic flowchart of still another communications method according to an embodiment of this application.

In some other implementations, in a scenario in which each node manages and allocates a bandwidth resource of a single-hop link corresponding to the node, if a single-hop link 1 correspondingly managed by a node 5 is a single-hop link included in paths of traffic 1 and traffic 2, as shown in FIG. 8, in this embodiment of this application, a process of separately allocating bandwidth resources to the traffic 1 and the traffic 2 on the single-hop link 1 may include the following steps:

Step 801: The node 5 receives a bandwidth request message 1 corresponding to the traffic 1 and a bandwidth request message 2 corresponding to the traffic 2.

Step 802: The node 5 obtains a target priority 1 of the traffic 1 and a target priority 2 of the traffic 2.

Step 803: The node 5 allocates, based on the target priority 1 and the target priority 2, a link granted bandwidth 1 and a link granted bandwidth 2 respectively to the traffic 1 and the traffic 2 from a remaining available bandwidth 1 of the single-hop link 1.

It may be understood that the bandwidth request message 1 and the bandwidth request message 2 are used to request the node 5 to allocate the requested bandwidth 1 to the traffic 1 and the requested bandwidth 2 to the traffic 2 on the single-hop link 1, where the single-hop link 1 is a single-hop link through which the traffic 1 and the traffic 2 both pass.

It should be noted that the requested bandwidth 1 and the requested bandwidth 2 may be the same or may be different.

In an implementation, the node 5 may parse the received bandwidth request message 1 and the received bandwidth request message 2, to obtain a traffic priority of the traffic 1 and a traffic priority of the traffic 2. In addition, if a bandwidth request message carries a path determined for traffic corresponding to the bandwidth request message, the node 5 may determine a target priority of the traffic based on a traffic priority and a quantity of single-hop links included in the path.

In an example, when the target priority of the traffic 1 is higher than the target priority of the traffic 2, step 803 may include: Step 1: The node 5 allocates the link granted bandwidth 1 to the traffic 1 from the remaining available bandwidth 1, where the link granted bandwidth 1 is a minimum value in the requested bandwidth 1 and the remaining available bandwidth 1. Step 2: The node 5 updates the remaining available bandwidth of the single-hop link 1 with a remaining available bandwidth 2, where the remaining available bandwidth 2 is a difference between the remaining available bandwidth 1 and the link granted bandwidth 1. Step 3: The node 5 allocates the link granted bandwidth 2 to the traffic 2 from the remaining available bandwidth 2, where the link granted bandwidth 2 is a minimum value in the requested bandwidth 2 and the remaining available bandwidth 2.

In another example, when the target priority of the traffic 1 is equal to the target priority of the traffic 2, step 803 may include: The node 5 allocates the link granted bandwidth 1 to the traffic 1 and the link granted bandwidth 2 to the traffic 2 from the remaining available bandwidth 1 according to a preset allocation algorithm, where a sum of the link granted bandwidth 2 and the link granted bandwidth 1 is not greater than the remaining available bandwidth 1. The preset allocation algorithm may be a max-min fairness algorithm, an average allocation algorithm, a round robin scheduling RR algorithm, or a random allocation algorithm.

It can be learned that, in this embodiment of this application, a bandwidth on a transmission path is applied for in advance for traffic, so that the traffic can be transmitted based on a granted bandwidth on the path, to ensure that no congestion occurs when the traffic is transmitted on the path. In addition, a concept of a target traffic priority is further introduced in consideration of complex and variable traffic transmission scenarios in the network device, and the target priority may be jointly determined based on a traffic priority and a quantity of single-hop links included in a path. An allocation rule is provided for a plurality of pieces of traffic to simultaneously apply for bandwidth resources on a same single-hop link, to ensure that the bandwidth resources can be orderly allocated to the traffic. This can effectively avoid a problem that traffic cannot be transmitted in the network device due to congestion on a path in a current communications manner, to improve effectiveness and reliability of traffic transmission between nodes in the network device.

To make the communications method provided in the embodiments of this application clearer, the following describes the embodiments of this application by using instances.

Figure 9:
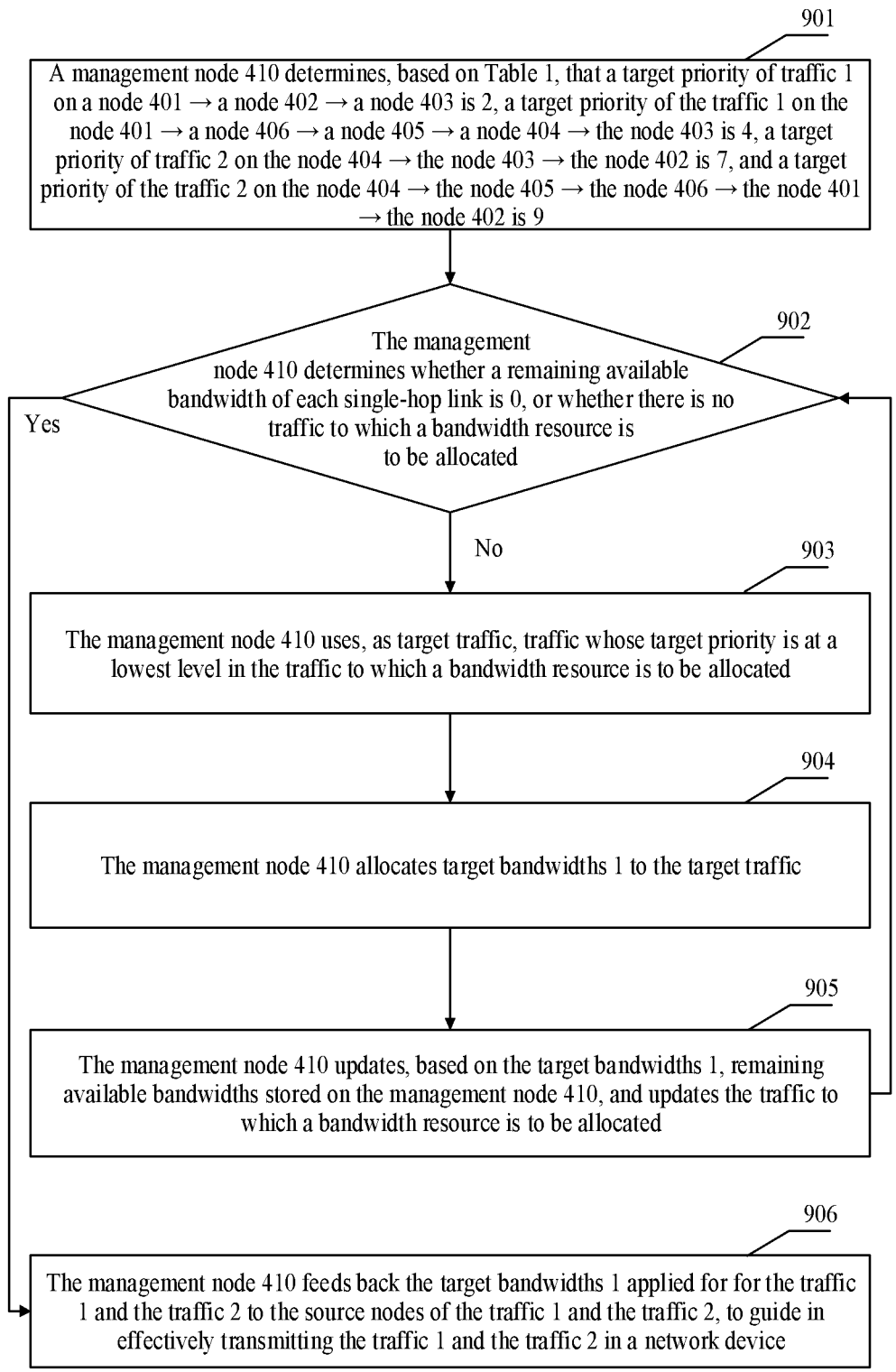
FIG. 9 is a schematic flowchart of an instance of a communications method according to an embodiment of this application.

Instance 1: The network device shown in FIG. 4 is used as an example. It is assumed that traffic to which a bandwidth resource is to be allocated in the management node 410 includes traffic 1 and traffic 2. Information carried in the traffic 1 includes: a source node 401, a destination node 403, a requested bandwidth 0.5, and a traffic priority 1. Information carried in the traffic 2 includes: a source node 404, a destination node 402, a requested bandwidth 0.2, and a traffic priority 2. It is known that remaining available bandwidths between the node 401 and the node 402, the node 402 and the node 403, the node 403 and the node 404, the node 404 and the node 405, the node 405 and the node 406, and the node 406 and the node 401 are 0.4, 0.6, 0.1, 0.2, 0.3, and 0.5. In an implementation, if a traffic priority is used as a preferential indicator, as shown in FIG. 9, this embodiment of this application may include the following steps.

Step 901: The management node 410 determines, based on Table 1, that a target priority of the traffic 1 on the node 401→the node 402→the node 403 is 2, a target priority of the traffic 1 on the node 401→the node 406→the node 405→the node 404→the node 403 is 4, a target priority of the traffic 2 on the node 404→the node 403→the node 402 is 7, and a target priority of the traffic 2 on the node 404→the node 405→the node 406→the node 401→the node 402 is 9.

Step 902: The management node 410 determines whether the remaining available bandwidth of each single-hop link is 0, or whether there is no traffic to which a bandwidth resource is to be allocated; and if yes, the management node 410 performs step 906; or otherwise, the management node 410 performs step 903.

Step 903: The management node 410 uses, as target traffic, traffic whose target priority is at a lowest level in the traffic to which a bandwidth resource is to be allocated.

It may be understood that a lower level of a target priority indicates a higher target priority of traffic.

When the target traffic is cyclically executed in four steps, the traffic 1 is on a path 1: the node 401→the node 402→the node 403, the traffic 1 is on a path 2: the node 401→the node 406→the node 405→the node 404→the node 403, the traffic 2 is on a path 3: the node 404→the node 403→the node 402, and the traffic 2 is on a path 4: the node 404→the node 405→the node 406→the node 401→the node 402.

Step 904: The management node 410 allocates target bandwidths 1 to the target traffic.

It should be noted that, the management node 410 allocates a target bandwidth 1 of 0.4 to the traffic 1 on the path 1, the management node 410 allocates a target bandwidth 1 of 0.1 to the traffic 1 on the path 2, and the management node 410 allocates a target bandwidth 1 of 0 to the traffic 2 on both the path 3 and the path 4.

It should be noted that, for a process of step 904, refer to related descriptions in the embodiment shown in FIG. 3.

Step 905: The management node 410 updates, based on the target bandwidths 1, remaining available bandwidths stored on the management node 410, updates the traffic to which a bandwidth resource is to be allocated, and performs step 902 again.

Step 906: The management node 410 feeds back the target bandwidths 1 applied for the traffic 1 and the traffic 2 to the source nodes of the traffic 1 and the traffic 2, to guide in effectively transmitting the traffic 1 and the traffic 2 in the network device.

Instance 2: The network device shown in FIG. 5 is used as an example. It is assumed that traffic 3 and traffic 4 are traffic to which a bandwidth resource is to be allocated. Information carried in the traffic 3 includes: a source node 501, a destination node 504, a requested bandwidth 0.5, and a traffic priority 1. Information carried in the traffic 4 includes: a source node 504, a destination node 502, a requested bandwidth 0.2, and a traffic priority 3. It is known that remaining available bandwidths between the node 501 and the node 502, the node 502 and the node 503, the node 503 and the node 504, the node 504 and the node 505, the node 505 and the node 506, and the node 506 and the node

Figure 10:
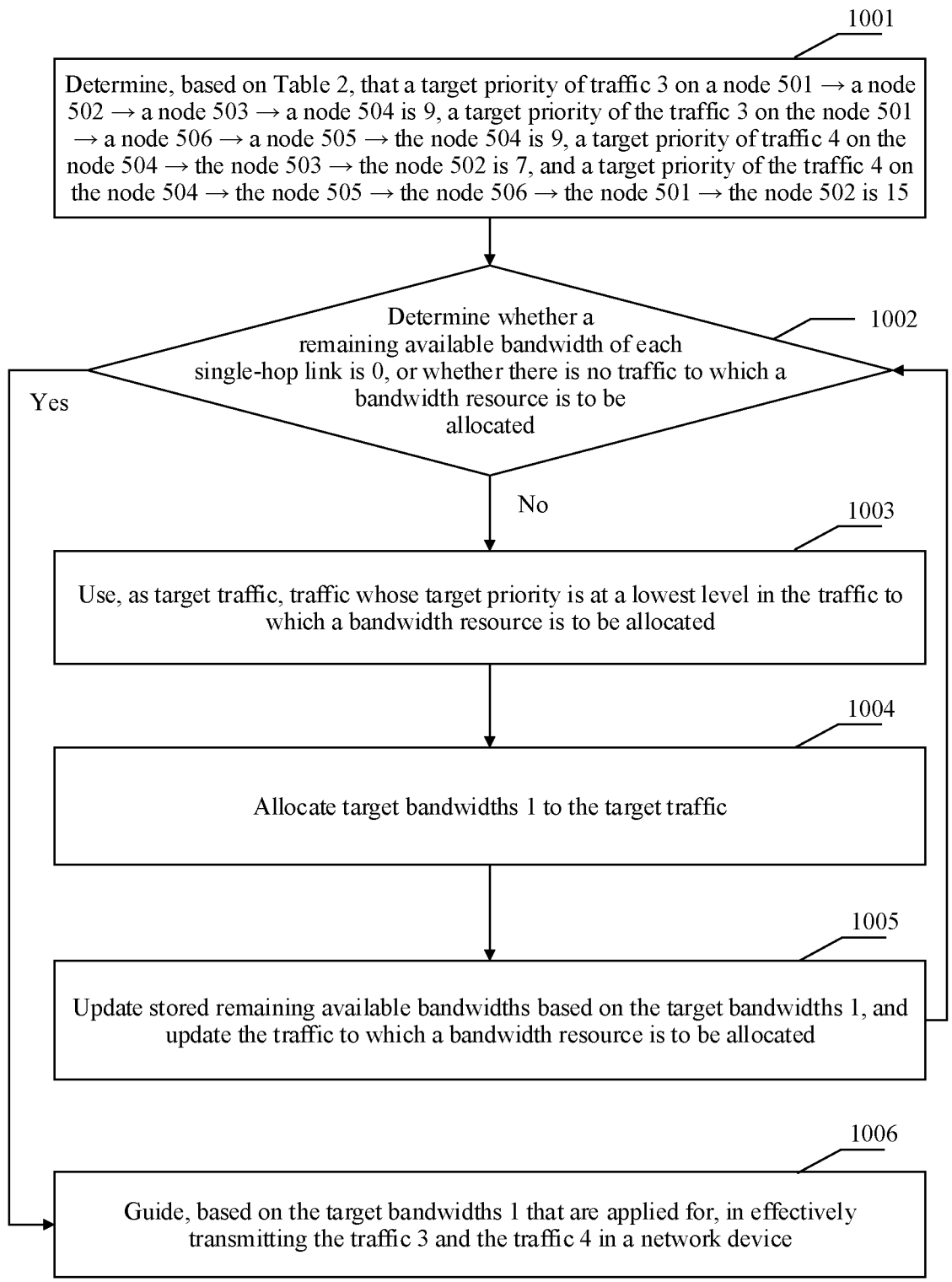
FIG. 10 is a schematic flowchart of another instance of a communications method according to an embodiment of this application.

501 are 0.4, 0.6, 0.1, 0.2, 0.3, and 0.5. In an implementation, if a traffic priority is used as a preferential indicator, as shown in FIG. 10, this embodiment of this application may include the following steps.

Step 1001: Determine, based on Table 2, that a target priority of the traffic 3 on the node 501→the node 502→the node 503→the node 504 is 9, a target priority of the traffic 3 on the node 501→the node 506→the node 505→the node 504 is 9, a target priority of the traffic 4 on the node 504→the node 503→the node 502 is 7, and a target priority of the traffic 4 on the node 504→the node 505→the node 506→the node 501→the node 502 is 15.

Step 1002: Determine whether the remaining available bandwidth of each single-hop link is 0, or whether there is no traffic to which a bandwidth resource is to be allocated; and if yes, perform step 1006; or otherwise, perform step 1003.

Step 1003: Use, as target traffic, traffic whose target priority is at a lowest level in the traffic to which a bandwidth resource is to be allocated.

It may be understood that a lower level of a target priority indicates a higher target priority of traffic.

When the target traffic is cyclically executed in four steps, the traffic 4 is on a path 3: the node 504→the node 503→the node 502, the traffic 3 is on a path 1: the node 501→the node 502→the node 503→the node 504, the traffic 3 is on a path 2: the node 501→the node 506→the node 505→the node 504, and the traffic 4 is on a path 4: the node 504→the node 505→the node 506→the node 501→the node 502.

Step 1004: Allocate target bandwidths 1 to the target traffic.

It should be noted that a target bandwidth 1 allocated to the traffic 4 on the path 3 is 0.1, a target bandwidth 1 allocated to the traffic 3 on the path 2 is 0.2, and both a target bandwidth 1 allocated to the traffic 3 on the path 1 and a target bandwidth 1 allocated to the traffic 4 on the path 4 are 0.

It should be noted that, for a process of step 1004, refer to related descriptions in the embodiment shown in FIG. 3.

Step 1005: Update stored remaining available bandwidths based on the target bandwidths 1, update the traffic to which a bandwidth resource is to be allocated, and perform step 1002 again.

Step 1006: Guide, based on the target bandwidths 1 that are applied for, in effectively transmitting the traffic 3 and the traffic 4 in the network device.

The following describes various possible implementations of the communications method in the embodiments of this application in an interactive manner.

Figure 11:
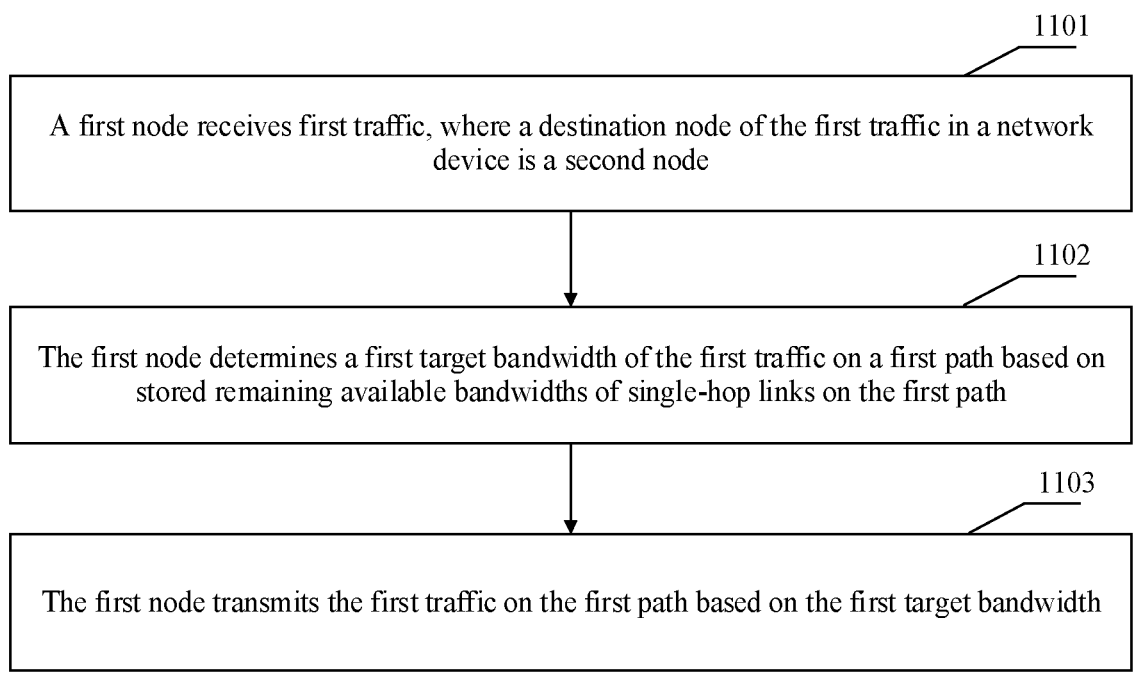
FIG. 11 is a schematic flowchart of a communications method according to an embodiment of this application.

In a first implementation, as shown in FIG. 11, a network device includes at least a first node and a second node. The first node is a management node. The first node stores remaining available bandwidths of all single-hop links in the network device, and is configured to manage and allocate bandwidth resources of all the single-hop links in the network device. This embodiment of this application may include the following steps.

Step 1101: The first node receives first traffic, where a destination node of the first traffic in the network device is the second node.

Step 1102: The first node determines a first target bandwidth of the first traffic on the first path based on the stored remaining available bandwidths of the single-hop links on the first path.

Step 1102 may be implemented by using the following plurality of examples:

In a first example, step 1102 may include: The first node determines a first link granted bandwidth of the first traffic on the first path based on the stored remaining available bandwidths of the single-hop links on the first path, and directly uses the first link granted bandwidth as the first target bandwidth, where the first link granted bandwidth is a minimum value in a rate of the first traffic and the remaining available bandwidths of the single-hop links on the first path.

In a second example, step 1102 may include: Step 1: The first node sends a first bandwidth request message to the second node, where the first bandwidth request message includes information that indicates a rate of the first traffic. Step 2: The second node grants a first port granted bandwidth to the first traffic on an egress port on the second node based on the first bandwidth request message, where the egress port on the second node is an egress port through which the second node sends the first traffic to another network device, and the first port granted bandwidth is a minimum value in the rate of the first traffic and a remaining available bandwidth of the egress port on the second node. Step 3: The second node sends the first port granted bandwidth to the first node. Step 4: The first node determines the first target bandwidth of the first traffic on the first path based on the received first port granted bandwidth and the remaining available bandwidths of the single-hop links on the first path that are stored on the first node, where the first target bandwidth is a minimum value in the first port granted bandwidth and the remaining available bandwidths of the single-hop links on the first path.

In a third example, step 1102 may include: Step 1: The first node determines, based on the stored remaining available bandwidths of the single-hop links on the first path, a first link granted bandwidth of the first traffic on the first path, where the first link granted bandwidth is a minimum value in a rate of the first traffic and the remaining available bandwidths of the single-hop links on the first path. Step 2: The first node sends the first link granted bandwidth to the second node. Step 3: The second node determines a first port granted bandwidth based on the first link granted bandwidth and a remaining available bandwidth of an egress port on the second node. Step 4: The second node sends the first port granted bandwidth to the first node, where the first port granted bandwidth is a minimum value in the first link granted bandwidth and the remaining available bandwidth of the egress port on the second node. Step 5: The first node directly determines the first port granted bandwidth as the first target bandwidth.

Step 1103: The first node transmits the first traffic on the first path based on the first target bandwidth.

Figure 12:
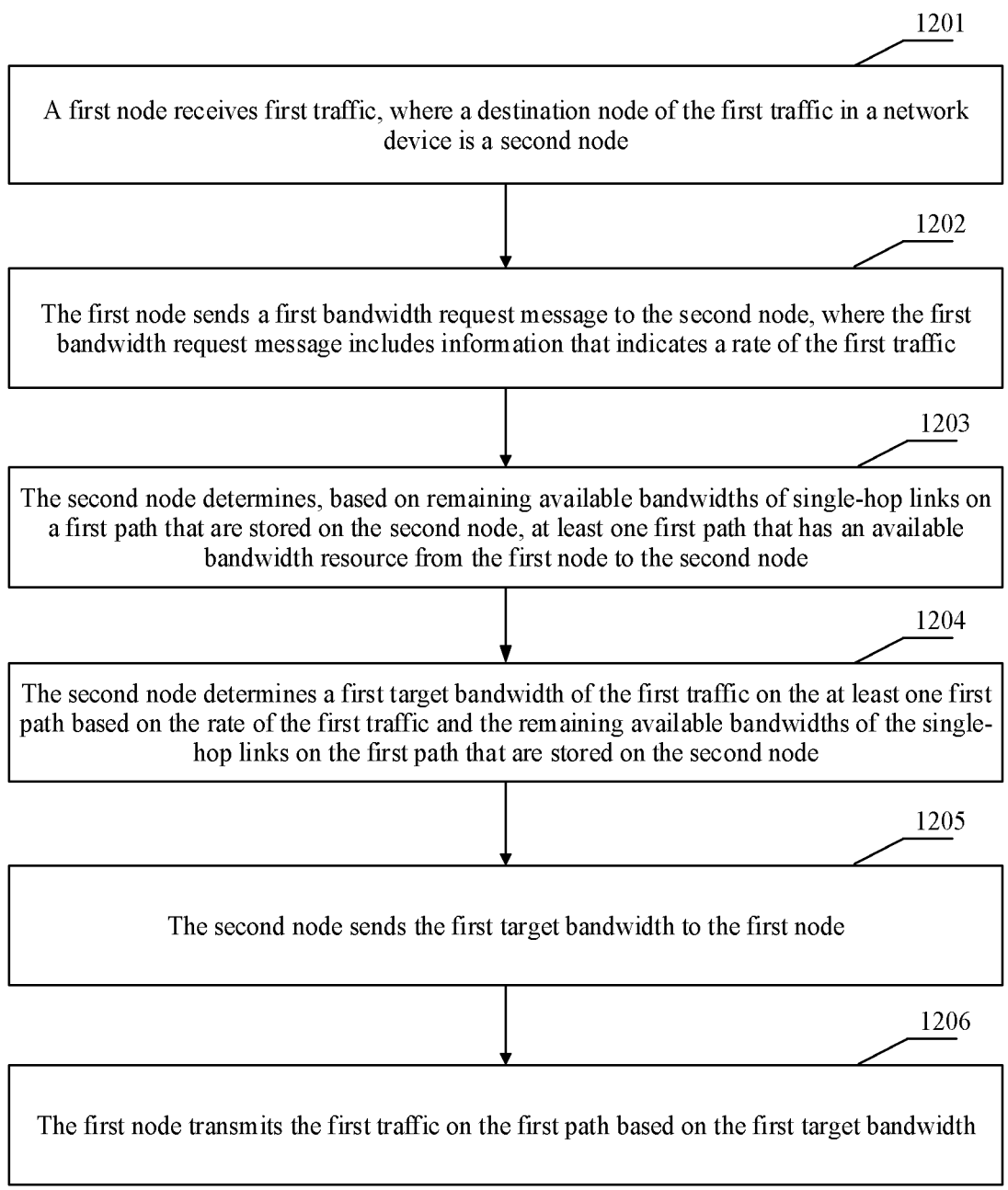
FIG. 12 is a schematic flowchart of another communications method according to an embodiment of this application.

In a second implementation, as shown in FIG. 12, a network device includes at least a first node and a second node. The second node is a management node. The second node stores remaining available bandwidths of all single-hop links in the network device, and is configured to manage and allocate bandwidth resources of all the single-hop links in the network device. This embodiment of this application may include the following steps.

Step 1201: The first node receives first traffic, where a destination node of the first traffic in the network device is the second node.

Step 1202: The first node sends a first bandwidth request message to the second node, where the first bandwidth request message includes information that indicates a rate of the first traffic.

Step 1203: The second node determines, based on the remaining available bandwidths of the single-hop links on the first path that are stored on the second node, at least one first path that has an available bandwidth resource from the first node to the second node.

Step 1204: The second node determines a first target bandwidth of the first traffic on the at least one first path based on the rate of the first traffic and the remaining available bandwidths of the single-hop links on the first path that are stored on the second node.

Step 1204 may be implemented by using the following plurality of examples:

In a first example, step 1204 may include: The second node determines a first link granted bandwidth of the first traffic on the first path based on the rate of the first traffic and the remaining available bandwidths of the single-hop links on the first path that are stored on the second node, and directly uses the first link granted bandwidth as the first target bandwidth, where the first link granted bandwidth is a minimum value in the rate of the first traffic and the remaining available bandwidths of the single-hop links on the first path.

In a second example, step 1204 may include: The second node determines a first port granted bandwidth (that is, the first target bandwidth of the first traffic on the first path) based on the rate of the first traffic, a remaining available bandwidth of an egress port on the second node, and the remaining available bandwidths of the single-hop links on the at least one first path, where the first target bandwidth is a minimum value in a sum of bandwidths that can be simultaneously allocated on the plurality of first paths, the rate of the first traffic, and the remaining available bandwidth of the egress port on the second node.

Step 1205: The second node sends the first target bandwidth to the first node.

Step 1206: The first node transmits the first traffic on the first path based on the first target bandwidth.

Figure 13A:
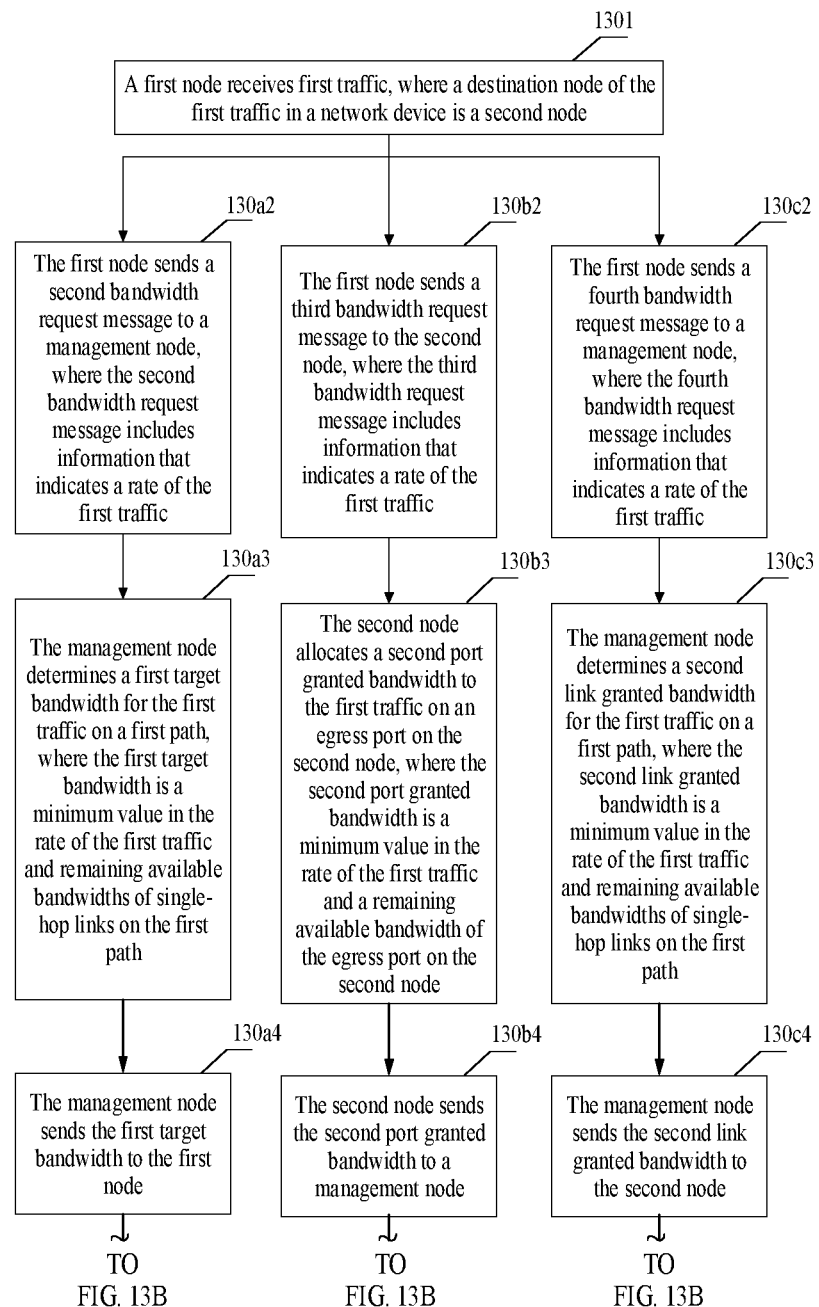
FIG. 13A and FIG. 13B are a schematic flowchart of still another communications method according to an embodiment of this application.
Figure 13B:
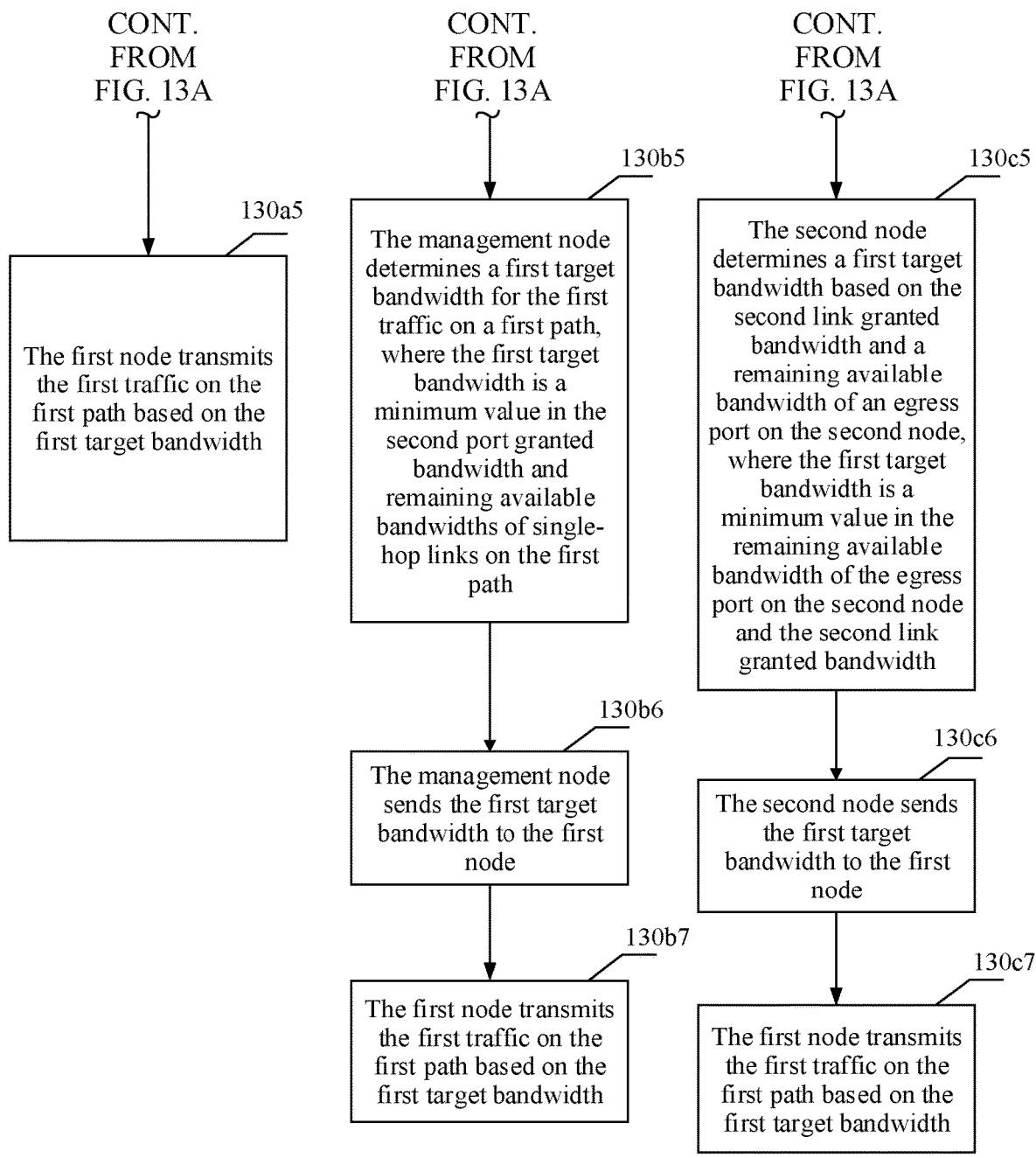

In a third implementation, as shown in FIG. 13A and FIG. 13B, a network device includes at least a first node, a second node, and a management node. The management node stores remaining available bandwidths of all single-hop links in the network device, and is dedicatedly configured to manage and allocate bandwidth resources of all the single-hop links in the network device. This embodiment of this application may include the following steps.

Step 1301: The first node receives first traffic, where a destination node of the first traffic in the network device is the second node.

Then, this embodiment of this application may be implemented by using steps 130a2 to 130a5, or may be implemented by using steps 130b2 to 130b7, or may be implemented by using steps 130c2 to 130c7.

In a first example, after step 1301, this embodiment of this application may include the following steps:

Step 130a2: The first node sends a second bandwidth request message to the management node, where the second bandwidth request message includes information that indicates a rate of the first traffic.

Step 130a3: The management node determines a first target bandwidth for the first traffic on the first path, where the first target bandwidth is a minimum value in the rate of the first traffic and the remaining available bandwidths of the single-hop links on the first path.

Step 130a4: The management node sends the first target bandwidth to the first node.

Step 130a5: The first node transmits the first traffic on the first path based on the first target bandwidth.

In a second example, after step 1301, this embodiment of this application may alternatively include the following steps:

Step 130b2: The first node sends a third bandwidth request message to the second node, where the third bandwidth request message includes information that indicates a rate of the first traffic.

Step 130b3: The second node allocates a second port granted bandwidth to the first traffic on an egress port on the second node, where the second port granted bandwidth is a minimum value in the rate of the first traffic and a remaining available bandwidth of the egress port on the second node.

Step 130b4: The second node sends the second port granted bandwidth to the management node.

Step 130b5: The management node determines a first target bandwidth for the first traffic on the first path, where the first target bandwidth is a minimum value in the second port granted bandwidth and the remaining available bandwidths of the single-hop links on the first path.

Step 130b6: The management node sends the first target bandwidth to the first node.

Step 130b7: The first node transmits the first traffic on the first path based on the first target bandwidth.

In a third example, after step 1301, this embodiment of this application may alternatively include the following steps:

Step 130c2: The first node sends a fourth bandwidth request message to the management node, where the fourth bandwidth request message includes information that indicates a rate of the first traffic.

Step 130c3: The management node determines a second link granted bandwidth for the first traffic on the first path, where the second link granted bandwidth is a minimum value in the rate of the first traffic and the remaining available bandwidths of the single-hop links on the first path.

Step 130c4: The management node sends the second link granted bandwidth to the second node.

Step 130c5: The second node determines a first target bandwidth based on the second link granted bandwidth and a remaining available bandwidth of an egress port on the second node, where the first target bandwidth is a minimum value in the remaining available bandwidth of the egress port on the second node and the second link granted bandwidth.

Step 130c6: The second node sends the first target bandwidth to the first node.

Step 130c7: The first node transmits the first traffic on the first path based on the first target bandwidth.

It may be understood that in the foregoing method for implementing communication after step 1301 in this embodiment of this application, in step 130a3, step 130b5, and step 130c3, in a process in which the management node determines, based on the remaining available bandwidths of the single-hop links on the first path that are stored on the management node, a bandwidth resource granted to the first traffic, in one case, step 130c3 is used as an example, and may include: The management node determines a minimum value in the rate of the first traffic and a remaining available bandwidth of each single-hop link on the first path as a second link granted bandwidth of the single-hop link. The management node determines a minimum value in the second link granted bandwidths of the single-hop links on the first path as the second link granted bandwidth of the first traffic on the first path. In another case, step 130c3 may alternatively include: The management node determines a minimum value in a link granted bandwidth of a previous single-hop link of each single-hop link (a link granted bandwidth of a previous single-hop link of the first single-hop link is the rate of the first traffic) and a remaining available bandwidth of the single-hop link as a link granted bandwidth of the single-hop link, and determines a link granted bandwidth of a next single-hop link based on the link granted bandwidth of the single-hop link, and so on, until a link granted bandwidth of the last single-hop link is determined based on a link granted bandwidth of the penultimate single-hop link and a remaining available bandwidth of the last single-hop link, and is used as a second link granted bandwidth of the first traffic on the first path.

Figure 14A:
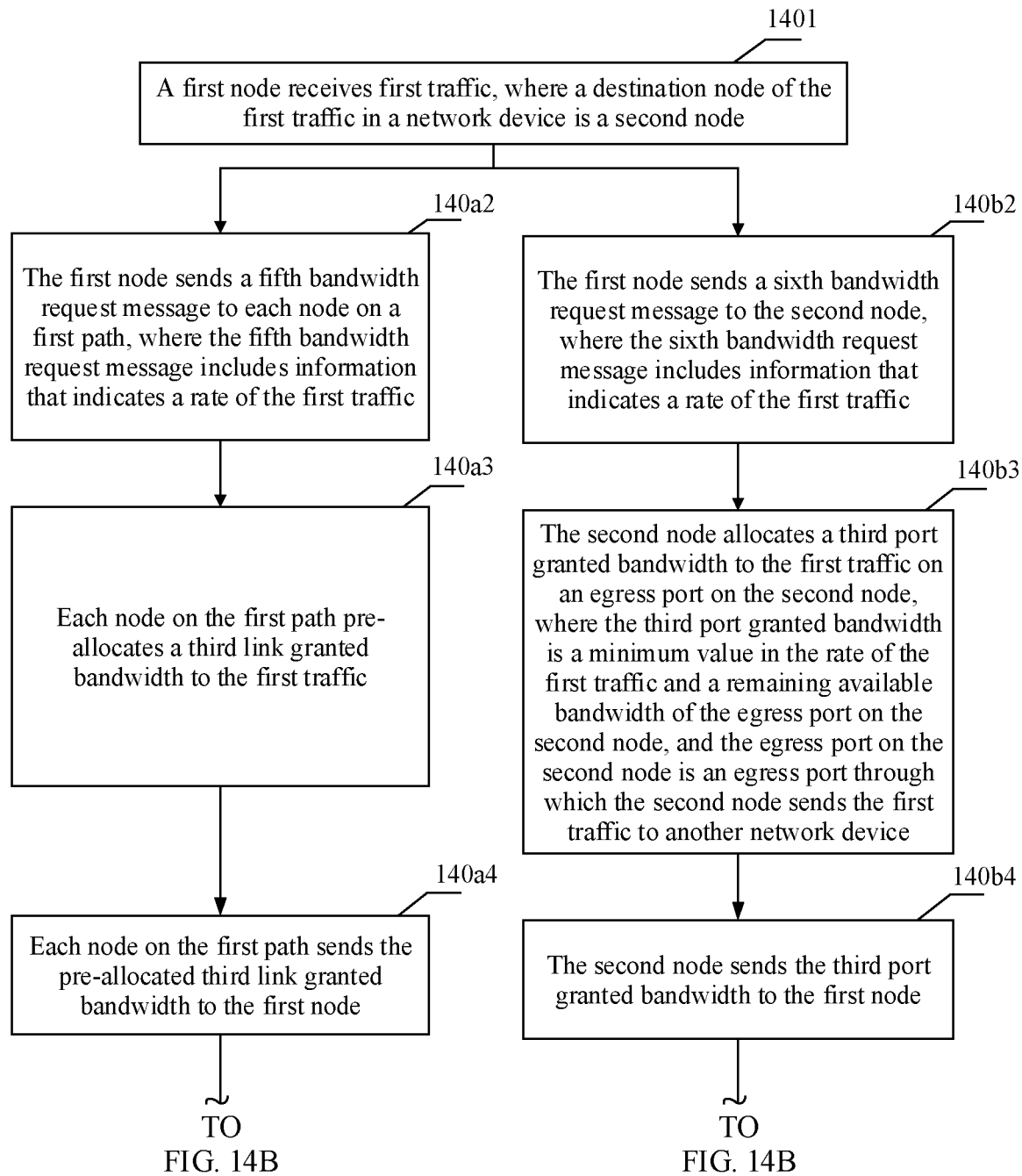
FIG. 14A and FIG. 14B are a schematic flowchart of yet another communications method according to an embodiment of this application.
Figure 14B:
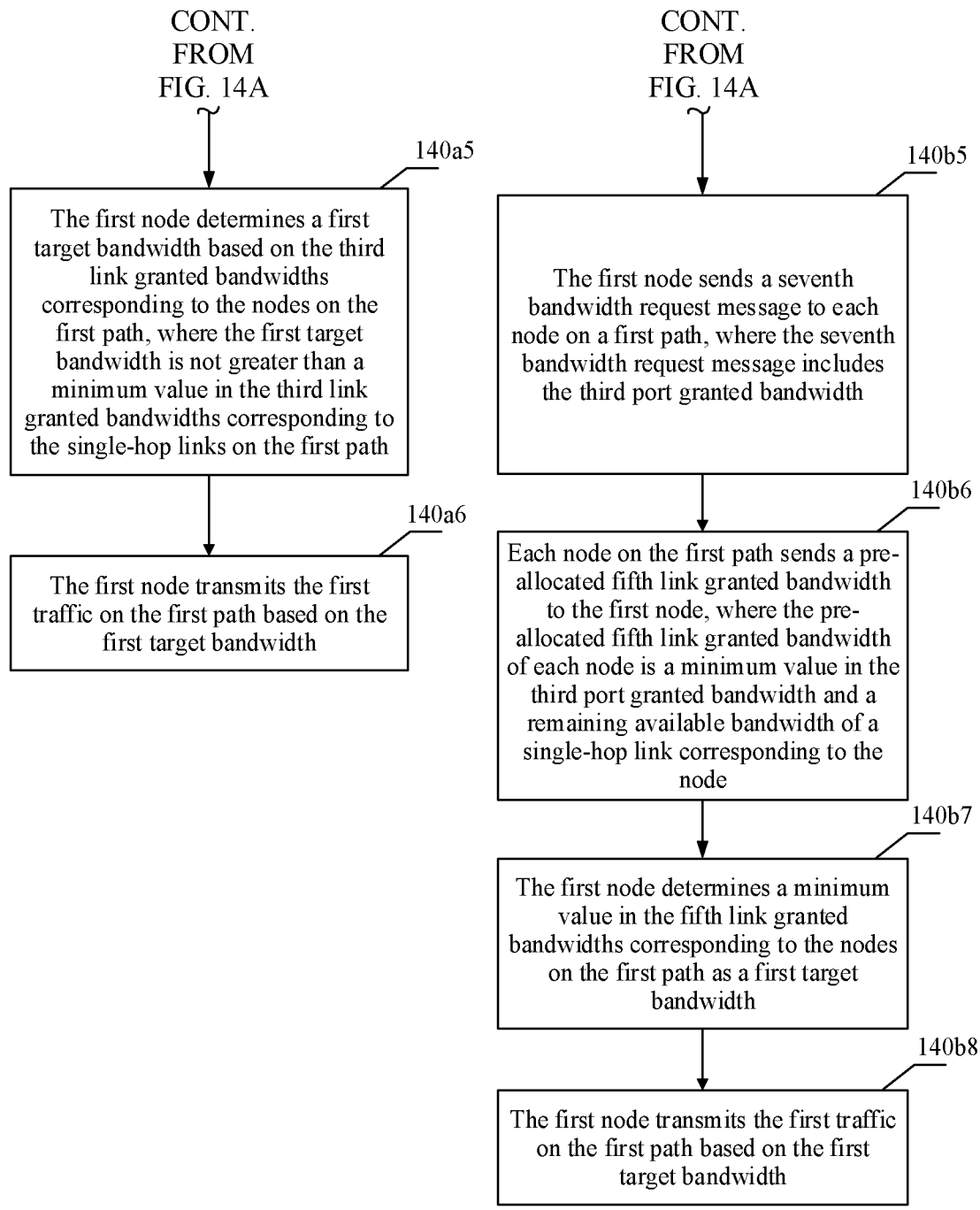

In a fourth implementation, as shown in FIG. 14A and FIG. 14B, a network device includes at least a first node and a second node, and each node stores a remaining available bandwidth of a single-hop link using the node as an endpoint, and is configured to manage and allocate a bandwidth resource of the single-hop link using the node as an endpoint. This embodiment of this application may include the following steps.

Step 1401: The first node receives first traffic, where a destination node of the first traffic in the network device is the second node.

Then, this embodiment of this application may be implemented by using steps 140a2 to 140a6, or may be implemented by using steps 140b2 to 140b8.

In a first example, after step 1401, this embodiment of this application may include the following steps.

Step 140a2: The first node sends a fifth bandwidth request message to each node on the first path, where the fifth bandwidth request message includes information that indicates a rate of the first traffic.

Step 140a3: Each node on the first path pre-allocates a third link granted bandwidth to the first traffic.

Step 140a4: Each node on the first path sends the pre-allocated third link granted bandwidth to the first node.

Step 140a5: The first node determines a first target bandwidth based on the third link granted bandwidths corresponding to the nodes on the first path, where the first target bandwidth is not greater than a minimum value in the third link granted bandwidths corresponding to the single-hop links on the first path.

In an implementation, step 140a5 may include: Step 1: The first node determines a fourth link granted bandwidth of the first traffic on the first path based on the third link granted bandwidth, where the fourth link granted bandwidth is a minimum value in the third link granted bandwidths corresponding to the single-hop links on the first path. Step 2: The first node sends the fourth link granted bandwidth to the second node. Step 3: The second node determines the first target bandwidth based on the fourth link granted bandwidth, where the first target bandwidth is a minimum value in the fourth link granted bandwidth and a remaining available bandwidth of an egress port on the second node, and the egress port on the second node is an egress port through which the second node sends the first traffic to another network device. Step 4: The second node sends the first target bandwidth to the first node.

Step 140a6: The first node transmits the first traffic on the first path based on the first target bandwidth.

In a second example, after step 1401, this embodiment of this application may include the following steps:

Step 140b2: The first node sends a sixth bandwidth request message to the second node, where the sixth bandwidth request message includes information that indicates a rate of the first traffic.

Step 140b3: The second node allocates a third port granted bandwidth to the first traffic on an egress port on the second node, where the third port granted bandwidth is a minimum value in the rate of the first traffic and a remaining available bandwidth of the egress port on the second node, and the egress port on the second node is an egress port through which the second node sends the first traffic to another network device.

Step 140b4: The second node sends the third port granted bandwidth to the first node.

Step 140b5: The first node sends a seventh bandwidth request message to each node on the first path, where the seventh bandwidth request message includes the third port granted bandwidth.

Step 140b6: Each node on the first path sends a pre-allocated fifth link granted bandwidth to the first node, where the pre-allocated fifth link granted bandwidth of each node is a minimum value in the third port granted bandwidth and a remaining available bandwidth of a single-hop link corresponding to the node.

Step 140b7: The first node determines a minimum value in the fifth link granted bandwidths corresponding to the nodes on the first path as a first target bandwidth.

Step 140b8: The first node transmits the first traffic on the first path based on the first target bandwidth.

Figure 15:
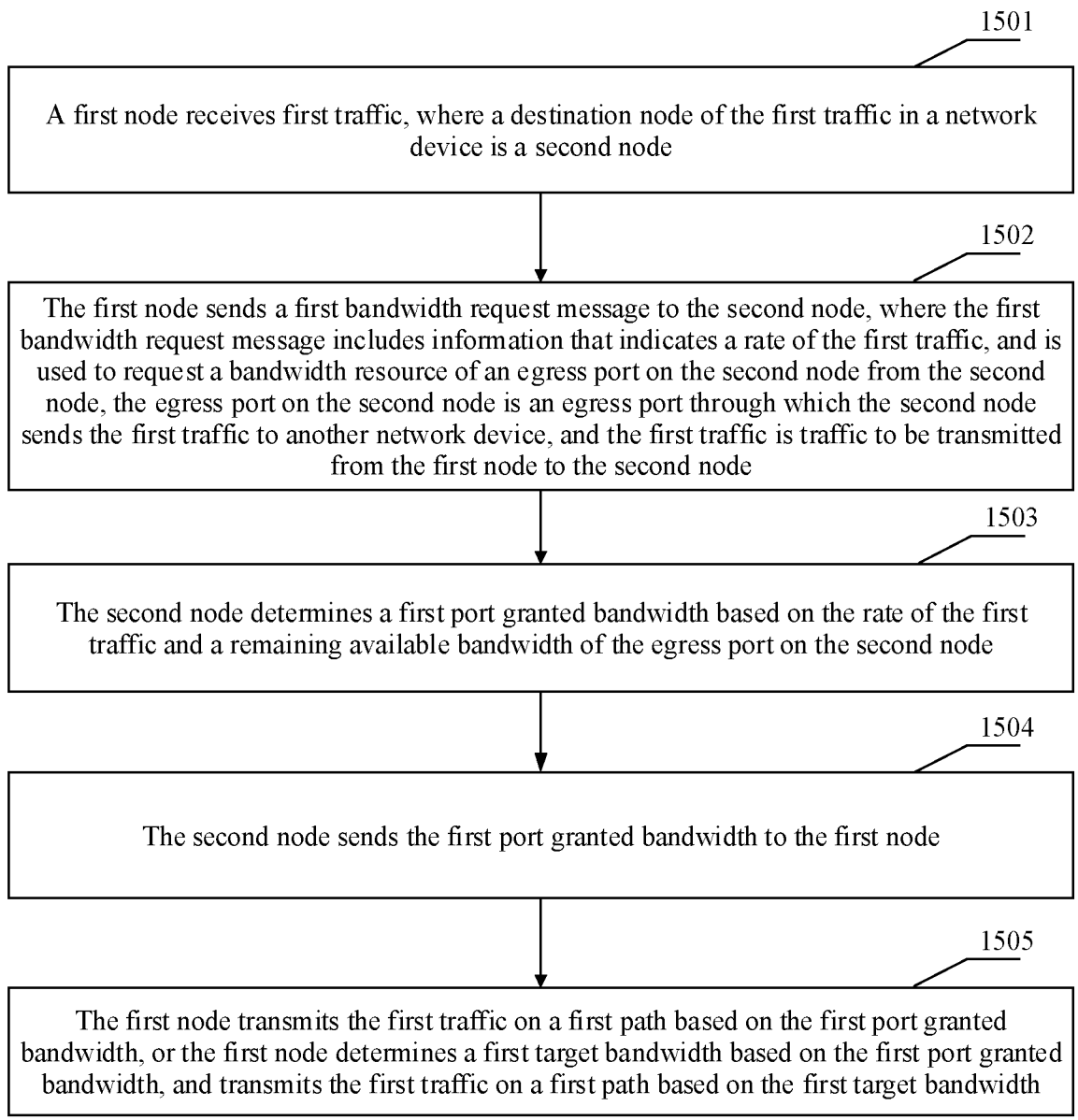
FIG. 15 is a schematic flowchart of still yet another communications method according to an embodiment of this application.

In a fifth implementation, as shown in FIG. 15, a network device includes at least a first node and a second node, and each node stores a remaining available bandwidth of a single-hop link using the node as an endpoint and a bandwidth status of another single-hop link in the network device. Each node is configured to manage and allocate a bandwidth resource of the single-hop link using the node as an endpoint. In this embodiment of this application, only a port bandwidth resource may be considered, and whether a link bandwidth resource that is applied for and allocated in advance is sufficient is not considered. In this case, this embodiment of this application may include the following steps.

Step 1501: The first node receives first traffic, where a destination node of the first traffic in the network device is the second node.

Step 1502: The first node sends a first bandwidth request message to the second node, where the first bandwidth request message includes information that indicates a rate of the first traffic, and is used to request a bandwidth resource of an egress port on the second node from the second node, the egress port on the second node is an egress port through which the second node sends the first traffic to another network device, and the first traffic is traffic to be transmitted from the first node to the second node.

Step 1503: The second node determines a first port granted bandwidth based on the rate of the first traffic and a remaining available bandwidth of the egress port on the second node.

In an implementation, step 1503 may include: Step 1: The second node determines, based on a stored bandwidth status of another single-hop link, at least one first path that has an available bandwidth resource from the first node to the second node. Step 2: The second node determines a minimum value in the rate of the first traffic, the remaining available bandwidth of the egress port on the second node, and a total remaining available bandwidth of the single-hop link using the second node as an endpoint as the first port granted bandwidth.

Step 1504: The second node sends the first port granted bandwidth to the first node.

Step 1505: The first node transmits the first traffic on the first path based on the first port granted bandwidth. Alternatively, the first node determines a first target bandwidth based on the first port granted bandwidth, and transmits the first traffic on the first path based on the first target bandwidth.

It can be learned that the five possible implementations describe the communications method provided in the embodiments of this application, before traffic is transmitted in the network device, it is predetermined for the traffic whether there are sufficient bandwidths on a transmission path, and after it is determined that a granted bandwidth can be used to transmit the traffic on the transmission path, some traffic corresponding to the granted bandwidth in the traffic is transmitted on the transmission path based on the granted bandwidth. In this way, the bandwidth on the transmission path is predetermined for the traffic, so that the traffic can be transmitted based on the granted bandwidth on the path. This ensures that no congestion occurs during traffic transmission on the path, and can effectively avoid a problem that the traffic cannot be transmitted in the network device due to congestion on the path during traffic transmission in the current communications manner, to improve effectiveness and reliability of traffic transmission between nodes in the network device.

For complex and changeable traffic transmission scenarios in a network device, to orderly allocate bandwidths to a plurality of pieces of traffic from a remaining available bandwidth of a single-hop link according to a rule when a bandwidth resource on the single-hop link is applied for the plurality of pieces of traffic simultaneously, a concept of a target priority is introduced in this embodiment of this application. The target priority may be determined based on a traffic priority of the traffic, or may be determined based on a quantity of single-hop links included in a traffic transmission path, or may be determined based on a traffic priority of the traffic and a quantity of single-hop links included in a traffic transmission path. In the embodiments of this application, an example in which the target priority is jointly determined based on the traffic priority of the traffic and the quantity of single-hop links included in a traffic transmission path is used for description.

Figure 16:
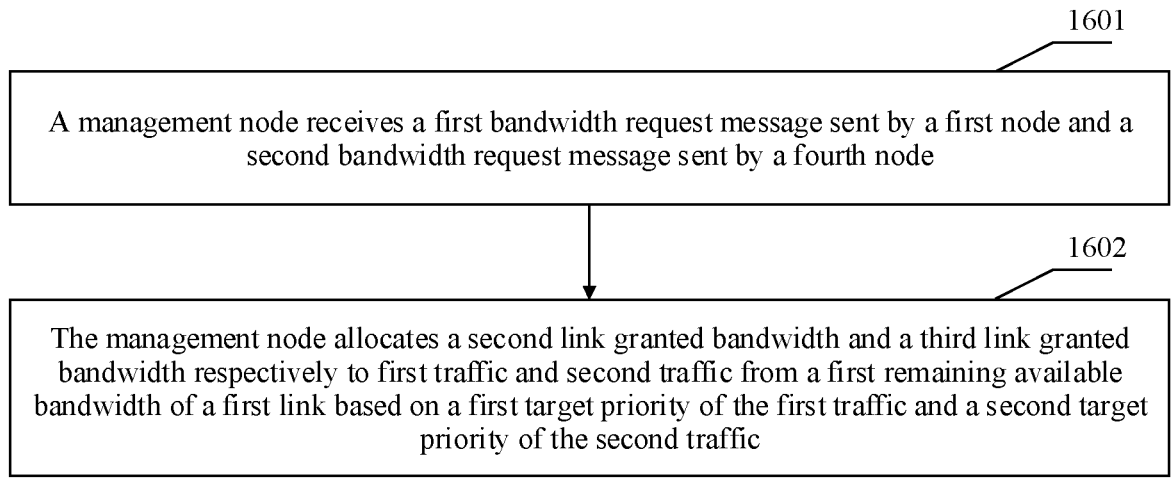
FIG. 16 is a schematic flowchart of an example of a communications method according to an embodiment of this application.

In a scenario in which the management node stores the remaining available bandwidths of all the single-hop links in the network device, and is configured to manage and allocate the bandwidth resources of all the single-hop links in the network device, if bandwidths requested by the first node and the fourth node from the management node for the first traffic and the second traffic includes a bandwidth of a first link, as shown in FIG. 16, this embodiment of this application may include the following steps.

Step 1601: The management node receives a first bandwidth request message sent by the first node and a second bandwidth request message sent by the fourth node.

The first bandwidth request message includes a first requested bandwidth, and is used to request, from the management node, a bandwidth resource on a first path for the first traffic. The second bandwidth request message includes a second requested bandwidth, and is used to request, from the management node, a bandwidth resource on a second path for the second traffic. Both the second path and the first path include the first link.

Step 1602: The management node allocates a second link granted bandwidth and a third link granted bandwidth respectively to the first traffic and the second traffic from a first remaining available bandwidth of the first link based on a first target priority of the first traffic and a second target priority of the second traffic.

In an example, if the first target priority is higher than the second target priority, step 1602 may include: Step 1: The management node allocates the second link granted bandwidth to the first traffic from the first remaining available bandwidth of the first link, where the second link granted bandwidth is a minimum value in the first requested bandwidth and the remaining available bandwidth. Step 2: The management node updates the remaining available bandwidth of the first link with a second remaining available bandwidth, where the second remaining available bandwidth is a difference between the first remaining available bandwidth and the second link granted bandwidth. Step 3: The management node allocates the third link granted bandwidth to the second traffic from the second remaining available bandwidth, where the third link granted bandwidth is a minimum value in the second requested bandwidth and the second remaining available bandwidth.

In another example, if the first target priority is the same as the second target priority, step 1602 may include: The management node allocates the second link granted bandwidth to the first traffic and the third link granted bandwidth to the second traffic from the first remaining available bandwidth of the first link according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that between step 1601 and step 1602, this embodiment may further include: The management node determines the first target priority for the first traffic based on a traffic priority of the first traffic and a quantity of single-hop links included in the first path, where a target priority is positively correlated with a traffic priority, and the target priority is negatively correlated with a quantity of single-hop links included in a path.

Figure 17:
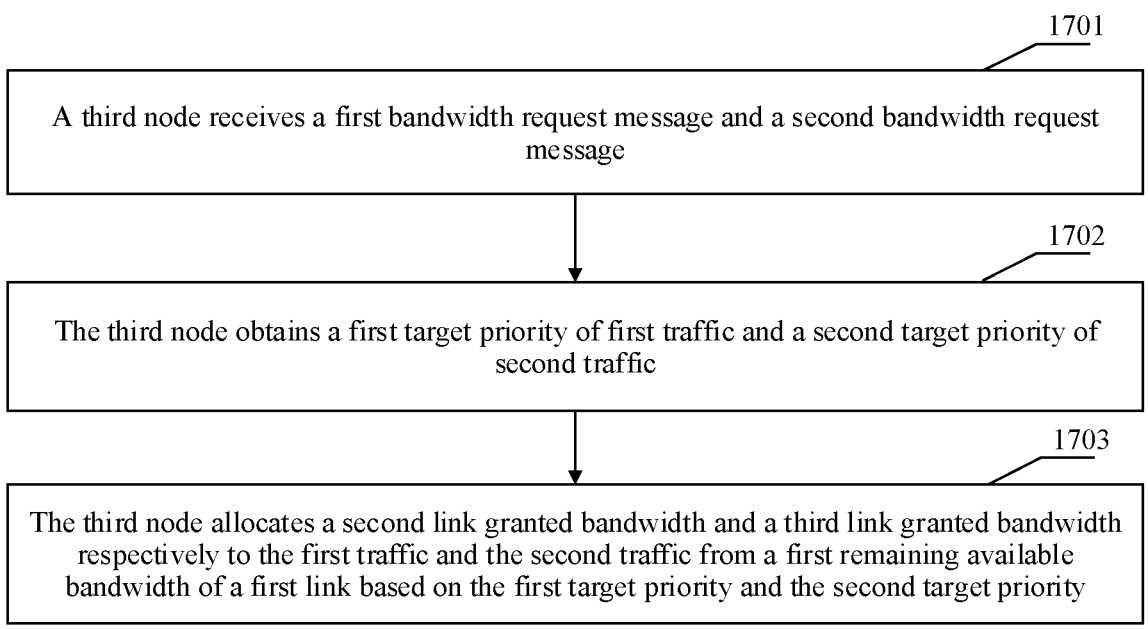
FIG. 17 is a schematic flowchart of another example of a communications method according to an embodiment of this application.

In a scenario in which each node in the network device stores a remaining available bandwidth of a single-hop link using the node as an endpoint, and is configured to manage and allocate a bandwidth resource of the single-hop link using the node as an endpoint, if an intermediate node (referred to as a third node below) on the first path receives a request, bandwidths of the first link corresponding to the third node need to be separately allocated to the first traffic and the second traffic. As shown in FIG. 17, this embodiment of this application may include the following steps.

Step 1701: The third node receives a first bandwidth request message and a second bandwidth request message.

The first bandwidth request message is used to request the third node to allocate a first requested bandwidth to the first traffic on a first link, where the first link is a single-hop link using the third node as an endpoint on a first path used to transmit the first traffic. The second bandwidth request message is used to request the third node to allocate a second requested bandwidth to the second traffic on a first link, where the first link is a single-hop link using the third node as an endpoint on a second path used to transmit the second traffic.

Step 1702: The third node obtains a first target priority of the first traffic and a second target priority of the second traffic.

The first bandwidth request message may carry a first traffic priority of the first traffic, and the second bandwidth request message may also carry a second traffic priority of the second traffic. Step 1702 in this embodiment of this application may include: The third node determines the first target priority for the first traffic based on the first traffic priority and a quantity of single-hop links included in the first path; and similarly, the third node determines the second target priority for the second traffic based on the second traffic priority and a quantity of single-hop links included in the second path, where a target priority is positively correlated with a traffic priority, and the target priority is negatively correlated with a quantity of single-hop links included in a path.

Step 1703: The third node allocates a second link granted bandwidth and a third link granted bandwidth respectively to the first traffic and the second traffic from a first remaining available bandwidth of the first link based on the first target priority and the second target priority.

In an example, if the first target priority is higher than the second target priority, step 1703 may include: Step 1: The third node allocates the second link granted bandwidth to the first traffic from the first remaining available bandwidth, where the second link granted bandwidth is a minimum value in the first requested bandwidth and the first remaining available bandwidth. Step 2: The third node updates the remaining available bandwidth of the first link with a second remaining available bandwidth, where the second remaining available bandwidth is a difference between the first remaining available bandwidth and the second link granted bandwidth. Step 3: The third node allocates the third link granted bandwidth to the second traffic from the second remaining available bandwidth, where the third link granted bandwidth is a minimum value in the second requested bandwidth and the second remaining available bandwidth.

In another example, if the first target priority is the same as the second target priority, step 1703 may include: The third node allocates the second link granted bandwidth to the first traffic and the third link granted bandwidth to the second traffic from the first remaining available bandwidth according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It can be learned that, in this embodiment of this application, a concept of a target traffic priority is further introduced in consideration of complex and variable traffic transmission scenarios in the network device, and the target priority may be jointly determined based on a traffic priority and a quantity of single-hop links included in a path. An allocation rule is provided for a plurality of pieces of traffic to simultaneously apply for bandwidth resources on a same single-hop link, to ensure that the bandwidth resources can be orderly allocated to the traffic. This can effectively avoid a problem that traffic cannot be transmitted in the network device due to congestion on a path in a current communications manner, to improve effectiveness and reliability of traffic transmission between nodes in the network device.

In addition, in this embodiment of this application, if a rate of the first traffic is greater than a first target bandwidth, that the first node sends the first traffic on the first path based on the first target bandwidth is: The first node sends first sub-traffic corresponding to the first target bandwidth in the first traffic on the first path.

It may be understood that, to ensure that bandwidth resources applied for traffic are valid and accurate, do not occupy a redundant network resource, and do not cause a waste of network resources, the remaining bandwidth resource in the network device needs to be updated as efficiently as possible in this embodiment of this application. For example, in a scenario in which each node manages a bandwidth resource of a single-hop link using the node as an endpoint, this embodiment of this application may further include: The first node notifies other nodes in the network device of the first target bandwidth applied for the first traffic on the first path, so that the other nodes update remaining available bandwidths of the single-hop links in the network device based on the first target bandwidth. In this case, the third node in the network device receives a notification message sent by the first node, where the notification message is used to notify the first target bandwidth that is allocated to the first traffic on the first path and that is used to transmit the first traffic. The third node updates the remaining available bandwidth of the first link with the second remaining available bandwidth based on the first target bandwidth, where the second remaining available bandwidth is a difference between the first remaining available bandwidth and the first target bandwidth. For another example, in a scenario in which the management node manages bandwidth resources of all single-hop links, this embodiment of this application may further include: The management node updates remaining available bandwidths of the single-hop links in the network device based on the first target bandwidth.

In conclusion, in the communications method provided in this embodiment of this application, before traffic is transmitted in the network device, it is predetermined for the traffic whether there are sufficient bandwidths on a transmission path, and after it is determined that a granted bandwidth can be used to transmit the traffic on the transmission path, some traffic corresponding to the granted bandwidth in the traffic is transmitted on the transmission path based on the granted bandwidth. In this way, the bandwidth on the transmission path is predetermined for the traffic, so that the traffic can be transmitted based on the granted bandwidth on the path. This ensures that no congestion occurs during traffic transmission on the path, and can effectively avoid a problem that the traffic cannot be transmitted in the network device due to congestion on the path during traffic transmission in the current communications manner, to improve effectiveness and reliability of traffic transmission between nodes in the network device. In addition, a concept of a target traffic priority is further introduced in consideration of complex and variable traffic transmission scenarios in the network device, and the target priority may be jointly determined based on a traffic priority and a quantity of single-hop links included in a path. An allocation rule is provided for a plurality of pieces of traffic to simultaneously apply for bandwidth resources on a same single-hop link, to ensure that the bandwidth resources can be orderly allocated to the traffic. This can effectively avoid a problem that traffic cannot be transmitted in the network device due to congestion on a path in a current communications manner, to improve effectiveness and reliability of traffic transmission between nodes in the network device.

It should be noted that related descriptions and effects achieved in this embodiment of this application may correspond to related descriptions in the embodiments corresponding to FIG. 3, FIG. 7, FIG. 8, FIG. 9, and FIG. 10. For example, the first node in this embodiment of this application may correspond to the node 1 in the embodiment shown in FIG. 3, the second node in this embodiment of this application may correspond to the node 2 in the embodiment shown in FIG. 3, and the first traffic in this embodiment of this application may correspond to the traffic 1 in the embodiment shown in FIG. 3, and the first path in this embodiment of this application may correspond to the path 1 in the embodiment shown in FIG. 3. In this embodiment of this application, for detailed descriptions, refer to related descriptions in the embodiments corresponding to FIG. 3, FIG. 7, FIG. 8, FIG. 9, and FIG. 10. Details are not described again.

Figure 18:
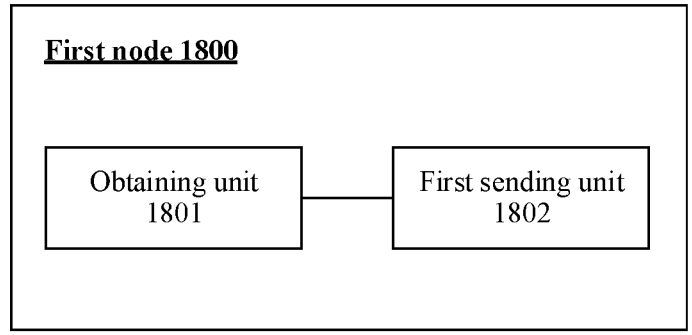
FIG. 18 is a schematic diagram of a structure of a first node according to an embodiment of this application.

Correspondingly, an embodiment of this application provides a first node. As shown in FIG. 18, the first node 1800 is a node in a network device 2200, the network device 2200 further includes a second node, and the first node 1800 includes an obtaining unit 1801 and a first sending unit 1802.

The obtaining unit 1801 is configured to obtain a first target bandwidth of first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes. The first sending unit 1802 is configured to send the first traffic on the first path based on the first target bandwidth.

In some possible scenarios, the network device 2200 further includes a management node. The management node stores remaining available bandwidths of all single-hop links in the network device 2200, and is configured to manage and allocate bandwidth resources of all the single-hop links in the network device 2200. If the management node is the first node, the obtaining unit 1801 is configured to determine the first target bandwidth of the first traffic on the first path based on the stored remaining available bandwidths of the single-hop links on the first path.

In an example, the obtaining unit 1801 is configured to determine a first link granted bandwidth of the first traffic on the first path based on the stored remaining available bandwidths of the single-hop links on the first path, and uses the first link granted bandwidth as the first target bandwidth, where the first link granted bandwidth is a minimum value in a rate of the first traffic and the remaining available bandwidths of the single-hop links on the first path.

In another example, the first node 1800 may further include: a second sending unit, configured to send a first bandwidth request message to the second node, where the first bandwidth request message includes information that indicates a rate of the first traffic; and a receiving unit, configured to receive a first port granted bandwidth sent by the second node, where the first port granted bandwidth is a port bandwidth allocated by the second node to the first traffic on an egress port on the second node based on the rate of the first traffic, the egress port on the second node is an egress port through which the second node sends the first traffic to another network device 2200, and the first port granted bandwidth is a minimum value in the rate of the first traffic and a remaining available bandwidth of the egress port on the second node. In this case, the obtaining unit 1801 is configured to obtain the first target bandwidth based on the first port granted bandwidth and the remaining available bandwidths of the single-hop links on the first path that are stored on the first node, where the first target bandwidth is a minimum value in the first port granted bandwidth and the remaining available bandwidths of the single-hop links on the first path.

In some other possible scenarios, the network device 2200 further includes a management node. The management node stores remaining available bandwidths of all single-hop links in the network device 2200, and is configured to manage and allocate bandwidth resources of all the single-hop links in the network device 2200. The management node is not the first node 1800.

In an example, the obtaining unit 1801 may include: a first sending subunit, configured to send a second bandwidth request message to the management node, so that the management node determines the first target bandwidth for the first traffic on the first path, where the second bandwidth request message includes information that indicates a rate of the first traffic, and the first target bandwidth is a minimum value in the rate of the first traffic and the remaining available bandwidths of the single-hop links on the first path; and a first receiving subunit, configured to receive the first target bandwidth from the management node.

In another example, the obtaining unit 1801 may alternatively include: a second sending subunit, configured to send a third bandwidth request message to the second node, so that the second node allocates a second port granted bandwidth to the first traffic on an egress port on the second node, and sends the second port granted bandwidth to the management node, where the third bandwidth request message includes information that indicates a rate of the first traffic, and the second port granted bandwidth is a minimum value in the rate of the first traffic and a remaining available bandwidth of the egress port on the second node; and a second receiving subunit, configured to receive the first target bandwidth sent by the management node, where the first target bandwidth is a minimum value determined by the management node in the second port granted bandwidth and the remaining available bandwidths of the single-hop links on the first path.

In still another example, the obtaining unit 1801 may alternatively include: a third sending subunit, configured to send a fourth bandwidth request message to the management node, so that the management node determines a second link granted bandwidth for the first traffic on the first path, where the fourth bandwidth request message includes information that indicates a rate of the first traffic, and the second link granted bandwidth is a minimum value in the rate of the first traffic and the remaining available bandwidths of the single-hop links on the first path; and a third receiving subunit, configured to receive the first target bandwidth from the second node, where the first target bandwidth is a minimum value determined by the second node in a remaining available bandwidth of an egress port on the second node and the second link granted bandwidth.

In still other possible scenarios, each node in the network device 2200 stores a remaining available bandwidth of a single-hop link using the node as an endpoint, and is configured to manage and allocate a bandwidth resource of the single-hop link using the node as an endpoint.

In this scenario, in an example, the obtaining unit 1801 includes: a fourth sending subunit, configured to send a fifth bandwidth request message to each node on the first path, where the fifth bandwidth request message includes information that indicates a rate of the first traffic; a fourth receiving subunit, configured receive a third link granted bandwidth pre-allocated to the first traffic by each node on the first path; and a first determining subunit, configured to determine the first target bandwidth based on the third link granted bandwidth, where the first target bandwidth is not greater than a minimum value in the third link granted bandwidths corresponding to the single-hop links on the first path. The first determining subunit includes: a second determining subunit, configured to determine a fourth link granted bandwidth of the first traffic on the first path based on the third link granted bandwidth, where the fourth link granted bandwidth is a minimum value in the third link granted bandwidths corresponding to the single-hop links on the first path; a fifth sending subunit, configured to send the fourth link granted bandwidth to the second node, so that the second node determines the first target bandwidth based on the fourth link granted bandwidth, where the first target bandwidth is a minimum value in the fourth link granted bandwidth and a remaining available bandwidth of an egress port on the second node, and the egress port on the second node is an egress port through which the second node sends the first traffic to another network device 2200; and a fifth receiving subunit, configured to receive the first target bandwidth sent by the second node.

In another example, the obtaining unit 1801 includes: a sixth sending subunit, configured to send a sixth bandwidth request message to the second node, where the sixth bandwidth request message includes information that indicates a rate of the first traffic; a sixth receiving subunit, configured to receive a third port granted bandwidth allocated by the second node to the first traffic on an egress port on the second node, where the third port granted bandwidth is a minimum value in the rate of the first traffic and a remaining available bandwidth of the egress port on the second node, and the egress port on the second node is an egress port through which the second node sends the first traffic to another network device 2200; a seventh sending subunit, configured to send a seventh bandwidth request message to each node on the first path, where the seventh bandwidth request message includes the third port granted bandwidth; a seventh receiving subunit, configured receive a fifth link granted bandwidth pre-allocated to the first traffic by each node on the first path; and a third determining subunit, configured to determine a minimum value in the plurality of fifth link granted bandwidths as the first target bandwidth.

In an implementation, if the rate of the first traffic is greater than the first target bandwidth, the first sending unit 1802 is configured to send first sub-traffic corresponding to the first target bandwidth in the first traffic on the first path.

It may be understood that the first node 1800 may further include: a third sending unit, configured to notify other nodes in the network device 2200 of the first target bandwidth applied for the first traffic on the first path, so that the other nodes update the remaining available bandwidths of the single-hop links in the network device 2200 based on the first target bandwidth.

It should be noted that, for various possible implementations and technical effects of the first node 1800, refer to descriptions of methods corresponding to the embodiments shown in FIG. 3 and FIG. 6 to FIG. 17.

Figure 19:
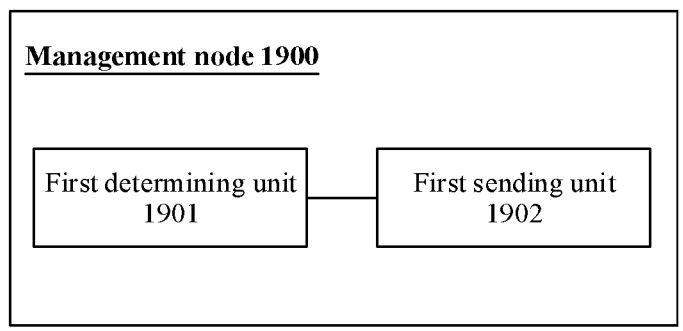
FIG. 19 is a schematic diagram of a structure of a management node according to an embodiment of this application.

In addition, an embodiment of this application further provides a management node. As shown in FIG. 19, a management node 1900 is a node in a network device 2200, the network device 2200 further includes a first node and a second node, and the management node 1900 includes a first determining unit 1901 and a first sending unit 1902.

The first determining unit 1901 is configured to determine a first target bandwidth for first traffic on a first path, where the first path is a path used to transmit the first traffic from the first node to the second node, the first target bandwidth is not greater than a minimum value in remaining available bandwidths of single-hop links on the first path, and a single-hop link is a link between two directly connected nodes; and the first sending unit 1902 is configured to send the first target bandwidth to the first node, so that the first node sends the first traffic on the first path based on the first target bandwidth.

In some possible implementations, the management node 1900 in this embodiment of this application further includes: a first receiving unit, configured to receive a first bandwidth request message sent by the first node, where the first bandwidth request message includes information that indicates a rate of the first traffic. The first determining unit 1901 is configured to determine the first target bandwidth for the first traffic on the first path based on the rate of the first traffic and the remaining available bandwidths of the single-hop links on the first path.

In an example, the first determining unit 1901 may include: a first determining subunit, configured to use a minimum value in the rate of the first traffic and the remaining available bandwidths of the single-hop links on the first path as a first link granted bandwidth; a first sending subunit, configured to send a second bandwidth request message to the second node, so that the second node determines the first target bandwidth based on the first link granted bandwidth and a remaining available bandwidth of an egress port on the second node, where the second bandwidth request message includes the first link granted bandwidth, and the egress port on the second node is an egress port through which the second node sends the first traffic to another network device 2200; and a first receiving subunit, configured to receive the first target bandwidth sent by the second node. The first determining subunit may include: a second determining subunit, configured to determine a minimum value in the rate of the first traffic and a remaining available bandwidth of each single-hop link on the first path as a second link granted bandwidth of the single-hop link; and a third determining subunit, configured to determine a minimum value in the second link granted bandwidths of the single-hop links on the first path as the first link granted bandwidth of the first traffic on the first path.

In some other possible implementations, the management node 1900 further includes: a second receiving unit, configured to receive a first port granted bandwidth that is allocated to the first traffic on an egress port on the second node and sent by the second node, where the egress port on the second node is an egress port through which the second node sends the first traffic to another network device 2200. The first determining unit 1901 is configured to obtain the first target bandwidth based on the first port granted bandwidth and the remaining available bandwidths of the single-hop links on the first path, where the first target bandwidth is a minimum value in the first port granted bandwidth and the remaining available bandwidths of the single-hop links on the first path.

In still other possible implementations, the management node 1900 further includes: a third receiving unit, configured to receive a second bandwidth request message sent by a fourth node, where the second bandwidth request message includes a second requested bandwidth and is used to request, from the management node, bandwidth resources on a second path for second traffic, and both the second path and the first path include a first link; and an allocation unit, configured to allocate a second link granted bandwidth and a third link granted bandwidth respectively to the first traffic and the second traffic from a first remaining available bandwidth of the first link based on a first target priority of the first traffic and a second target priority of the second traffic.

In one case, if the first target priority is higher than the second target priority, the allocation unit includes: a first allocation subunit, configured to allocate the second link granted bandwidth to the first traffic from the first remaining available bandwidth of the first link, where the second link granted bandwidth is a minimum value in a first requested bandwidth and the remaining available bandwidth; an update subunit, configured to update the remaining available bandwidth of the first link with a second remaining available bandwidth, where the second remaining available bandwidth is a difference between the first remaining available bandwidth and the second link granted bandwidth; and a second allocation subunit, configured to allocate the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, the allocation unit is configured to allocate the second link granted bandwidth to the first traffic and the third link granted bandwidth to the second traffic from the first remaining available bandwidth of the first link according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the management node 1900 may further include a second determine unit, configured to determine the first target priority for the first traffic based on a traffic priority of the first traffic and a quantity of single-hop links included in the first path, where a target priority is positively correlated with a traffic priority, and the target priority is negatively correlated with a quantity of single-hop links included in a path.

It may be understood that the management node 1900 further includes: an update unit, configured to update the remaining available bandwidths of the single-hop links in the network device 2200 based on the first target bandwidth.

It should be noted that, for various possible implementations and technical effects of the management node 1900, refer to descriptions of methods corresponding to the embodiments shown in FIG. 3 and FIG. 6 to FIG. 17.

Figure 20:
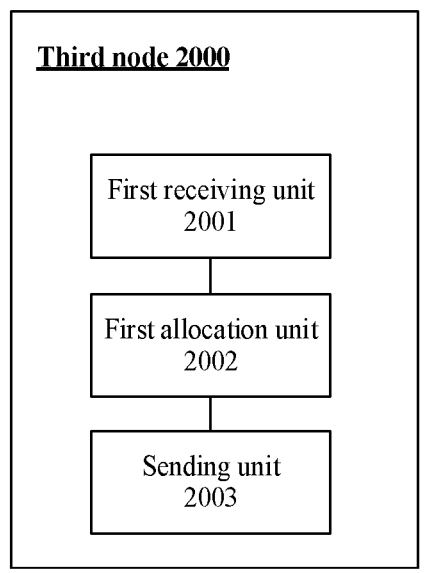
FIG. 20 is a schematic diagram of a structure of a third node according to an embodiment of this application.

In addition, an embodiment of this application further provides a third node. As shown in FIG. 20, a third node 2000 is a node in a network device 2200, the network device 2200 further includes a first node, and the third node 2000 includes a first receiving unit 2001, a first allocation unit 2002, and a sending unit 2003.

The first receiving unit 2001 is configured to receive a first bandwidth request message sent by the first node, where the first bandwidth request message is used to request the third node to allocate a first requested bandwidth to first traffic on a first link, and the first link is a single-hop link using the third node as an endpoint on a first path used to transmit the first traffic. The first allocation unit 2002 is configured to allocate a first link granted bandwidth to the first traffic on the first link from a first remaining available bandwidth of the first link, where the first link granted bandwidth is not greater than a minimum value in the first remaining available bandwidth and the first requested bandwidth. The sending unit 2003 is configured to send the first link granted bandwidth to the first node.

In some possible implementations, the third node 2000 further includes: a second receiving unit, configured to receive a notification message sent by the first node, where the notification message is used to notify a first target bandwidth that is allocated to the first traffic on the first path and that is used to transmit the first traffic; and an update unit, configured to update the remaining available bandwidth of the first link with a second remaining available bandwidth based on the first target bandwidth, where the second remaining available bandwidth is a difference between the first remaining available bandwidth and the first target bandwidth.

In some other possible implementations, the third node 2000 further includes: a third receiving unit, configured to receive a second bandwidth request message, where the second bandwidth request message is used to request the third node to allocate a second requested bandwidth to second traffic on the first link, and the first link is a single-hop link using the third node as an endpoint on a second path used to transmit the second traffic; an obtaining unit, configured to obtain a first target priority of the first traffic and a second target priority of the second traffic; and a second allocation unit, configured to allocate a second link granted bandwidth and a third link granted bandwidth respectively to the first traffic and the second traffic from the first remaining available bandwidth of the first link based on the first target priority and the second target priority.

In one case, if the first target priority is higher than the second target priority, the second allocation unit includes: a first allocation subunit, configured to allocate the second link granted bandwidth to the first traffic from the first remaining available bandwidth, where the second link granted bandwidth is a minimum value in the first requested bandwidth and the first remaining available bandwidth; an update subunit, configured to update the remaining available bandwidth of the first link with the second remaining available bandwidth, where the second remaining available bandwidth is a difference between the first remaining available bandwidth and the second link granted bandwidth; and a second allocation subunit, configured to allocate the third link granted bandwidth to the second traffic from the second remaining available bandwidth, where the third link granted bandwidth is a minimum value in the second requested bandwidth and the second remaining available bandwidth.

In another case, if the first target priority is the same as the second target priority, the second allocation unit is configured to allocate the second link granted bandwidth to the first traffic and the third link granted bandwidth to the second traffic from the first remaining available bandwidth according to a preset allocation algorithm, where a sum of the second link granted bandwidth and the third link granted bandwidth is not greater than the first remaining available bandwidth. The preset allocation algorithm is a max-min fairness algorithm, an average allocation algorithm, a round robin scheduling RR algorithm, or a random allocation algorithm.

It may be understood that the first bandwidth request message carries a first traffic priority of the first traffic, and the second bandwidth request message carries a second traffic priority of the second traffic. The obtaining unit includes: a first determining subunit, configured to determine the first target priority for the first traffic based on the first traffic priority and a quantity of single-hop links included in the first path; and a second determining subunit, configured to determine the second target priority for the second traffic based on the second traffic priority and a quantity of single-hop links included in the second path, where a target priority is positively correlated with a traffic priority, and the target priority is negatively correlated with a quantity of single-hop links included in a path.

It should be noted that, for various possible implementations and technical effects of the third node 2000, refer to descriptions of methods corresponding to the embodiments shown in FIG. 3 and FIG. 6 to FIG. 17.

Figure 21:
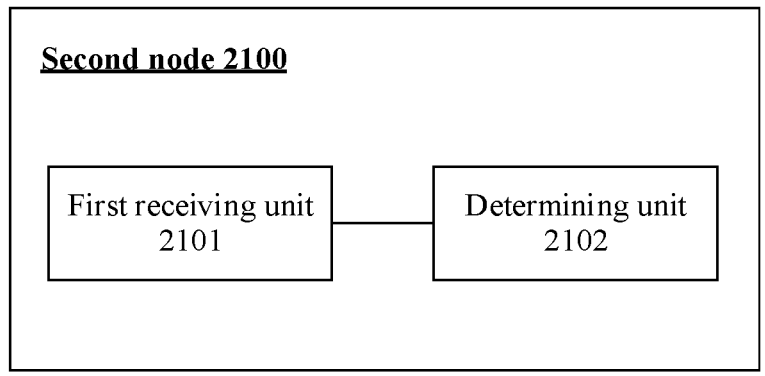
FIG. 21 is a schematic diagram of a structure of a second node according to an embodiment of this application.
Figure 22:
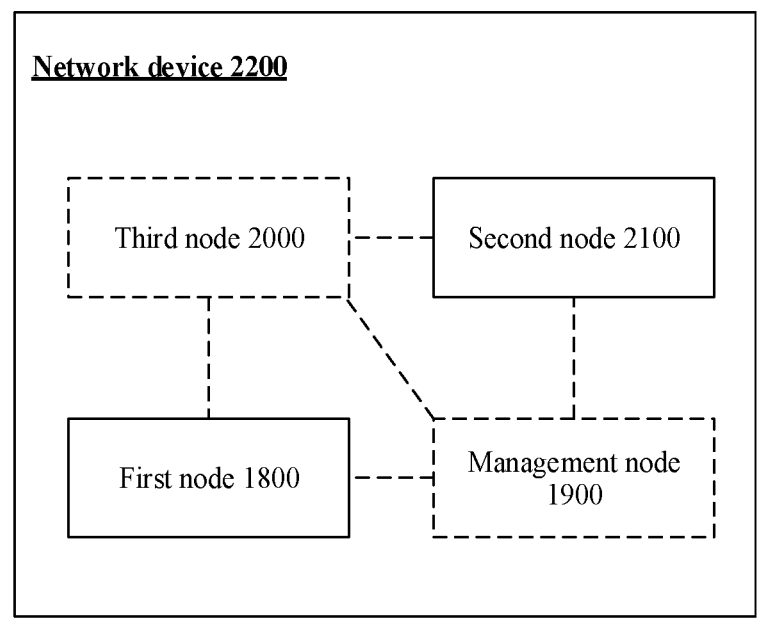
FIG. 22 is a schematic diagram of a structure of a network device according to an embodiment of this application.

In addition, an embodiment of this application further provides a second node. As shown in FIG. 21, a second node 2100 is a node in a network device 2200, the network device

2200 further includes a first node, and the second node 2100 includes a first receiving unit 2101 and a determining unit 2102.

The first receiving unit 2101 is configured to receive a first bandwidth request message sent by the first node, where the first bandwidth request message includes information that indicates a rate of first traffic, and is used to request a bandwidth resource of an egress port on the second node from the second node, the egress port on the second node is an egress port through which the second node sends the first traffic to another network device 2200, and the first traffic is traffic to be transmitted from the first node to the second node. The determining unit 2102 is configured to determine a first port granted bandwidth based on the rate of the first traffic and a remaining available bandwidth of the egress port on the second node.

In some possible implementations, if the second node stores remaining available bandwidths of single-hop links in the network device 2200, the determining unit 2102 includes: a first determining subunit, configured to determine, based on the stored remaining available bandwidths of the single-hop links in the network device 2200, at least one first path that has an available bandwidth resource from the first node to the second node; and a second determining subunit, configured to determine the first port granted bandwidth based on the rate of the first traffic, the remaining available bandwidth of the egress port on the second node, and remaining available bandwidths of single-hop links on the at least one first path.

In some other possible implementations, if the second node stores a remaining available bandwidth of a single-hop link using the second node as an endpoint and a bandwidth status of another single-hop link, the determining unit 2102 includes: a third determining subunit, configured to determine, based on the stored bandwidth status of the another single-hop link, at least one first path that has an available bandwidth resource from the first node to the second node; and a fourth determining subunit, configured to determine, as the first port granted bandwidth, a minimum value in the rate of the first traffic, the remaining available bandwidth of the egress port on the second node, and a total remaining available bandwidth of the single-hop link using the second node as an endpoint.

In still other possible implementations, if the network device 2200 further includes a management node, the management node is not the second node 2100, and the management node stores remaining available bandwidths of all single-hop links in the network device 2200, and is configured to manage and allocate bandwidth resources of all the single-hop links in the network device 2200. The second node 2100 further includes: a first sending unit, configured to send the first port granted bandwidth to the management node, so that the management node allocates a first target bandwidth to the first traffic on the first path based on the first port granted bandwidth, and sends the first target bandwidth to the first node.

In yet other possible implementations, if the network device 2200 further includes a management node, the management node is not the second node 2100, and the management node stores remaining available bandwidth of all single-hop links in the network device 2200, and is configured to manage and allocate bandwidth resources of all the single-hop links in the network device 2200. The second node 2100 further includes: a second receiving unit, configured to receive a first link granted bandwidth sent by the management node. The determining unit 2102 includes a third determining unit, configured to determine the first port granted bandwidth based on the first link granted bandwidth and the remaining available bandwidth of the egress port on the second node, and use the first port granted bandwidth as a first target bandwidth. In this case, the second node 2100 further includes: a second sending unit, configured to send the first target bandwidth to the first node.

It should be noted that, for various possible implementations and technical effects of the second node 2100, refer to descriptions of methods corresponding to the embodiments shown in FIG. 3 and FIG. 6 to FIG. 17.

In addition, an embodiment of this application further provides a network device 2200. The network device 2200 includes the first node 1800 and the second node 2100. The first node 1800 is configured to receive first traffic, and perform the communications method performed by the first node 1800. The second node 2100 is configured to perform the communications method performed by the second node 2100. In addition, the network device 2200 may further include the third node 2000. The third node 2000 is configured to perform the communications method performed by the third node 2000. In addition, the network device 2200 may further include the management node 1900, and the management node 1900 is configured to perform the foregoing communications method performed by the management node 1900.

It should be noted that the network device 2200 may be a switch chip, and a plurality of dies included in the switch chip are the nodes in the network device. The network device 2200 includes the first node 1800, and the first node 1800 further includes a receiving unit, a sending unit, and a processing unit. The receiving unit is configured to receive the first traffic at the first node 1800. The sending unit is configured to forward the first traffic from the first node to the destination node along a first path based on the first target bandwidth. The processing unit is configured to perform a processing operation performed by the first node in the method in any implementation corresponding to the embodiments shown in FIG. 3 and FIG. 6 to FIG. 17. Similarly, other nodes such as the second node, the third node, and the management node in the network device 2200 each may include a receiving unit, a sending unit, and a processing unit, and complete a process of the communications method in the embodiments of this application.

In this embodiment of this application, the network device 2200 may be a device such as a switch or a router. Alternatively, the network device 2200 may be a switching network board or a switching chip in a device such as a router or a switch. The network device 2200 may be one device, or may include a plurality of devices. For example, the network device 2200 includes a plurality of switching chips.

It may be understood that, in the network device 2200, a processor may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor may be one processor, or may include a plurality of processors. A memory may include a volatile memory, for example, a random-access memory (RAM); or the memory may include a non-volatile memory, for example, a read-only memory (ROM), a flash memory, a hard disk drive (HDD), or a solid-state drive (SSD). Alternatively, the memory may include a combination of the foregoing types of memories.

The memory may be one memory, or may include a plurality of memories. In an implementation, the memory stores computer-readable instructions, and the computer-readable instructions include a plurality of software modules, for example, a sending module, a processing module, and a receiving module. After executing each software module, the processor may perform a corresponding operation based on an indication of each software module. In this embodiment, an operation performed by a software module is actually an operation performed by the processor based on an indication of the software module. After executing the computer-readable instructions in the memory, the processor may perform, based on instructions of the computer-readable instructions, all operations that may be performed by the network device.

Figure 23:
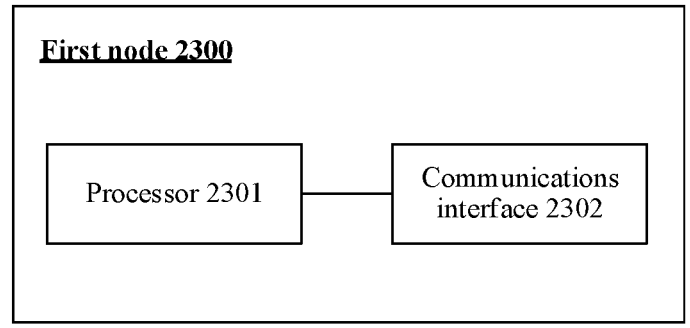
FIG. 23 is a schematic diagram of a structure of a first node according to an embodiment of this application.

In addition, an embodiment of this application further provides a first node. As shown in FIG. 23, a first node 2300 may include a processor 2301 and a communications interface 2302. The processor 2301 is configured to perform a processing operation performed by the first node 2300 in any implementation corresponding to the embodiments shown in FIG. 3 and FIG. 6 to FIG. 17. The communications interface 2302 is configured to implement communication between the first node 2300 and an external device and another node in the network device to which the first node 2300 belongs.

It may be understood that the communications interface 2302 may include: a communications interface through which the first node 2300 communicates with another node, and a communications interface through which the first node 2300 communicates with another external device.

Figure 24:
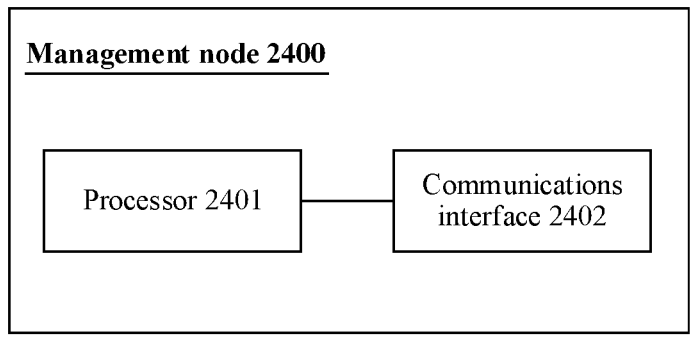
FIG. 24 is a schematic diagram of a structure of a management node according to an embodiment of this application.

An embodiment of this application further provides a management node. As shown in FIG. 24, a management node 2400 may include a processor 2401 and a communications interface 2402. The processor 2401 is configured to perform a processing operation performed by the management node 2400 in any implementation corresponding to the embodiments shown in FIG. 3 and FIG. 6 to FIG. 17. The communications interface 2402 is configured to implement communication between the management node 2400 and another node in the network device to which the management node 2400 belongs.

Figure 25:
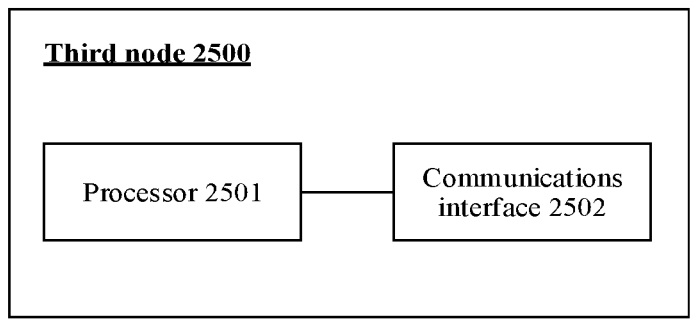
FIG. 25 is a schematic diagram of a structure of a third node according to an embodiment of this application.

An embodiment of this application further provides a third node. As shown in FIG. 25, a third node 2500 may include a processor 2501 and a communications interface 2502. The processor 2501 is configured to perform a processing operation performed by the third node 2500 in any implementation corresponding to the embodiments shown in FIG. 3 and FIG. 6 to FIG. 17. The communications interface 2502 is configured to implement communication between the third node 2500 and another node in the network device to which the third node 2500 belongs.

Figure 26:
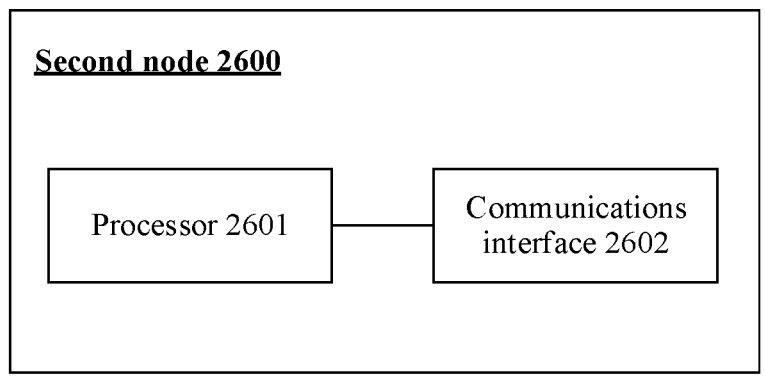
FIG. 26 is a schematic diagram of a structure of a second node according to an embodiment of this application.

An embodiment of this application further provides a second node. As shown in FIG. 26, a second node 2600 may include a processor 2601 and a communications interface 2602. The processor 2601 is configured to perform a processing operation performed by the second node 2600 in any implementation corresponding to the embodiments shown in FIG. 3 and FIG. 6 to FIG. 17. The communications interface 2602 is configured to implement communication between the second node 2600 and another node in the network device to which the second node 2600 belongs.

It may be understood that the communications interface 2602 may include: a communications interface through which the second node 2600 communicates with another node, and a communications interface through which the second node 2600 communicates with another external device.

It should be noted that the first node 2300, the second node 2600, the third node 2500, and the management node 2400 in the same network device may be on a same chip, or may be on different chips. When the nodes are located on different chips, a type of a communications interface through which each node communicates with another node in the network device, for example, the communications interface through which the first node 2300 communicates with another node, the communications interface through which the second node 2600 communicates with another node, the communications interface 2502 of the third node 2500, and the communications interface 2402 of the management node 2400, may be Ethernet (ETH) interface, Interlaken (ILK) interface, and the like.

During an implementation, a processor of each node may read program code in a memory to perform the communications method provided in the embodiments of this application. For nodes in a same network device, in one case, a same shared memory may be set for all the nodes. Program code of each node may be stored in the shared memory. In another case, each node may also have a built-in memory of the node, and the program code of each node is stored in the memory of the node.

In addition, an embodiment of this application further provides a computer program product. When the computer program product is run on a computer, the computer is enabled to perform the method in any implementation corresponding to the embodiments shown in FIG. 3 and FIG. 6 to FIG. 17.

In addition, an embodiment of this application further provides a computer-readable storage medium, and the computer-readable storage medium stores instructions. When the instructions are run on a computer, the computer is enabled to perform the method in any implementation corresponding to the embodiments shown in FIG. 3 and FIG. 6 to FIG. 17.

The term "first" in names such as "first traffic" and "first path" in the embodiments of this application is merely used for name identification, and does not represent the first in a sequence. This rule is also applicable to "second" and the like.

It can be learned from the foregoing descriptions of the implementations that, a person skilled in the art may clearly understand that a part or all of the steps of the methods in the foregoing embodiments may be implemented by using software and a universal hardware platform. Based on such an understanding, the technical solutions of this application may be implemented in a form of a software product. The computer software product may be stored in a storage medium, for example, a ROM/RAM, a magnetic disk, or an optical disc, and include several instructions for instructing a computer device (which may be a personal computer, a server, or a network communications device such as a router) to perform the methods described in the embodiments or some parts of the embodiments of this application.

All the embodiments in this specification are described in a progressive manner. For same or similar parts in the embodiments, mutual reference may be made. Each embodiment focuses on a difference from other embodiments. Especially, apparatus and device embodiments are basically similar to a method embodiment, and therefore is described briefly. For related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present application without creative efforts.

The foregoing descriptions are merely example implementations of this application, but are not intended to limit the protection scope of this application.

What is claimed is:

1. A method, comprising:
obtaining a first target bandwidth of first traffic on a first path, wherein the first path is configured to transmit the first traffic from a first node in a network device to a second node in the network device, wherein the first target bandwidth is a bandwidth that is granted to the first traffic on the first path, wherein the first path comprises multiple single-hop links, wherein each of the multiple single-hop links is between two adjacent nodes on the first path, wherein the first target bandwidth is a minimum value of remaining available bandwidths corresponding to the multiple single-hop links, and wherein each of the remaining available bandwidths corresponds to one of the multiple single-hop links and is an available bandwidth for transmitting the first traffic on the one of the multiple single-hop links; and
sending, based on the first target bandwidth, the first traffic on the first path.

2. The method of claim 1, wherein the network device further comprises a management node, wherein the management node stores remaining available bandwidths of all single-hop links in the network device, wherein the management node is configured to manage and allocate bandwidth resources of all the single-hop links in the network device, and wherein when the management node is the first node, obtaining the first target bandwidth comprises obtaining, based on the remaining available bandwidths, the first target bandwidth.

3. The method of claim 2, wherein obtaining the first target bandwidth further comprises:
obtaining, based on the remaining available bandwidths, a first link granted bandwidth of the first traffic; and
using the first link granted bandwidth as the first target bandwidth,
wherein the first link granted bandwidth is a minimum value in a rate of the first traffic and the remaining available bandwidths.

4. The method of claim 2, further comprising:
sending a first bandwidth request message to the second node, wherein the first bandwidth request message comprises information that indicates a rate of the first traffic; and
receiving a first port granted bandwidth from the second node,
wherein the first port granted bandwidth is a minimum value in the rate and a remaining available bandwidth of an egress port on the second node,
wherein obtaining the first target bandwidth further comprises obtaining, based on the first port granted bandwidth and the remaining available bandwidths, the first target bandwidth, and
wherein the first target bandwidth is a minimum value in the first port granted bandwidth and the remaining available bandwidths.

5. The method of claim 1, wherein the network device further comprises a management node, wherein the management node stores remaining available bandwidths of all single-hop links in the network device, wherein the management node is configured to manage and allocate bandwidth resources of all the single-hop links in the network device, and wherein when the management node is not the first node, obtaining the first target bandwidth comprises:
sending a first bandwidth request message to the management node, wherein the first bandwidth request message comprises information that indicates a rate of the first traffic, and wherein the first target bandwidth is a minimum value among the rate and the remaining available bandwidths; and
receiving, in response to the first bandwidth request message, the first target bandwidth from the management node.

6. The method of claim 1, wherein the network device further comprises a management node, wherein the management node stores remaining available bandwidths of all single-hop links in the network device, wherein the management node is configured to manage and allocate bandwidth resources of all the single-hop links in the network device, and wherein when the management node is not the first node, obtaining the first target bandwidth comprises:
sending a first bandwidth request message to the second node, wherein the first bandwidth request message comprises information that indicates a rate of the first traffic, and wherein a first port granted bandwidth is a minimum value among the rate and a remaining available bandwidth of an egress port on the second node; and
receiving, in response to the first bandwidth request message, the first target bandwidth from the management node,
wherein the first target bandwidth is a minimum value among the first port granted bandwidth and the remaining available bandwidths.

7. The method of claim 1, wherein the network device further comprises a management node, wherein the management node stores remaining available bandwidths of all single-hop links in the network device, wherein the management node is configured to manage and allocate bandwidth resources of all the single-hop links in the network device, and wherein when the management node is not the first node, obtaining the first target bandwidth comprises:
sending a first bandwidth request message to the management node, wherein the first bandwidth request message comprises information that indicates a rate of the first traffic, and wherein a first link granted bandwidth is a minimum value in the rate and the remaining available bandwidths; and
receiving, in response to the first bandwidth request message, the first target bandwidth from the second node,
wherein the first target bandwidth is a minimum value in a remaining available bandwidth of an egress port on the second node and the first link granted bandwidth.

8. The method of claim 1, wherein when each node in the network device stores a remaining available bandwidth of a single-hop link using the node as an endpoint, and when each node is configured to manage and allocate a bandwidth resource of the single-hop link using the node as the endpoint, obtaining the first target bandwidth comprises:
sending a first bandwidth request message to each node on the first path, wherein the first bandwidth request message comprises information that indicates a rate of the first traffic;

receiving a first link granted bandwidth pre-allocated to the first traffic by each node on the first path; and obtaining, based on the first link granted bandwidth, the first target bandwidth, wherein the first target bandwidth is less than or equal to a minimum value in the first link granted bandwidth.

9. The method of claim 8, wherein obtaining the first target bandwidth further comprises:

obtaining, based on the first link granted bandwidth, a second link granted bandwidth of the first traffic, wherein the second link granted bandwidth is a minimum value in the first link granted bandwidth;

sending the second link granted bandwidth to the second node, wherein the first target bandwidth is a minimum value in the second link granted bandwidth and a remaining available bandwidth of an egress port on the second node, and wherein the egress port is an egress port through which the second node sends the first traffic to another network device; and receiving, in response to the second link granted bandwidth, the first target bandwidth from the second node.

10. The method of claim 1, wherein when each node in the network device stores a remaining available bandwidth of a single-hop link using the node as an endpoint, and when each node is configured to manage and allocate a bandwidth resource of the single-hop link using the node as the endpoint, obtaining the first target bandwidth comprises:

sending a first bandwidth request message to the second node, wherein the first bandwidth request message comprises information that indicates a rate of the first traffic;

receiving a first port granted bandwidth allocated by the second node to the first traffic on an egress port on the second node, wherein the first port granted bandwidth is a minimum value among the rate and a remaining available bandwidth of the egress port, and wherein the egress port is an egress port through which the second node sends the first traffic to another network device;

sending a second bandwidth request message to each node on the first path, wherein the second bandwidth request message comprises the first port granted bandwidth;

receiving a first link granted bandwidth pre-allocated to the first traffic by each node on the first path; and obtaining a minimum value in the first link granted bandwidths as the first target bandwidth.

11. The method of claim 10, wherein when the rate is greater than the first target bandwidth, sending the first traffic further comprises sending first sub-traffic corresponding to the first target bandwidth in the first traffic on the first path.

12. The method of claim 1, further comprising notifying other nodes in the network device of the first target bandwidth.

13. A method, comprising:

obtaining a first target bandwidth for first traffic on a first path, wherein the first target bandwidth is a bandwidth that is granted to the first traffic on the first path, wherein the first path is configured to transmit the first traffic from a first node in a network device to a second node in the network device, wherein the first path comprises multiple single-hop links, wherein each of the multiple single-hop links is between two adjacent nodes on the first path, wherein the first target bandwidth is a minimum value of remaining available bandwidths corresponding to the multiple single-hop links, and wherein each of the remaining available bandwidths corresponds to one of the multiple single-hop links and is an available bandwidth for transmitting the first traffic on the one of the multiple single-hop links; and sending the first target bandwidth to the first node.

14. The method of claim 13, further comprising receiving a first bandwidth request message from the first node, wherein the first bandwidth request message comprises information that indicates a rate of the first traffic, and wherein obtaining the first target bandwidth comprises obtaining, based on the rate and the remaining available bandwidths, the first target bandwidth.

15. The method of claim 14, wherein obtaining the first target bandwidth further comprises:

using a minimum value in the rate and the remaining available bandwidths as a first link granted bandwidth;

sending a second bandwidth request message to the second node, wherein the second bandwidth request message comprises the first link granted bandwidth; and receiving, in response to the second bandwidth request message, the first target bandwidth from the second node.

16. The method of claim 15, wherein using the minimum value in the rate and the remaining available bandwidths as the first link granted bandwidth comprises:

obtaining a first minimum value in the rate and a remaining available bandwidth of each single-hop link on the first path as a second link granted bandwidth of the single-hop link; and obtaining a second minimum value in the second link granted bandwidths as the first link granted bandwidth.

17. The method of claim 13, further comprising receiving a first port granted bandwidth that is allocated to the first traffic on an egress port on the second node from the second node, wherein obtaining the first target bandwidth comprises obtaining, based on the first port granted bandwidth and the remaining available bandwidths, the first target bandwidth, and wherein the first target bandwidth is a minimum value in the first port granted bandwidth and the remaining available bandwidths.

18. The method of claim 13, further comprising:

receiving a first bandwidth request message from a third node, wherein the first bandwidth request message comprises a first requested bandwidth and is configured to request, from a management node, bandwidth resources on a second path for second traffic, and wherein both the first path and the second path comprise a first link; and allocating, based on a first target priority of the first traffic and a second target priority of the second traffic, a first link granted bandwidth and a second link granted bandwidth respectively to the first traffic and the second traffic from a first remaining available bandwidth of the first link.

19. The method of claim 18, wherein when the first target priority is higher than the second target priority, allocating the first link granted bandwidth and the second link granted bandwidth comprises:

allocating the first link granted bandwidth to the first traffic from the first remaining available bandwidth, wherein the first link granted bandwidth is a minimum value in the first requested bandwidth and the remaining available bandwidths;

updating the first remaining available bandwidth with a second remaining available bandwidth, wherein the second remaining available bandwidth is a difference between the first remaining available bandwidth and the first link granted bandwidth; and allocating the second link granted bandwidth to the second traffic from the second remaining available bandwidth, wherein the second link granted bandwidth is a minimum value in the first requested bandwidth and the second remaining available bandwidth.

20. The method of claim 18, wherein when the first target priority is the same as the second target priority, allocating the first link granted bandwidth and the second link granted bandwidth comprises allocating the first link granted bandwidth to the first traffic and the second link granted bandwidth to the second traffic from the first remaining available bandwidth according to a preset allocation algorithm, and wherein a sum of the first link granted bandwidth and the second link granted bandwidth is less than or equal to the first remaining available bandwidth.

21. The method of claim 20, wherein the preset allocation algorithm is a max-min fairness algorithm, an average allocation algorithm, a round robin (RR) scheduling algorithm, or a random allocation algorithm.

22. The method of claim 18, further comprising obtaining, based on a traffic priority of the first traffic and a quantity of single-hop links comprised in the first path, the first target priority, wherein the first target priority is positively correlated with the traffic priority, and wherein the first target priority is negatively correlated with the quantity of single-hop links.

23. The method of claim 13, further comprising updating, based on the first target bandwidth, the remaining available bandwidths.

24. An apparatus, comprising:
a non-transitory memory configured to store instructions; and
one or more processors coupled to the non-transitory memory and configured to execute the instructions to:
obtain a first target bandwidth of first traffic on a first path, wherein the first path is configured to transmit the first traffic from a first node in a network device to a second node in the network device, wherein the first target bandwidth is a bandwidth that is granted to the first traffic on the first path, wherein the first path comprises multiple single-hop links, wherein each of the multiple single-hop links is between two adjacent nodes on the first path, wherein the first target bandwidth is a minimum value of remaining available bandwidths corresponding to the multiple single-hop links, and wherein each of the remaining available bandwidths corresponds to one of the multiple single-hop links and is an available bandwidth for transmitting the first traffic on the one of the multiple single-hop links; and
send, based on the first target bandwidth, the first traffic on the first path.

25. An apparatus, comprising:
a non-transitory memory configured to store instructions; and
one or more processors coupled to the non-transitory memory and configured to execute the instructions to:
obtain a first target bandwidth for first traffic on a first path, wherein the first target bandwidth is a bandwidth that is granted to the first traffic on the first path, wherein the first path is configured to transmit the first traffic from a first node in a network device to a second node in the network device, wherein the first path comprises multiple single-hop links, wherein each of the multiple single-hop links is between two adjacent nodes on the first path, wherein the first target bandwidth to a minimum value of remaining available bandwidths corresponding to the multiple single-hop links, and wherein each of the remaining available bandwidths corresponds to one of the multiple single-hop links and is an available bandwidth for transmitting the first traffic on the one of the multiple single-hop links; and
send the first target bandwidth to the first node.

* * * * *

UNITED STATES PATENT AND TRADEMARK OFFICE
CERTIFICATE OF CORRECTION

PATENT NO. : 12,107,760 B2
APPLICATION NO. : 17/687039
DATED : October 1, 2024
INVENTOR(S) : Yan Zhao, Yibo Yang and Nan Li It is certified that error appears in the above-identified patent and that said Letters Patent is hereby corrected as shown below:

In the Claims

Claim 25, Column 70, Line 31: "wherein the first target bandwidth to a minimum" should read "wherein the first target bandwidth is a minimum"

Signed and Sealed this
Twelfth Day of November, 2024

Katherine Kelly Vidal
Director of the United States Patent and Trademark Office